US008621508B2

(12) United States Patent
Rowe et al.

(10) Patent No.: US 8,621,508 B2
(45) Date of Patent: Dec. 31, 2013

(54) ENCAPSULATED, STREAMING MEDIA AUTOMATION AND DISTRIBUTION SYSTEM

(75) Inventors: Lynn T. Rowe, Boca Raton, FL (US); John A. Heinen, Atlanta, GA (US); Peter A. Ernst, Boston, MA (US); Gary H. Olson, New York City, NY (US)

(73) Assignee: Xialan Chi Ltd., LLC, Dover, DE (US)

( * ) Notice: Subject to any disclaimer, the term of this patent is extended or adjusted under 35 U.S.C. 154(b) by 1703 days.

(21) Appl. No.: 10/939,727

(22) Filed: Sep. 13, 2004

(65) Prior Publication Data

US 2005/0060759 A1    Mar. 17, 2005

Related U.S. Application Data

(63) Continuation of application No. 09/314,716, filed on May 19, 1999, now Pat. No. 6,792,615.

(51) Int. Cl.
*G06F 3/00* (2006.01)
*G06F 13/00* (2006.01)
*H04N 5/445* (2011.01)

(52) U.S. Cl.
USPC ............... 725/37; 725/63; 725/82; 725/109; 725/110; 725/139

(58) Field of Classification Search
USPC ................................. 725/35, 39, 51; 709/230
See application file for complete search history.

(56) References Cited

U.S. PATENT DOCUMENTS 3,639,686 A    2/1972   Walker et al. ............... 178/5.8 R
3,828,132 A    8/1974   Flanagan et al. .................. 179/1

(Continued)

FOREIGN PATENT DOCUMENTS

EP    0 693 836 A1    1/1996    ............... H04L 9/30
EP    0 862 328 A1    9/1998    ............. H04N 7/173

OTHER PUBLICATIONS

OpenAuthor, Internet, Jul. 1998 XP002126675.

(Continued)

*Primary Examiner* — Brian Pendleton
*Assistant Examiner* — Alan Luong
(74) *Attorney, Agent, or Firm* — Brundidge & Stanger, P.C.

(57) ABSTRACT

Disclosed are systems and methods for creating and distributing programming content carried by a digital streaming media to be a plurality of remote nodes located over a large geographic area to create customized broadcast quality programming at the remote nodes. At the remote nodes, a multi-window screen display simultaneously shows different programming including national programming and local programming content. The remote nodes utilize a remote channel origination device to assemble the customized programming at the remote location that can be controlled from a central location. An encapsulated IP and IP encryption system is used to transport the digital streaming media to the appropriate remote nodes. Also disclosed is a graphical user interface ("GUI") providing a software control interface for creating and editing shows or programs that can be aired or played on a remote display device having a multi-window display. The intuitive GUI Software provides the user the ability to easily manage and assemble a series of images, animations and transitions as a single broadcast quality program to be displayed on a remote display device. Another application software system is capable of automating the production of audio narration reports. The disclosed audio concatenation engine automates the creation of audio narration using prerecorded audio segments to minimize the requirement for live, on-air personnel to record audio narration segments.

21 Claims, 25 Drawing Sheets

(56) References Cited

U.S. PATENT DOCUMENTS

| | | | |
|---|---|---|---|
| 3,886,302 A | 5/1975 | Kosco | 178/5.1 |
| 4,429,385 A | 1/1984 | Cichelli et al. | 370/92 |
| 4,429,415 A * | 1/1984 | Chin et al. | 455/164.1 |
| 4,602,279 A | 7/1986 | Freeman | 358/86 |
| 4,724,491 A | 2/1988 | Lambert | 358/310 |
| 4,734,764 A | 3/1988 | Pocock et al. | 358/86 |
| 4,814,883 A | 3/1989 | Perine et al. | 358/181 |
| 4,974,085 A | 11/1990 | Campbell et al. | 358/181 |
| 5,027,400 A | 6/1991 | Baji et al. | 380/20 |
| 5,099,319 A | 3/1992 | Esch et al. | 358/86 |
| 5,121,430 A | 6/1992 | Ganzer et al. | 380/48 |
| 5,155,591 A | 10/1992 | Wachob | 358/86 |
| 5,216,515 A | 6/1993 | Steele et al. | 358/335 |
| 5,283,639 A | 2/1994 | Esch et al. | 348/6 |
| 5,335,277 A | 8/1994 | Harvey et al. | 380/20 |
| 5,345,594 A | 9/1994 | Tsuda | 455/18 |
| 5,389,964 A | 2/1995 | Oberle et al. | 348/9 |
| 5,400,401 A | 3/1995 | Wasilewski et al. | 380/9 |
| 5,412,416 A | 5/1995 | Nemirofsky | 348/10 |
| 5,420,923 A | 5/1995 | Beyers, II et al. | 380/20 |
| 5,424,770 A | 6/1995 | Schmelzer et al. | 348/9 |
| 5,485,197 A * | 1/1996 | Hoarty | 725/37 |
| 5,495,283 A | 2/1996 | Cowe | 348/9 |
| 5,500,681 A | 3/1996 | Jones | 348/473 |
| 5,508,754 A | 4/1996 | Orphan | 348/722 |
| 5,517,193 A * | 5/1996 | Allison et al. | 342/26 R |
| 5,550,825 A | 8/1996 | McMullan, Jr. et al. | 370/73 |
| 5,565,909 A | 10/1996 | Thibadeau et al. | 348/9 |
| 5,568,385 A | 10/1996 | Shelton | 364/420 |
| 5,583,562 A | 12/1996 | Birch et al. | 725/151 |
| 5,600,364 A * | 2/1997 | Hendricks et al. | 725/9 |
| 5,600,366 A | 2/1997 | Schulman | 348/9 |
| 5,600,573 A | 2/1997 | Hendricks et al. | 364/514 |
| 5,608,732 A | 3/1997 | Bestler et al. | 370/474 |
| 5,652,615 A | 7/1997 | Bryant et al. | 348/9 |
| 5,659,350 A * | 8/1997 | Hendricks et al. | 725/116 |
| 5,659,351 A | 8/1997 | Huber | 348/7 |
| 5,666,645 A | 9/1997 | Thomas et al. | 455/6.1 |
| 5,682,195 A | 10/1997 | Hendricks et al. | 348/6 |
| 5,701,186 A | 12/1997 | Huber | 359/125 |
| 5,715,018 A | 2/1998 | Fasciano et al. | 348/722 |
| 5,715,515 A | 2/1998 | Akins, III et al. | 455/4.1 |
| 5,724,521 A | 3/1998 | Dedrick | 395/226 |
| 5,729,549 A | 3/1998 | Kostreski et al. | 370/522 |
| 5,758,257 A | 5/1998 | Herz et al. | 455/2 |
| 5,761,601 A | 6/1998 | Nemirofsky et al. | 455/3.1 |
| 5,774,170 A | 6/1998 | Hite et al. | 348/9 |
| 5,781,228 A | 7/1998 | Sposato | 348/13 |
| 5,790,176 A | 8/1998 | Craig | 348/13 |
| 5,818,935 A | 10/1998 | Maa | 380/200 |
| 5,828,403 A | 10/1998 | DeRodeff et al. | 348/7 |
| 5,838,314 A | 11/1998 | Neel et al. | 345/327 |
| 5,848,396 A * | 12/1998 | Gerace | 705/10 |
| 5,859,660 A | 1/1999 | Perkins et al. | 348/9 |
| 5,862,324 A | 1/1999 | Collins | 395/200.5 |
| 5,864,823 A | 1/1999 | Levitan | 705/14 |
| 5,870,474 A | 2/1999 | Wasilewski et al. | 380/21 |
| 5,886,731 A | 3/1999 | Ebisawa | 348/9 |
| 5,892,535 A | 4/1999 | Allen et al. | 348/9 |
| 5,909,439 A | 6/1999 | Kuwabara et al. | 370/389 |
| 5,917,830 A | 6/1999 | Chen et al. | 370/487 |
| 5,923,361 A | 7/1999 | Sutton, Jr. | 348/8 |
| 5,930,493 A | 7/1999 | Ottesen et al. | 395/500 |
| 5,940,148 A | 8/1999 | Joseph et al. | 348/845 |
| 5,987,518 A * | 11/1999 | Gotwald | 709/230 |
| 5,999,970 A | 12/1999 | Krisbergh et al. | 725/109 |
| 6,028,600 A | 2/2000 | Rosin et al. | 715/718 |
| 6,205,485 B1 | 3/2001 | Kikinis | 709/231 |
| 6,349,329 B1* | 2/2002 | Mackintosh et al. | 709/219 |
| 6,388,714 B1* | 5/2002 | Schein et al. | 348/563 |
| 6,408,437 B1* | 6/2002 | Hendricks et al. | 725/132 |
| 6,463,586 B1 | 10/2002 | Jerding | 725/37 |
| 6,526,577 B1 | 2/2003 | Knudson et al. | 725/40 |
| 6,754,439 B1* | 6/2004 | Hensley et al. | 386/341 |
| 2001/0001160 A1* | 5/2001 | Shoff et al. | 725/51 |
| 2001/0052001 A1* | 12/2001 | Stern | 709/219 |
| 2001/0056075 A1 | 12/2001 | Gordon et al. | 725/52 |
| 2003/0009758 A1* | 1/2003 | Townsend et al. | 725/39 |
| 2003/0066085 A1* | 4/2003 | Boyer et al. | 725/104 |
| 2003/0188321 A1* | 10/2003 | Shoff et al. | 725/135 |
| 2004/0128686 A1* | 7/2004 | Boyer et al. | 725/51 |
| 2009/0254962 A1* | 10/2009 | Hendricks et al. | 725/116 |

OTHER PUBLICATIONS

Usui, et al., "Multimedia Services in the HDTV MUSE System," IEEE Transactions on Broadcasting, US, IEEE Inc. New York, vol. 42, No. 3, Sep. 1996.

* cited by examiner

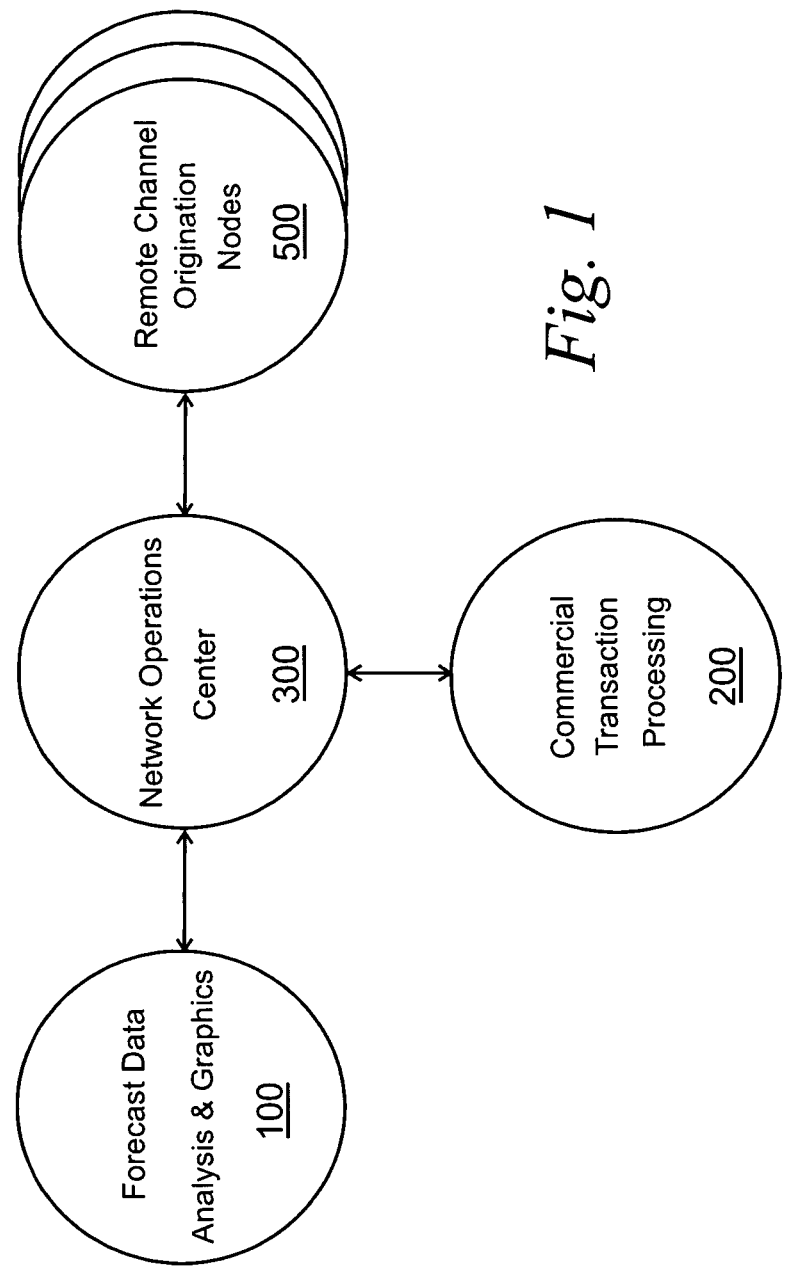

| Version 1.8 | | Monday | Tuesday | ... | Sunday |
|---|---|---|---|---|---|
| West | East | | | | |
| 3:00 | 6:00 | Live | Morning Weather 1 | Morning Weather 1 | ... | Daily Weather 1 |
| 3:30 | 6:30 | Live | Morning Weather 2 | Morning Weather 2 | ... | Daily Weather 2 |
| 4:00 | 7:00 | Live | Morning Weather 3 | Morning Weather 3 | ... | Daily Weather 3 |
| 4:30 | 7:30 | Live | Morning Weather 1 | Morning Weather 1 | ... | Daily Weather 1 |
| 5:00 | 8:00 | Live | Morning Weather 2 | Morning Weather 2 | ... | Daily Weather 2 |
| 5:30 | 8:30 | Live | Morning Weather 3 | Morning Weather 3 | ... | Daily Weather 3 |
| 6:00 | 9:00 | some repeat | | | | |
| 6:30 | 9:30 | some repeat | | | | |
| 7:00 | 10:00 | some repeat | | | | |
| 7:30 | 10:30 | some repeat | | | | |
| 8:00 | 11:00 | some repeat | | | | |
| 8:30 | 11:30 | some repeat | | | | |
| ... | ... | ... | ... | ... | ... | ... |
| 12:00 | 3:00 | repeat | Tomorrow's Weather 1 | Tomorrow's Weather 1 | ... | Tomorrow's Weather 1 |
| 12:30 | 3:30 | repeat | Tomorrow's Weather 2 | Tomorrow's Weather 2 | ... | Tomorrow's Weather 2 |
| 1:00 | 4:00 | repeat | Tomorrow's Weather 3 | Tomorrow's Weather 3 | ... | Tomorrow's Weather 3 |
| 1:30 | 4:30 | repeat | | | | |
| 2:00 | 5:00 | repeat | | | | |
| 2:30 | 5:30 | repeat | | | | |

Fig. 3B

IP HEADER FORMAT

| VER | IHL | TOS | TOTAL LENGTH |
|---|---|---|---|
| IDENTIFICATION | | | FRAGMENT OFFSET |
| TIME-TO-LIVE | PROTOCOL | | HEADER CHECKSUM |
| SOURCE ADDRESS | | | |
| DESTINATION ADDRESS | | | |
| OPTIONS | | | |

Weather Data, Forecast and Graphics Operation

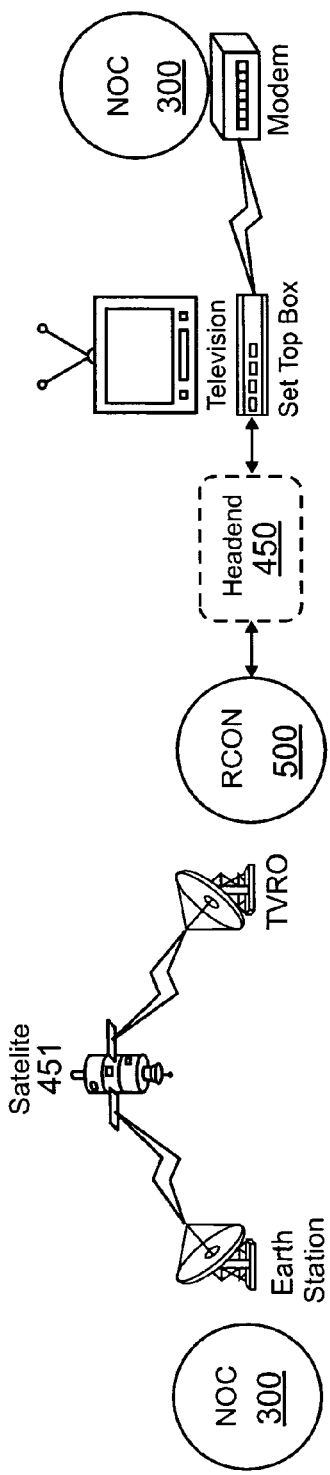
*Fig. 13A* CABLE DISTRIBUTION
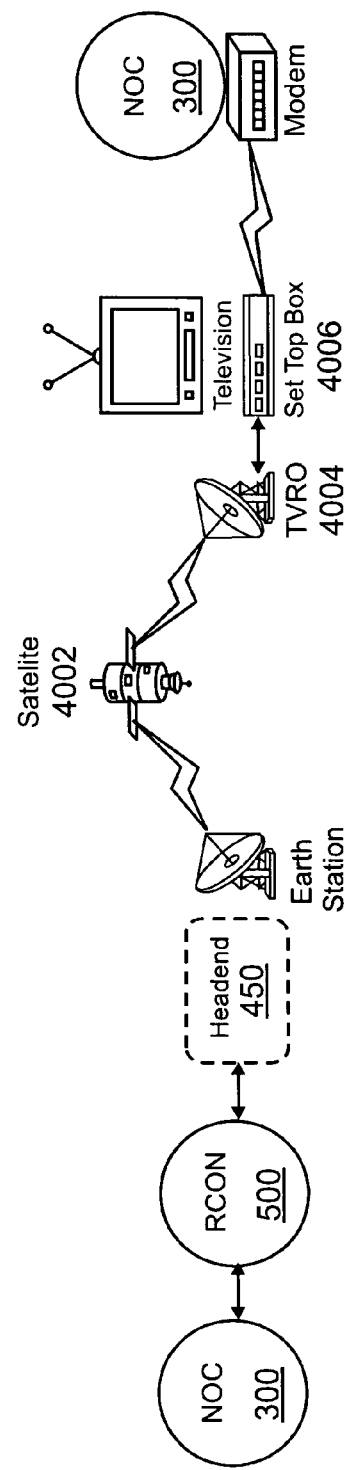
*Fig. 13B* DTH DISTRIBUTION

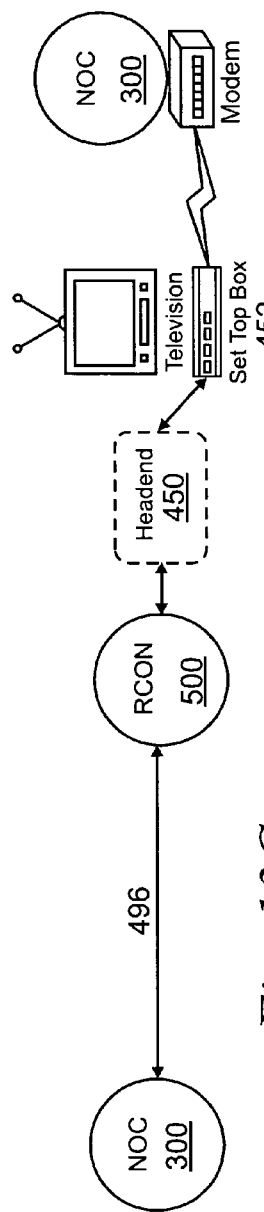
Fig. 13C FIBER DISTRIBUTION
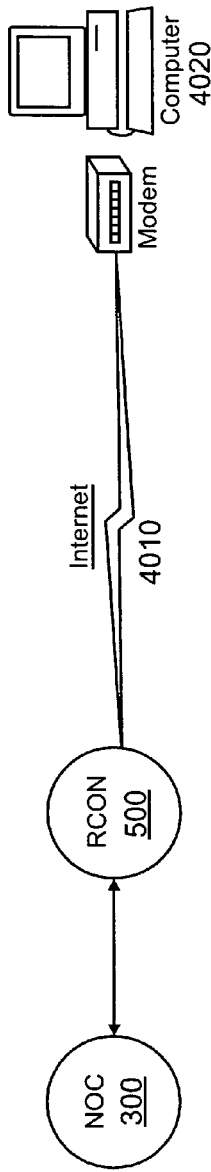
Fig. 13D INTERNET DISTRIBUTION VIA WEB SERVER
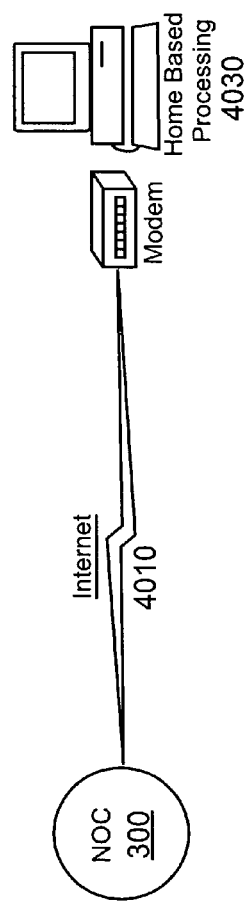
Fig. 13E INTERNET DISTRIBUTION VIA HOME BASED PROCESSING UNIT

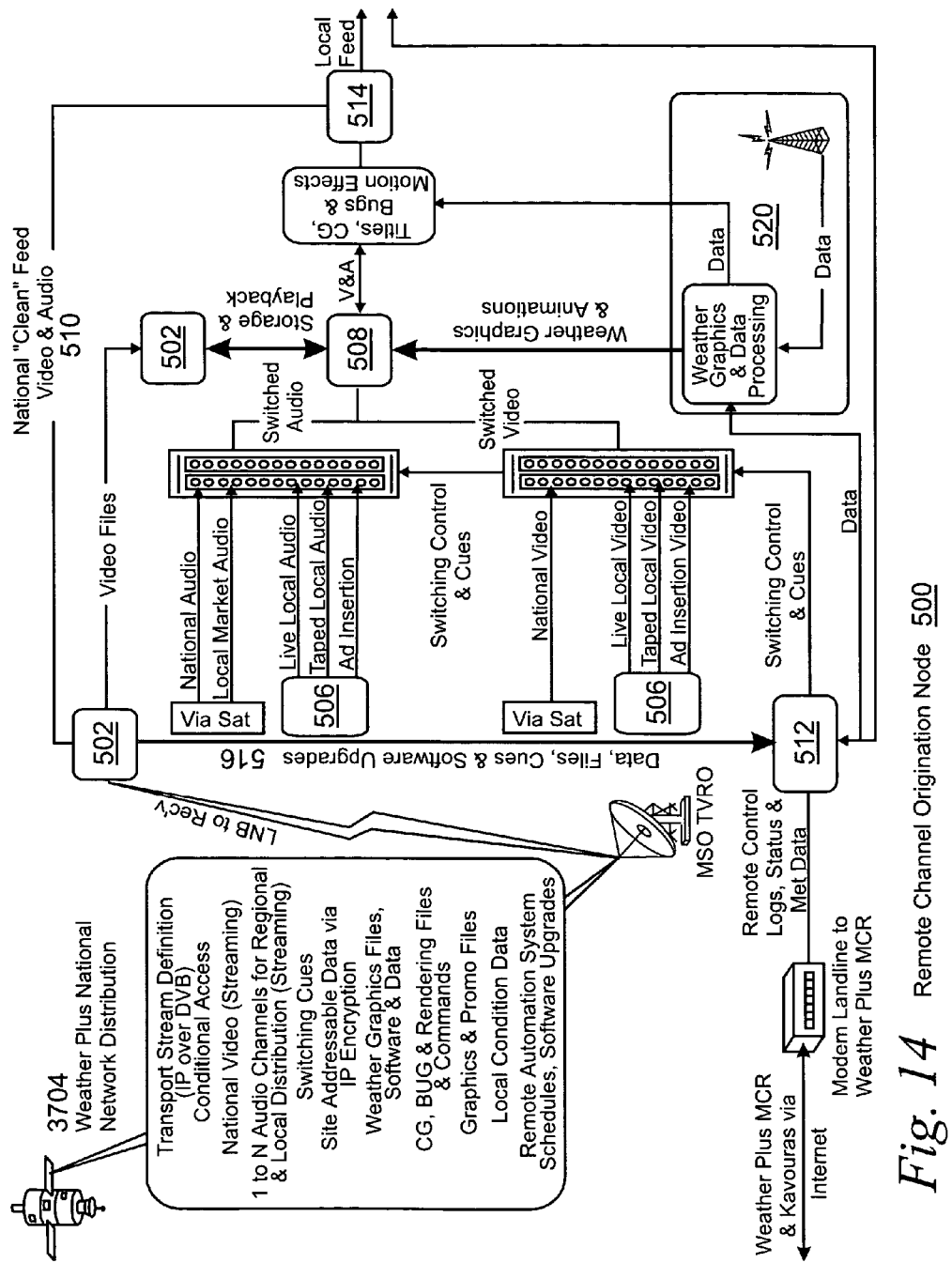

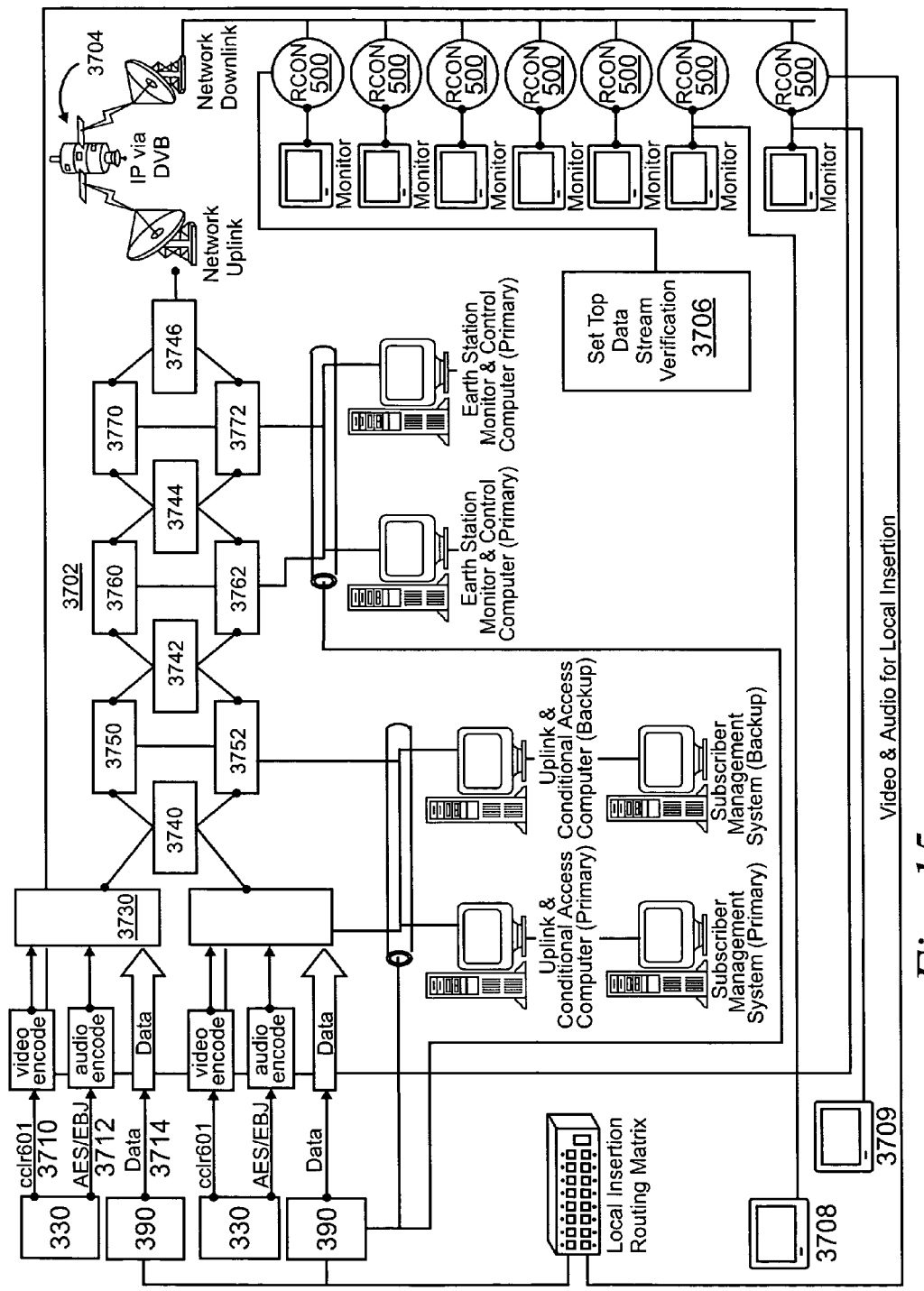
Fig. 15  Network Distribution, Monitor & Control  370

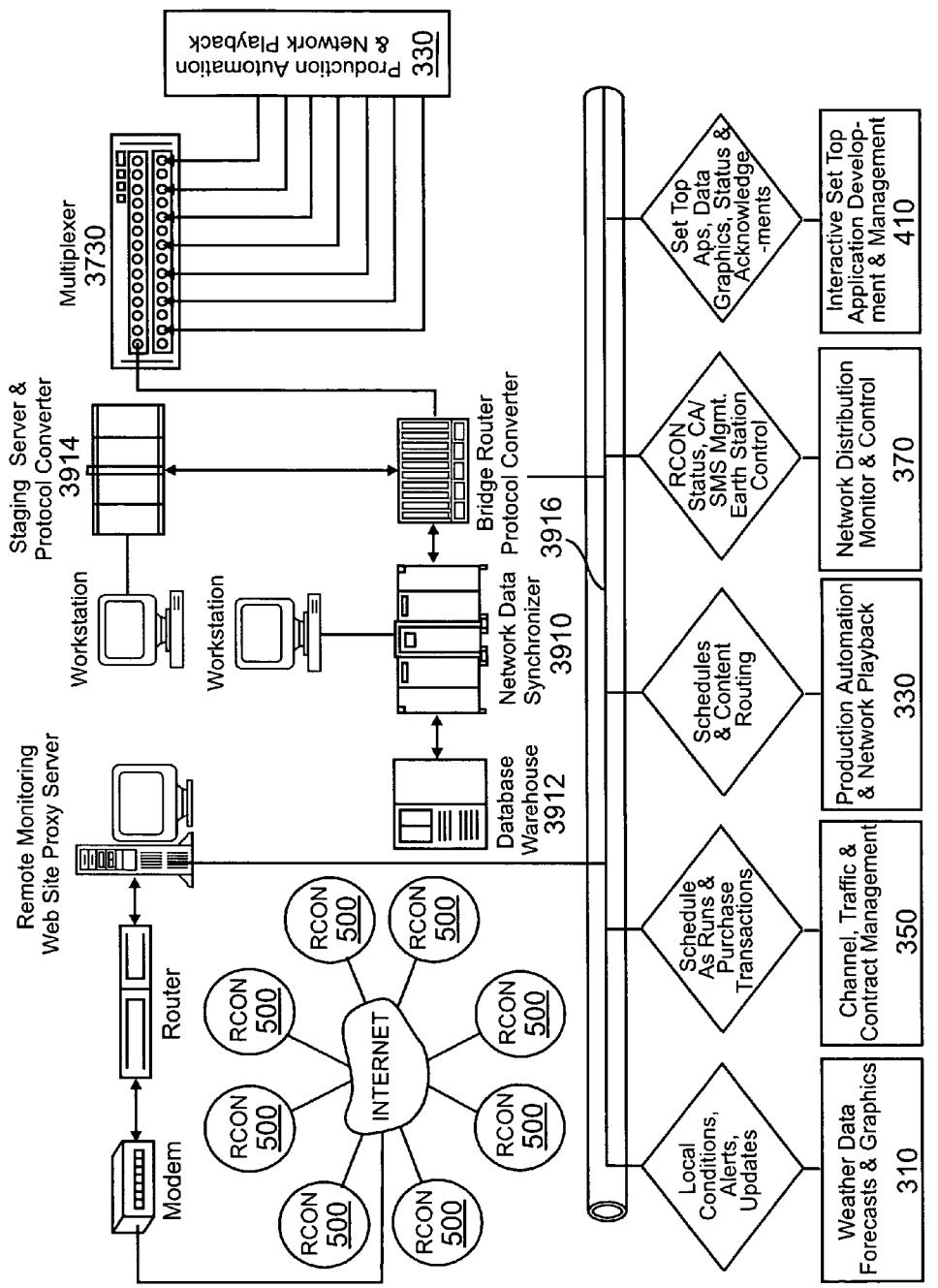
Fig. 16  Network Automation & Integration 390

Fig. 18  GUI for Multi-Windows

ENCAPSULATED, STREAMING MEDIA AUTOMATION AND DISTRIBUTION SYSTEM

FIELD OF INVENTION

This invention relates in general to the automation and distribution of programming information including video, audio, text, and graphics to a large number of program viewers located over a large geographic area. More particularly, it is directed to an integrated, automated production and distribution system for providing customized delivery of digital streaming media to particular geographic areas, markets, groups and/or individuals via remotely controlled origination nodes.

BACKGROUND OF THE INVENTION

Prior to the late seventies, television broadcasting was primarily a static industry whose production and distribution techniques remained largely unchanged since the days of Milton Berle and "I Love Lucy." Even with the advent of color television, the techniques through which ABC, CBS and NBC produced and distributed its network programming remained the same. Using analog and/or manually operated cameras, video tape recorders, playback machines, switchers, lighting and editing systems, these networks generated national programming combined with national commercial content. Programming was distributed to the networks' owned and operated, as well as affiliated TV stations, via national and regional terrestrial microwave systems operated by companies such as AT&T, WTCI, MRC and Western Union/CPI.

Sectionalization of the national TV Networks; i.e., delivery of programming and/or commercial content intended for a specific region and/or time zone, was accomplished by creating ring networks out of the national microwave distribution system by ordering part time "bridging circuits" and "rolling over" numerous tape machines at strategic locations in the national microwave network. For example, programming with the appropriate commercial insertions would be transmitted to the stations between New York City and the Chicago TV affiliate. In Chicago, two manually operated tape machines with commercial content and/or programming destined for the TV affiliates between Chicago and Washington, D.C., as well as for TV affiliates to the west of Chicago, provided the facilities to create two regional Network feeds. The first manually controlled tape machine would "roll over" the New York feed and transmit via a "bridging circuit" connected to microwave facilities on the national network between Chicago and Washington, D.C. In turn, the Washington, D.C. affiliate would have another manually controlled tape machine with commercial and program content destined for the TV affiliates in the Southeast ready to "roll over" the Chicago feed. Meanwhile, the second video tape machine at the Chicago TV affiliate would also "roll over" the New York feed and replace it with commercial and/or program content destined for the TV affiliates to the west of Chicago. Likewise, this technique would be used repeatedly in locations such as Birmingham, Wichita, Denver and other such cities across the network until the programming was sectionalized as desired across the network.

In order to perform switches between national and regional programming without noticeable interruption to the home television viewers, a period of available time was allocated for manually controlled local commercial insertion otherwise know as "local avails." At each of the networks' local affiliates these "local avails" were used as a "window" in which sectionalization of the network could occur.

In addition, AT&T and the other terrestrial microwave providers supported these scheduled sectionaliztions of the various national TV Networks by manually executing time-based switching of the microwave network during these scheduled "local avails." For example, an AT&T network technician would literally run between the racks of communications equipment at certain bridging locations with a patch cord in order to provide the necessary "bridging circuits" during the predetermined "local avail."

With the advent and commercialization of satellite technology in the United States in the 1970's, ABC, CBS, NBC and the Public Broadcasting System all converted their terrestrial microwave distribution systems to satellite distribution during the early 1980's. In general, this decision was made due to the superior economics and flexibility of satellite technologies. As a result, new techniques and support systems needed to be developed in order to accomplish sectionalization and/or customization of the national TV networks.

As a result, the television broadcasting system generally changed from a serial, terrestrial network connecting stations to each other one-by-one via microwave towers, to a point-to-multi-point network where each sectional group was connected directly to the network origination earth station via a satellite link. Accordingly, each sectional group required a separate transponder to receive its designated commercial and programming content. Moreover, just as with a serial network configuration, each of the Network's TV affiliates continued to use its "local avail" as a "window" in which to switch between national, regional and local programming.

In addition, the transition of the U.S. terrestrial TV networks to satellite distribution created the first requirements for computer automation, management, coordination, monitoring, and control systems. The challenge of meeting these requirements resulted in further developments in technology. For example, computerized booking, scheduling and financial management of satellite and telecommunications facilities, origination earth stations, transponders and affiliate receive earth stations, local channels, long distance terrestrial facilities, to name a few, were developed. These systems were typically developed to (1) control and manage the inventory of telecommunications facilities to avoid "overbooking" two users for the same facility, (2) allow allocation of facility charges to be applied to the various network users both internal and external to the respective networks, and to (3) analyze usage to better manage existing facilities, as well as to plan future facilities. The transmission automation systems could also be used to switch facilities and thereby reroute video, audio and data services.

In general, the satellite network control systems installed in the early 1980's and used by the likes of ABC, CBS, NBC and PBS have changed little since their original installation. As the computer technology became more widely available and used computerized network control systems were developed. In the respective broadcast centers of these networks in New York and Washington, D.C., a master computer system capable of transmitting low speed data via either the Vertical Blanking Interval ("VBI") or a Single Channel Per Carrier ("SCPC") transport system sends customized data streams to TV affiliate satellite receivers. This transmitted data instructs the various TV affiliate earth stations to perform a number of functions such as: (1) configuring the TV affiliate earth station to receive the appropriate TV programming by instructing it to point at a specific satellite and tune to a particular transponder and/or center frequency, (2) updating time based schedules and synchronize affiliate clocks, (3) updating network restoral procedures; i.e., instructions as to what to do if the inbound data channel and/or programming channel is lost due to a catastrophic satellite failure, (4) periodic-reporting instructions back to the master computer system via terrestrial data channels such as X.25 packet nets and later frame relay and/or ATM, (5) reporting back to the master computer system as to the status of various components of the affiliate earth station and control system.

Another condition created by the transition to a point-to-multi-point, satellite distribution system was that unauthorized access or "piracy" of programming became an issue. Nearly impossible in a terrestrial, point-to-point microwave system, satellite distribution enabled the "piracy" of programming out of market from major league sporting events, premium cable as well as pay-per-view (PPV) programming. In response, encryption and conditional access systems have been developed. In early implementations Scientific Atlanta B-Mac and General Instrument VideoCypher "scrambling" products were utilized for these purposes. Today, these systems are still in wide use in analog, satellite distribution systems. In general, it can be said that B-Mac was and is utilized more in Europe while VideoCypher was and is utilized more in the United States.

With the development and installation of digital video compression and transmission systems designed for TV, Cable, PPV and DTH program networks in the 1990's, a new generation of encryption and conditional access products has been developed for them. As with the analog encryption products, Scientific Atlanta and General Instruments own the largest U.S. market share for broadcast quality, video compression products with their PowerVu and DigiCypher product lines both of which come bundled with their own conditional access systems.

Outside of the U.S., DVB standards-based video compression systems are the most common. In addition, numerous DVB compatible conditional access systems have been developed by companies such as Nagra, Iredeto, NDS, Telenor, France Telecom, etc. In general, these systems monitor and control the authorization of full-time, occasional, and/or PPV programming and group de-authorization of major league sports for "blackouts" in local markets.

Regarding the key based encryption and conditional access techniques used for the distribution of broadcast quality programming, existing networks utilize systems that were developed for use with broadcast networks; i.e., systems that are configured in either a point-to-point or point-to-multi-point fashion. In short, the programming is encrypted at one end of a transmission link and decrypted at the other end. This being the case, current program distribution networks do not pass encrypted programming through one headend and have it decrypted at an appropriate, downstream headend. During the 1980's and 1990's, the increasing availability and affordability of mini and personal computer computing systems allowed the TV and Cable Networks to automate more and more manual broadcast operations. For example, traffic and station management systems were developed to manage commercial sales and programming contracts as well as to create the daily program schedules and "as run" logs. In short, these systems concentrated on the financial and operational aspects of revenue and expenses; i.e., revenue generating commercials and programming. Originally implemented on mainframe computers, systems of this type are now available on mini and high-end personal computing platforms. Videotape library systems were developed to manage the archival, duplication and usage of video taped programs. Manpower & facility scheduling systems were developed to schedule and analyze the usage of technical manpower and facilities such as studios, tape machines, edit rooms, graphics effects, etc. Network playback automation computers scheduled videotape and/or file server based network playback devices were also developed to reduce the cost and increase the reliability of network playback operations. Studio Automation/Robotics have been used to automate studio lighting and the remote control of camera operations. Newsroom Automation computers and digital video and audio technologies have also been developed to increase the efficiency of newsroom operations; i.e., the coordination and integration of file server, edit and story creation subsystems for the purpose of minimizing the time and effort required to create TV programming. Still & Animated Graphics enable the creation, manipulation and management of computer generated, digital graphics. Digital video compression & transmission provide a means by which the digital bandwidth required to transport video of a certain quality is reduced. Current techniques utilize Discrete Cosine Transfer (DCT) algorithms and standards based formats such as MPEG, JPEG, etc.

Today, network distribution of broadcast quality television programming via terrestrial TV, cable MSO (Multiple System Operator) or DTH (Direct To Home) systems is still accomplished primarily by analog, satellite distribution. Over the past two decades as these broadcast TV technologies have developed, the number of new broadcast, cable and DTH channels has increased from four national networks to hundreds of free, premium and pay-per-view channels. As a general rule of thumb, the newer networks tend to use more of the digital and automation technologies. For example, practically all new networks utilize digital video transmission while to this day, ABC, CBS and NBC, utilize analog satellite distribution for their main network feeds.

Even with the automation and digitization of the TV production and distribution process that has occurred over the last couple of decades, the means of distributing and sectionalizing TV Networks remains essentially the same. Currently, land mass and/or international distribution of "broadcast quality" television is accomplished via satellite. All of these networks are point-to-multi-point networks that employ two alternatives when injecting local and/or regional programming. Either multiple feeds are provided from the network uplink and switched between local commercials or program content is, injected at a local retransmit site such as a cable headend or terrestrial TV station. In both cases, the national and local content is almost always displayed in a common, "full screen" format with the primary exception being the Bloomberg Network which injects national commercials in the video "window" in their multi-part screen format and local commercials at cable headends in a "full screen" format.

These existing systems address basic requirements such as the ability to reduce the digital bandwidth necessary to carry a video signal of any given quality, the ability to transport these: digitally compressed video and audio signals via standard digital transmission and modulation systems whether satellite, fiber, wireless and/or Internet based, and the ability to scramble and control individual authorization of groups and/or specific satellite receivers over a point-to-point and/or multi-point system via the use of key based conditional access and encryption technologies. In most cases, the network and/or regional/sectional programming is distributed from a network headend facility directly to the appropriate redistribution headend. In other words, TV networks are not designed to forward the appropriate program elements both real-time and stored to an automated, remote origination node for customized production, coordination and distribution of broadcast quality localized programming via terrestrial TV, cable MSO, DTH headend, internet web servers and/or home based processing unit With newly launched TV networks, however, the utilization of digital, video compression, conditional access as well as transmission techniques is virtually assured. Previous networks have used one or more combinations of existing analog, satellite distribution, or a hybrid digital, analog approach to transmitting real-time programming and program elements to a headend for retransmission and customized programming for local delivery by inserting full screen graphics and/or video. Even with the utilization of these new technologies, significantly more in the way of integration of digital technologies and product features that can be developed.

Currently, little has been done to implement a comprehensive integration of the various automated and/or digitized portions of the network. While traffic, news room, and playback production automation systems have been integrated to a large degree, little beyond this has been accomplished. The automation systems may extend beyond the production and transmission facilities as network integration advances. Further efficiencies may be realized as the production and broadcast distribution of programming is further integrated and automated using today's technology and future evolving technologies. Further efficiencies in integration and automation will allow greater economy in delivering programming as well as providing greater flexibility in the programming that can be provided. Moreover, as the convergence of computer, TV and telecommunications technologies evolves, broader and broader integration of these automated subsystems will be required to deliver the programming of the next generation.

SUMMARY OF THE INVENTION

The exemplary embodiments of the present invention provide an integrated streaming media system capable of generating and distributing broadcast quality streaming media content to a large number of remote nodes located over a large geographic area. In the exemplary embodiments, the network automation and integration may extend beyond the production and generation facilities to extend the capability of centrally scheduled network control to remote locations, if necessary, where programming content can be specifically customized for the particular remote location and/or region. The exemplary embodiments described herein are numerous and have many different aspects and embodiments, any of which may be practiced by alone or in combination with other aspects of the invention.

According to an exemplary embodiment, the streaming media generation and distribution system includes a broadcast or Network Operations Center, a digital distribution system, and Remote Channel Origination Nodes. The Network Operations Center operates 24 hours a day, 7 days a week and houses the broadcast, production, technical and programming operations of the network. From a wide variety of information sources, the Network Operations Center creates the digital streaming media program content carried by a digital streaming media encapsulated by the IP for distribution to the remote nodes over the satellite network. Preferably, the facility will support the acquisition of programming and information to create the live programming for distribution via encapsulated IP transport techniques.

In the exemplary embodiment, the digital streaming media program content includes weather information data, but in other embodiments may take other forms including news, sports and entertainment programming. The exemplary program production preferably includes acquiring weather information data and graphic feeds from weather information service providers combined with additional data to create the desired programming content. The exemplary system creates a single digital streaming media or digital carrier utilizing encapsulated IP transport techniques to enable the carrying of video, audio, and graphics elements composited to create the delivered multi-window display of the weather information program. The multi-window display screen will preferably be comprised of national, regional and local weather information displayed in different windows of the display screen. The main or primary window of the multi-part screen will switch between different weather forecast segments including national programming segments featuring live on-screen presenters and local segments including graphics and off-camera narration. During the local and regional reports without a live on-camera reporter, an audio narration will be available. The audio will service the particular regional and local segments, with each geographic area receiving an individualized audio narrative explaining and detailing the particular graphics in the primary window.

The network operation center preferably includes a Network Automation and Integration subsystem and Network Monitor Distribution and Control subsystem with specialized computer automated and networked components to digitally assemble the programming components to implement the multi-window program display. The Network Automation and Integration preferably manages the "multi-channel" origination to the remote nodes and coordinates with automated production systems to create the different segments for the multi-part screen with the individualized audio narratives. The facility preferably includes multiple production areas to enable the concurrent production of regional and local weather segments. The automated production systems preferably mange the incoming information, such as weather data, and digitally distribute it to the different production areas for re-formatting and editing.

According to another aspect of the invention, the digital streaming media and encapsulated IP transport layer carries a plurality of program elements and/or components necessary to create a multi-window video display composed of a plurality of display windows and elements containing different multimedia programming content such as video, audio, graphics, text, etc. Moreover, the programming content carried by the encapsulated IP transport layer can be supplemented with program elements or components from a variety of different sources, including those external to the network infrastructure. Program elements such as live, taped and/or stored video, audio and/or graphics may be introduced into the remote channel origination process by way of physical interfaces to a network RCON in order to provide the final broadcast quality, streaming media product in such a way that the multi-part screen display windows may include different national, local and specialty programming as well as locally inserted content. The programming content is thus preferably tailored to groups, subgroups and individuals receiving the streaming content by way of network RCONs across different geographic areas or markets that forward the finished product to retransmission stations, cable and/or Direct To Home ("DTH") headends, web servers and/or home based processing units for final distribution and/or viewing as further described herein.

According to an embodiment of the invention, a number of automated subsystems for the purpose of creating, distributing, monitoring and controlling interactive and/or transactional, streaming media content are integrated to provide customized programming content for individual viewers. In the exemplary embodiment, the Network Automation and Integration function internal to the central Network Operation Center ("NOC") preferably provide the primary means through which NOC subsystems are able to (1) communicate with each other, (2) transfer program elements among each other, (3) maintain version control of program elements, (4) synchronize subsystems to enable the frame accurate compilation of program elements by network RCONs and (5) ensure efficient, timely, accurate and reliable delivery of program elements to network RCONs. The Network Automation and Integration provides the primary means through which schedules, applications, graphics, animated sequences, data, video, audio, switching cues, encryption and conditional access features, interactive program elements, as well as monitor, control and synchronization routines are forwarded to the appropriate, predetermined network RCON to enable the final channel origination process.

According to another aspect of the invention, the encapsulated IP transport layer provides interactive and transactional capabilities allowing viewers to control or select further programming content to be viewed or particular features to be displayed. The interactive/transactional system allows commercial partners to offer products or services to viewers to purchase or select to obtain more information. According to another aspect of the invention, transactional streaming media may allow viewers to select and then conduct a transaction such as allowing the viewer to request or provide further information or purchase a product or service offered to the viewer. The transactional system allows viewers who wish to purchase the product to conduct an electronic commerce transaction to execute the purchase.

These interactive/transactional components are carried and distributed by a digital transmission system utilizing encapsulated IP techniques. This method allows the appropriate interactive applications and data elements to be distributed to a specific, predetermined headend via a specific, predetermined remote node. In this way, an effective overlay, virtual private network ("VPN") is constructed to deliver the appropriate interactive components to the appropriate headend device through a network Remote Channel Origination Node ("RCON") via vendor specified physical interfaces to digital tier, cable headend equipment.

According to another aspect of the invention, an automated production facility includes automated generation and compilation of pre-recorded audio phrases to create customized audio content. An audio concatenation engine will allow an operator to assemble pre-recorded audio phrases to produce local audio segments with a minimum of personnel and overhead, thus resulting in a cost and time savings to the system operator.

The exemplary network operations center preferably supports and synchronizes local insertion at the remote nodes to offer "local avail" opportunities. For example, the system will be developed to support the delivery of localized weather information with audio and data, where each of the remote nodes receiving specific weather data and commercials. The network will preferably deploy insertion capabilities at the remote nodes to enable insertion of local weather programming in addition to local advertising. Preferably, the insertion capability is controlled from the network operations center using a Graphical User Interface application software to enable an operator to integrate, create, edit and control the streaming media content. The Graphical User Interface software provides a system operator with a means to remotely control the streaming media as it is generated by the network RCON for final distribution. Preferably, the software enables the network automation and integration subsystem to synchronize the timing and display of various national and local programming information at the various receiving nodes as is described in more detail herein.

The network distribution and management will enable each of the remote nodes to receive program content and generate customized programming. In this embodiment, the remote content origination nodes are capable of creating the local programming from the received program content according to a program schedule that is centrally generated from the channel, traffic & contract management subsystem internal to the network operations center. Local commercial and/or program insertion is integrated by standard cueing techniques such as use of contact closures and/or tone based switching as well as central scheduling of local playback or insertion facilities.

According to another aspect of the invention, IP (Internet Protocol) encrypted transmission techniques are utilized for simultaneous distribution of streaming media and store & forward components on serial, point-to-multi-point and/or hybrid networks. Preferably, the programming stream will be formatted to enable the multiplexing of a plurality of data streams and/or components for encoding into an IP addressable data stream. IP encryption and conditional access techniques are used to distribute streaming media components. Using the IP technology for delivering the digital program stream provides the network with versatility to deliver highly customized programming for specific geographical areas via a wide variety of network configurations The disclosed embodiments provide many new features and advantages for generating, integrating and distributing information content and customized programming over a large geographic area. The automated subsystems at the network operations center provides for greater levels of network integration and enables an all-digital production facility allowing greater levels of integration and automation to enable more efficient operation of the system with fewer personnel headcount resulting in substantial savings to the system operator. The digital streaming media and IP techniques allows all information, video, audio, data and control information to be distributed through a common digital format. The remote nodes located at the remote locations throughout the geographic area allows locally customized programming to be assembled from national program components and information components assembled with local data or locally produced programming. Control of the programming at the remote nodes may be controlled from the NOC system using a variety application software programs and hardware including networked client-server workstations, file servers, databases, etc.

A Graphical User Interface (GUI) software application program enables the scheduling, configuration, monitoring and control of programming content from a central location. The GUI provides a convenient mechanism for an operator to control, cue and synchronize the programming displayed at remote node. The control and synchronization information can be transmitted to the remote nodes as a component of the multiplexed digital streaming media. A plurality of Graphical User Interface processes can control the multi-window screen display at the remote locations.

The disclosed embodiments provide a number of advantages in implementing a digital transmission system. The automated subsystems provide integration that enables the system operator to achieve efficiency and operational cost savings in delivering customized broadcast quality digital television programming to individual remote locations and nodes. The automated production of audio narration allows the production of voice segments without requiring live on-air personnel. The GUI allows an operator to control, cue and synchronize the programming displayed at remote locations that can be carried by the encapsulated digital streaming media.

The IP encapsulated digital streaming media is single multiplexed pipe that carries broadcast quality programming content to the remote locations and controls the assembly of the programming with locally provided information to create a multi-window television screen display from the Network Operation Center. The encapsulated digital streaming media may also carry components to implement interactive and transactional programming to enable viewers to dynamically select items to viewer, obtain additional desired information and complete electronic commercial transactions for services or goods. Using the embodiments and teachings disclosed herein, greater flexibility in providing customized programming at a low cost can be achieved.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIG. 1 shows a high-level system diagram of an exemplary streaming, interactive media distribution system;

FIGS. 3A and 3B show diagrams of an exemplary embodiment of a programming schedule demonstrating the timing and synchronization of different programming segments;

FIGS. 13A-13E show block diagrams of an exemplary distribution alternative for streaming, interactive media product;

FIG. 14 shows a block diagram of a remote channel origination node for streaming, interactive media product;

FIG. 15 shows a more detailed block diagram of the Network Program Distribution of FIG. 6;

FIG. 16 shows a more detailed block diagram of the Network Automation of FIG. 6;

Figure 2A:
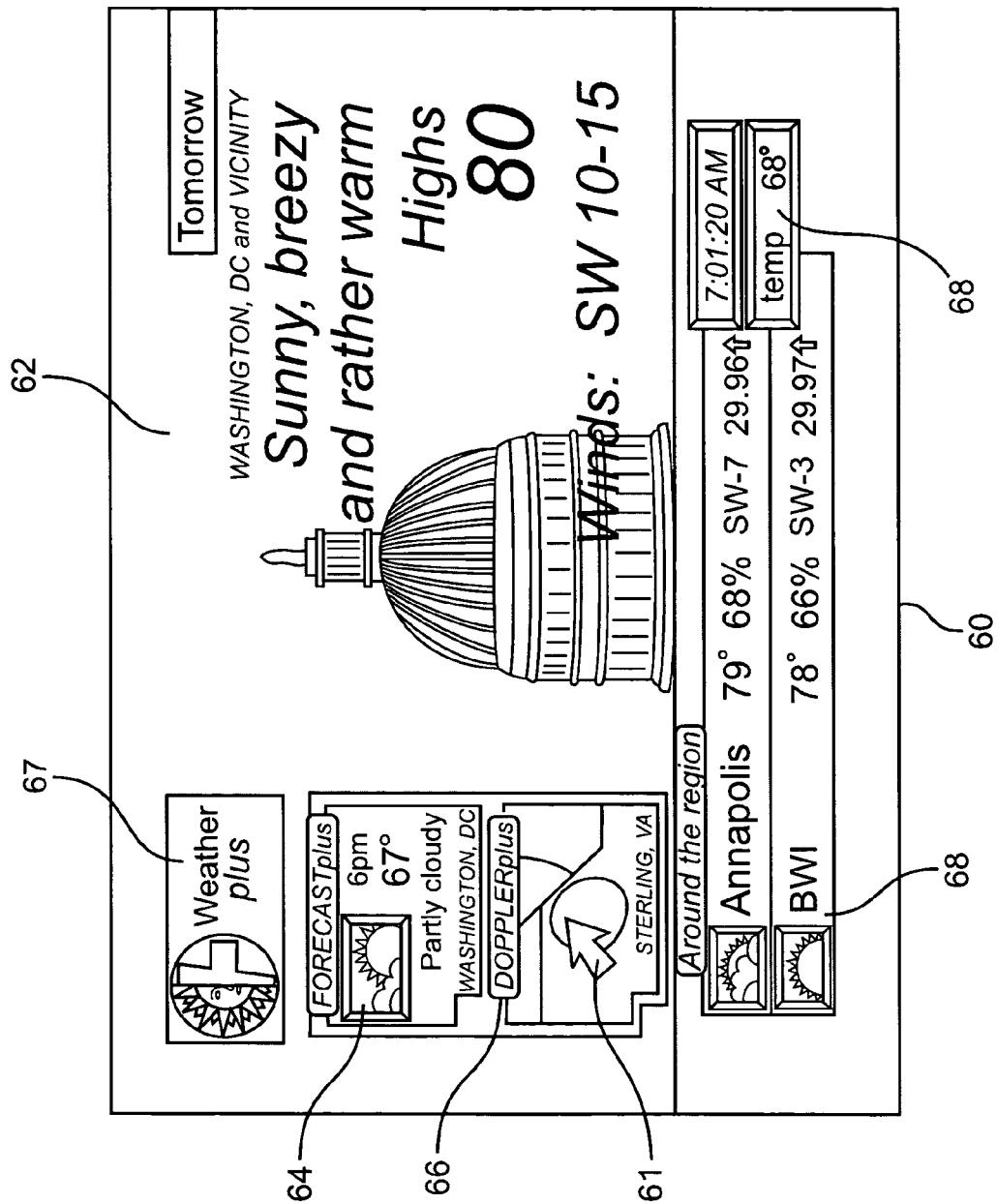
FIGS. 2A and 2B show diagrams of an exemplary embodiment of a multi-part video display with a plurality of display windows illustrating national and local programming segments.

DETAILED DESCRIPTION OF AN
ILLUSTRATIVE EMBODIMENT

FIG. 1 shows a high-level system diagram embodying a streaming media generation and distribution system 50 including streaming media production, distribution, and monitoring and control system employing different aspects of the present invention. Generally, the streaming media distribution system 50 provides programming content that can be distributed over large geographic areas while enabling the capability to provide specific local program content to specific geographic areas, groups and/or individuals. In particular embodiments, interactive streaming media allows viewers to control or select further programming content to be viewed or particular features to be displayed, controlled or selected. In another embodiment, transactional streaming media may allow viewer to select and then conduct a transaction such as but not limited to allowing the viewer to request or provide further information, purchase a product, make a financial wager, manage bank or security accounts, make a contract, process applications and/or control devices.

The streaming media distribution system 50 of the present embodiment integrates a variety of live, rendered and stored program elements, real-time data with taped and/or stored programming, stored and rendered graphics and live & stored local program content and/or effects to provide customized local programming content, programming elements and system components that can be used to provide broadcast-quality streaming media. Broadcast quality streaming media is preferably that suitable for use in video or television programming. These real-time and store and forward components are distributed from a Network Operations Center 300 and to Remote Channel Origination Nodes ("RCONs") 500 to enable the customized provision of local program content to specific geographic areas, groups and/or individuals. The RCONs 500 are connected to headend devices 450 to distribute programming to viewers.

For the purpose of clarification, the real-time elements of the exemplary streaming media product are those video, audio and data components that are either "live," current and/or streaming from the production automation & network playback 330 subsystem. In comparison, store and forward types of program components are ones such as MPEG video and wav audio files that can be transmitted to a remote storage-device for processor controlled and scheduled playback. The significance of the usage of these stored and forwarded program elements such as audio, video, data, software applications, graphics, animated sequences, control scripts for digital effects and/or scheduling, monitor, control and synchronization routines is that this is the means by which automated processes generally associated with NOC 300 operations can be extended beyond the physical infrastructure of the NOC if necessary for the purpose of creating and distributing broadcast quality, customized, streaming media in a multi-part screen format to regions, groups and/or individuals.

For purposes of clarity and ease of description the exemplary network embodiment is shown with regard to the major operational areas identified as: Data Analysis and Graphics 100, Commercial Transaction Processing 200, Network Operations Center 300 and Remote Channel Origination Node 500. It should be understood that the exemplary embodiment may include fewer or additional operational areas, which may be segmented according to different operational or functional areas.

The presently described system may be utilized in a variety of different programming applications, however, the present embodiment is directed to a national weather program distribution system that provides local weather forecasts directed to appropriate geographic areas, groups and/or individuals. It should be understood that the present embodiment may also be utilized for news, sports, or any other type of television programming.

Generally, Data Analysis and Graphics 100 receives and processes data directly from external sources or an information service vendor (not shown) providing data, news, entertainment, sports or weather information. In this exemplary embodiment describing a weather television program, weather data, forecast, analysis, graphics and animated sequences are provided from a weather information service. These sources may include third-party services gathering current and historical information from a variety of sources; i.e., meteorological sensors, radar, archives and/or subcontracted information sources. These information components are gathered, modified and packaged by external vendors 100 of weather related products such as DTN/Kavouras, WSI, Accuweather, etc. Normally, these types of weather vendors differentiate themselves by offering better terms, superior forecasts and/or more realistic graphics and/or animated sequences. The Data Analysis and Graphics 100 sends information to Network Operations Center 300 to produce broadcast quality, customized, streaming media in a multi-part screen format for final distribution to regions, groups and/or individuals.

Generally, Network Operations 300 receives data and information components from the Data Analysis and Graphics 100 such as the weather data, forecast, analysis, graphics and animated sequences. These among other components are used to produce the "ready for air," national network programming feed. The national feed is distributed to Remote Channel Origination Nodes ("RCON") 500 simultaneously with other local programs as well as interactive and/or transaction components and enablers for final rendering of the local channel and distribution to end users via the appropriate headend device. The RCON 500 may include a broadcast distribution system such as a satellite transmission network and a plurality of receiver nodes where each RCON 500 receives only elements meant specifically for that node by way of IP encryption techniques whether in a serial, broadcast and/or hybrid distribution configuration. Several exemplary embodiments are described in more detail in FIGS. 13A-13E.

In this exemplary embodiment, Commercial Transaction Processing 200 includes the operation and organization that markets, sells and supports programming and information products produced and distributed via the network infrastructure. The Commercial Transaction Processing 200 compiles and maintains marketing information such as appropriate graphics, video, pricing, options, technical specifications and shipping information for the various subscribers. Using this information, the NOC 300 and RCON 500 can produce the appropriate programming streams and deliver it to the network as described with reference to the Figures herein.

Television Weather Information Program Product

Figure 2B:
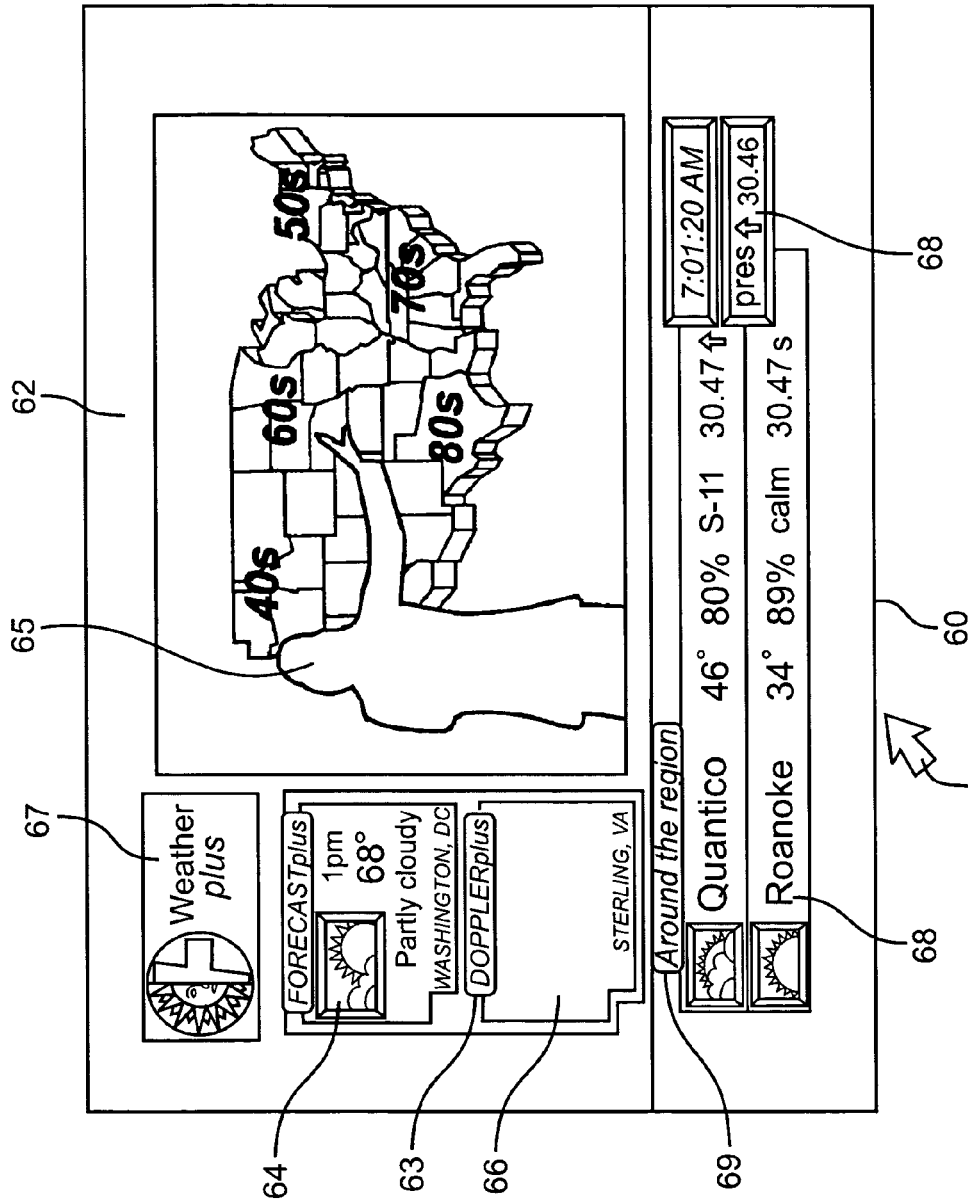

FIGS. 2A and 2B show an exemplary display screen 60 of the television program product delivered by the streaming media system of the presently preferred embodiments. The exemplary television program is a weather information program including a multi-window screen presentation carried by the media stream that has been assembled and transmitted with the exemplary embodiments described herein. FIG. 2A shows an exemplary display screen wherein the main programming window is displaying a still graphic contain local weather information appropriate for the Washington, D.C. area. FIG. 2B shows a similar display screen showing a national weather broadcast with a live on-camera presenter carried by a national feed. The various aspects of the multi-window display are described more completely later.

The multi-window screen overcomes the linearity of conventional television by always having available to the viewer the key weather data that they require in visible display window, no matter what else is happening on screen. With such a constant multi-window screen display 60, the different display windows of the exemplary multi-window television presentation includes a main programming window 62, an number of ancillary windows 64, 66, as well as various information crawls 68.

The main programming window 62 or "Active Video & Graphics Window" in this embodiment is the largest and primary window that will present the ever-changing weather story during national and local segments. This Active Video & Graphics Window 62 features on-camera presenters during programming features of national and international interest such as shown in the main window 62 of FIG. 2B. Preferably, the national feed with national weather stories is cycled to run periodically each hour in the Active Video & Graphics Window 62. Periodically, a program containing local conditions and forecasts directed to certain geographic areas may be shown in the Active Video & Graphics Window 62 to provide items of interest to specific locales such as shown in the main window 62 of FIG. 2A. The exemplary embodiment may use a still graphic with an audio voice over that can be transmitted from a national broadcast center that will be further described herein. Preferably, live commercials will run only in this main window 62 although advertisements and promotions may be shown in other windows of the multi-window display. In addition, there will not be occasions where the main window 62 content takes over the entire screen except in case of an equipment outage or a system failure. An exemplary program schedule that is displayed in the Active Video & Graphics Window 62 is described further in connection to the description of FIGS. 3A and 3B.

Adjacent to the Main Program Window 62, the upper left display window 64 displays the local weather forecast, referred to as ForecastPLUS in this example, which includes still graphic of local weather observations. Preferably, the ForecastPLUS window 64 contains graphics showing forecast local weather observations such as "Sunny," "Overcast," "Partly Cloudy" as well as the local time, temperature, barometric pressure, precipitation, humidity, etc. In other embodiments, the ForecastPLUS Window 64 will periodically cycle between different graphics presentations. Alternatively, the window 64 may show a frequently updated series of maps that show weather forecasts and trends for the Local Coverage Area.

Below the ForecastPLUS Window 64 is another display window 66 which preferably shows the current Doppler Radar Display informs viewers of local precipitation information. Preferably, this window is named the DopplerPLUS Window 66. In other embodiments, the DopplerPLUS Window 64 will periodically cycle between different graphics presentations. Alternatively, the DopplerPLUS window 64 may show a frequently updated series of maps that show weather forecasts and trends for the Local Coverage Area.

In other embodiments, a special Severe Weather Window (not shown) may be included to feature the presentation of graphics and maps showing significant weather events such as blizzards, thunderstorms, tornadoes, hurricanes, flooding, etc. The Severe Weather Window may also cycle between different programming and graphics presenting severe weather conditions or special weather conditions of particular interest. The Severe Weather Window may appear in any of the windows 62, 64, 66, or be shown in its own window, or otherwise appear as a "pop-up" window to highlight severe weather warnings and watches.

In addition to the various display windows described above, a number of information displays may also be provided for viewers as well. For example, at the bottom 68 of the display screen 60 is a 2-line graphic displaying current temperatures and weather conditions for cities throughout the country and the world. This Current Information Display window 68 may feature current weather observations for primary and secondary cities within the region that are also covered in the other windows 64, 66. The weather observations may include temperature, humidity, wind speed, barometric pressure, and a precipitation report. The Current Information Display window 68 may also feature a local conditions continuous display 68 that continuously updates the observed local weather conditions. During severe weather, this window 68 can also be used to display National Weather Service issued ("NWS") advisories, watches and warnings.

It should be understood that, although this embodiment illustrates the multi-window screen display as a two-dimensional display for purposes of clarity, in an interactive television embodiment, the multi-window display, is a three-dimensional display with the ability to view additional programming as selected and driven by the viewer. The viewer may manipulate a screen cursor 61 though a remote control device to select objects 63, 65, 67, 69 in the multi-window display to obtain more information about that object or view any additional programming associated with that object. For example, the WeatherPLUS logo 67 may be selected by the cursor 61 whereupon a graphic or video clip may "pop up" (not shown) or appear in a portion of the screen to explain and describe to the viewer more about WeatherPLUS and who or what WeatherPLUS is. The pop up may offer still further choices about accessing more information such as a web page or contacting the company. The DopplerPLUS logo 63 may be selected and an informational video clip describing what Doppler Radar is and its significance is may be run. In a similar manner a pop up scroll bar may offer numerous different types information ranging from sports scores to traffic travel times, airline flight arrival departure times, gaming and on-line auctions. The selection of items may be provided interactively by viewers such that viewers can dynamically tailor and drive the programming much like a computer user in moving through his desktop or through the Internet. In this case, broadcast quality television rather than computer graphics is utilized.

Figure 3A:
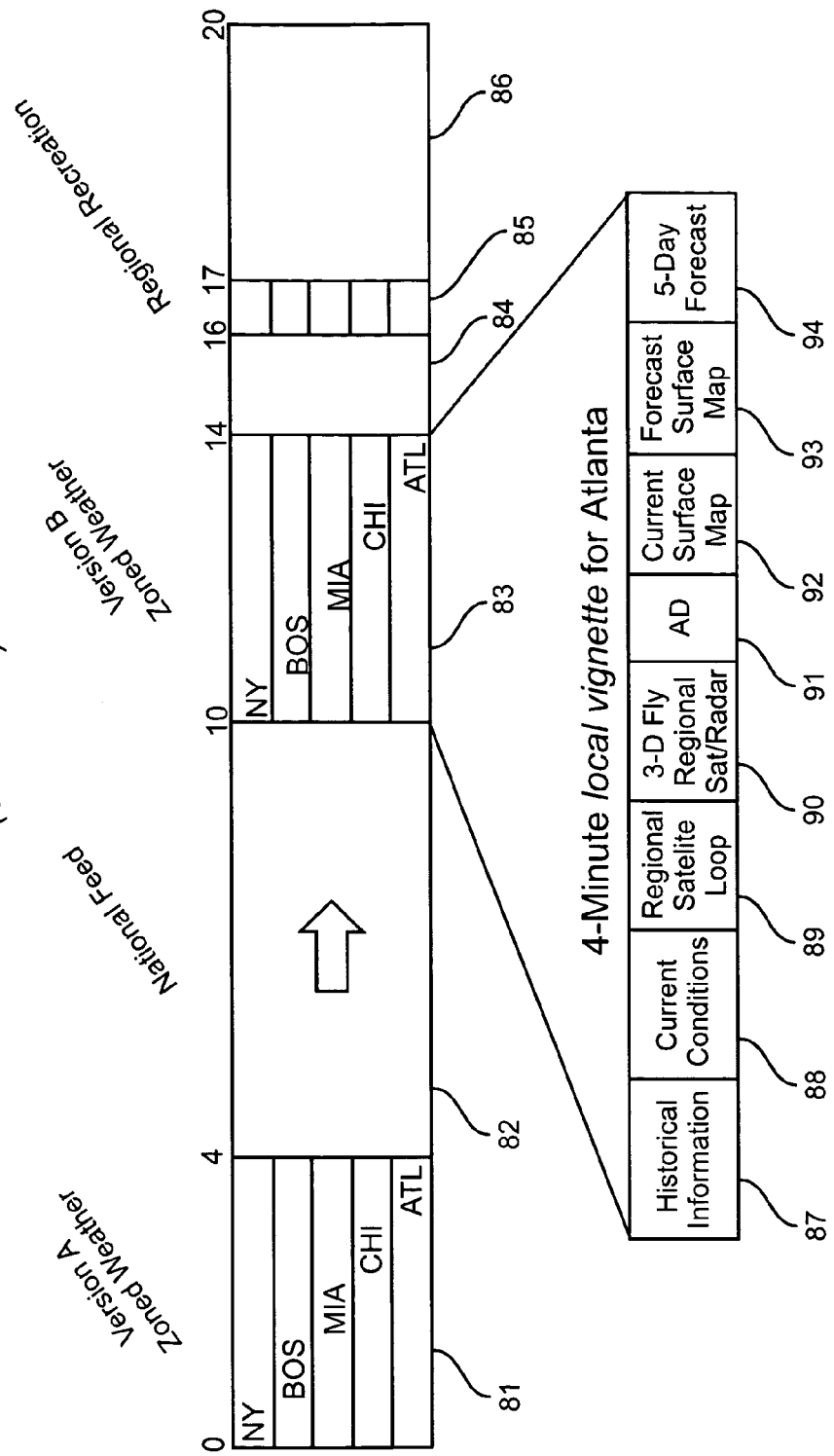

As shown in FIG. 3A, the television weather programming shown in the Active Video & Graphics Window 62 of FIG. 2 is preferably divided into a sequence of periodically repeating program segments 81, 82, 83, 84, 85, and 86. Each segment shows a different programming segment or "story board" as illustrated in the timeline representation of FIG. 3A. Preferably, the system programming enables a network to run essentially live 365 days per year from a central production factory/broadcast center with a constantly rotating schedule of national and local weather reports and features for the multi-window display. As can be appreciated by those skilled in the art, the multi-window displays significantly complicates the programming by increasing the number of necessary programming schedules. For example, each of the multiple display windows may require a programming schedule such as shown in FIG. 3A, resulting in a plurality of overlapping program schedules that must be simultaneously generated and maintained. Discussed below is an exemplary program schedule.

For example, during the first 4 minutes of the displayed program cycle, an hour in this embodiment, a Version A of different zoned weather programs 81 are shown to viewers in the different geographic areas. For example, in the illustrative embodiment different programming is shown for New York, Boston, Miami, Chicago and Atlanta. It should be understood that the described examples are merely illustrative and not meant to be exclusive or exhaustive and other types of programming to a number of other geographic or non geographic markets may be implemented. In addition to the markets shown, a greater number of local markets such as Philadelphia, Denver, Los Angeles may also be included.

At the 4 minute mark in this embodiment, a national feed 82 is transmitted to be seen by all viewers. The national feed 82 typically includes programming features of general interest that is seen by all viewers featuring a live on-camera presenter as seen in the main program window 62 FIG. 2B. At the 10 minute mark, the program content switches to a version B zoned weather 83 which provides specific programming for different geographic areas as described above. FIG. 3A shows an expanded view 83 of the specific programming schedule provided to particular geographic areas, in this example a local vignette for the Atlanta, Ga viewing area. In this exemplary embodiment, the local vignette begins with historical weather 87 information for the Atlanta viewing area followed by current conditions 88, a regional satellite loop 89, 3-dimensional fly-through regional satellite/radar 90, a commercial 91, current and forecast map 92, 93, and a 5-day local forecast 94.

It should be understood that the expanded view 87-94 of the specific programming for a particular geographic area includes a programming schedules for each desired geographic area, resulting in a plurality of overlapping programming schedules for a given time slot. These program schedules can be implemented by media streams carried in a multiplexed streaming media and by locally sourced program content as described herein. The plurality of various programming schedules and the necessary programming content to be carried by the streaming media to execute the programming schedule can be implemented by the embodiments further described herein.

Shown in FIG. 3B is another depiction of the an exemplary Daily Programming Grid 70 illustrating the "macro" scheduling matrix for a "typical" seven day period during the of network operation. The days of the week 71 are arrayed along the horizontal access and the hours of the week 72 vertical axis. To complete programming for an entire year would require a plurality of 52 such program schedules. The programming schedule 70 is actually designed to be day and weekend sensitive, recognizing that there are likely to be different viewers and different viewer interests at different times of the day and on different days of the week. Furthermore, being a live service with the requirement of serving all four time zones in the United States simultaneously, these fine adjustments to the programming mix need themselves to be moderated for different viewer requirements for different parts of the country at the same time.

Overall, the programming scheduling grid 70 preferably employs a matrix or "horizontal grid" programming strategy imbuing the schedule with a high degree of regularity and predictability in the programming schedule on a day-to-day, hour-by-hour basis. In this way, viewers will know what programming to expect at any specific time in the day and can tune in appropriately. Moreover, this consistency may be carried over into the way program segments are arrayed within each hour, as will be demonstrated below. Such consistency may be an important aspect of programming in a cable network environment; viewers come to count on seeing what they expect when they tune in at a certain time.

To accommodate programming in multiple time zones from a common national feed, the programming grid 70 establishes a pattern of programming in three-hour blocks, the formats (but not necessarily the content) of which are then repeated for the benefit of the western time zone. On weekdays until the evening hours, an "A-A, B-B" repeating pattern is set so that the eastern and western time zone viewers get the same type of programming available at the same hour, i.e., the Morning Weather show from 6:00 am to 9:00 am, and the Daily Weather show from 9:00 am to noon. On weekday and Sunday evenings, an "A-B-A" pattern is used so that the same content is available to both coastal time zones between 6:00 p.m. and midnight, albeit in a reverse sequence order. These patterns are fairly subtle, as the great preponderance of weather reporting and forecast material being telecast is live in every instance. However, where there is the ability to reuse segments, such as features, games and shopping shows, these will tend to originate in an "A" block and repeat in the "B," with some of the more durable elements coursing through the schedule and repeating several hours or several days later. On Saturday and on Sunday until evening, the more relaxed Daily Weather format is used continuously, with many of the less time-sensitive weekday features inserted on tape.

A number of programming considerations and principles can be used in the development of programming criteria scheduling. For example, in the early morning hours, the programming will be tuned to viewers who need current weather information to help them plan their day. Accordingly, there is an emphasis on immediate conditions, present-day and five-day forecasts, practical guidance (commuting conditions, domestic and international business travel updates, what to wear) and expected conditions in popular recreational areas during the upcoming weekend. The local segments are bright and upbeat in the manner of morning drive radio.

During the daytime and on weekends, the programming preferably relaxes and adopts a less intense pace. The typical "business weather" features are preferably augmented with greater coverage of leisure travel destinations and injecting fun elements into the schedule such as a call-in weather game (with prizes) and a shopping segment that may sell everything connected with weather, from gargoyle outdoor thermometers to folding umbrellas and miracle car window defoggers.

During the evening and prime time hours, the schedule gradually shifts back to the morning's pattern and intensity, with an emphasis on "tomorrow's weather" and business travel conditions. In the deep overnight hours, say 3:00 am-6:00 am eastern, the prime time sequence will be rebroadcast from tape, unless there is breaking weather to cover in which case live insertions will be made as appropriate in the national and impacted local segments.

The minute-by-minute rundowns of the four different types of hours shown on the daily grid rundowns show the subtle pacing and content differences between the various formats, while still allowing certain major events to occur at the same place in each hour of each day. For example, in the exemplary embodiment the Local Weather segments always begin on the "zeroes," six times each hour. These segments last for four minutes, including a commercial break that divides the "report" from the "feature" elements. National Weather Report segments always begin on the "fours," typically running for two minutes, followed by four minutes of feature material and commercials. Recreational Weather one minute updates are always found at 15 minutes after and 15 minutes before the hour. Severe Weather Reports, beyond what is in the Severe Weather panel of the split screen and what is included in the national reports, is always at 18 and 48 minutes after the hour, if there is anything to report. If there is not, a "canned" feature may be inserted.

A strategy driving the hourly positioning of segments is providing the viewer with a logical, easy-to-understand and recall, predictable and reliable format so they know when and where to find the information they need and want. A second inherent strategy is to keep the pacing lively and up-tempo, which these short segments do. But underlying this is the essential third key strategy of keeping the viewer "hooked" for a minimum of 15 minutes, so that their viewing shows up in Nielsen ratings. To accomplish this, the local and national segments are produced in an "A" and "B" sub format, with enough different information in each that it is necessary to watch two consecutive local and two national segments to get the "whole story." The presenters will adroitly tease and point from one segment to the next to encourage this essential continuity of viewing (without annoying viewers in the process).

These formats result in the following allocation of the program hour among the various types of segments:
- 18 minutes of Local Weather reports and features, representing roughly 30% of the hour's airtime
- 12 minutes (20%) of National Weather reports and forecasts
- 12 minutes (20%) of National Features, including (depending upon the hour) business travel, international weather, games or shopping
- 2 minutes (3%) of Recreational Weather updates
- 4 minutes (7%) of Severe Weather Reports or additional features (in the absence of severe weather to report)
- 8 minutes (13%) of national advertising
- 3 minutes (5%) of local advertising insertion availabilities (which affiliates may or may not use)
- 1 minute (2%) of dedicated promotional messaging for the channel. Additional promos will run as "cover" during the local avails.

Shown in Table A below is a walk through of a typical programming hour, by way of a illustration:

TABLE A

| Minute | Description |
|---|---|
| :00 | At the top of each hour, the first ("A") of two linked Local Weather segments runs. Depending upon the time of day, this is either a 2 minute or a 90 second report, followed by a commercial break. In the break there is one national commercial and one local avail (covered by a channel promo). Following the commercial, there is the "A" portion of a "Local Feature," which (depending upon the time of day and weather conditions) may consist of traffic reports, school closings, community news or "on the ground" call-in reports from spotters. This is an audio only report, augmented by graphics and radar images. |

TABLE A-continued

| Minute | Description |
| --- | --- |
| :04 | At four minutes after, the first ("A") of two linked National Weather reports runs. This segment will include a live on screen presenter and will last for two minutes, covering the national map and major weather news of the day. |
| :06 | At six minutes after, the first National Feature runs, which depending upon the hour is a "Business Weather" or a more general "Worldwide Travel" forecast. The feature includes another national commercial break and lasts, all together, four minutes. |
| :10 | At ten minutes past, the "B" segment of Local Weather is run. It covers a bit of what is in the "A" segment but mostly provides new information and graphics, There is also a one minute commercial break and a feature included. |
| :14 | Coming out of Local Weather, the "B" segment of the National Weather Report runs for two minutes. It is substantially different from the preceding "A" segment in terms of the information conveyed. |

Assuming the viewer tuned in at the top of the hour, he or she has now spent 16 minutes with the channel and received a full local and national weather report, including a valuable weather feature and 3 minutes of commercials. This is the so-called "magic number" of elapsed viewing time that is desired by operators for generating reasonably accurate Nielsen ratings in metered households.

TABLE B

| | |
| --- | --- |
| :16 | At sixteen minutes after the hour, the first of two "Recreational Weather" segments is run, focusing on particular resort destinations. This segment is followed by a promotional spot and another commercial, possibly from a resort destination that ties in with the weather segment. |
| :18 | On the 18 minute mark, a "Severe Weather" report segment will run if there is nationally newsworthy severe weather to cover. In addition, a constant posting of severe weather may occur in a panel of the split screen, which is overwritten locally when there is a weather event occurring in the local market.) If there is nothing to report, a "canned" informational feature (such as, "What is a cloud?") will be inserted. This segment lasts two minutes typically will last two minutes. |
| :20 | At the next "zero," i.e., 20 minutes past the hour, the next Local Weather segment is run, this time another "A." It is delivered live, of course, so while the content will be similar to the previous "A," the delivery and most likely the sequence of graphics will not be entirely the same. Of course, this segment includes the commercial break and Local Feature as well. |
| :24 | At 24 minutes after, the next "A" side of the National Weather report runs with the live on-screen presenter giving it some variety from the previous airing. |
| :26 | At 26 minutes after, another national feature runs. During the morning and prime time hours, this feature is a business-travel oriented International Weather segment, while during the more relaxed format of the daytime and weekend hours, it is the interactive Weather Game. |
| :30 | At 30 minutes past, another major "tune in" point, Local Weather segment "B" runs, with its usual mix of reporting, local and national commercial, and feature. It teases back to the forthcoming "A" segment that will run at :40. |
| :34 | At 34 minutes past, the "B" elements of the National Weather report runs. |
| :36 | At 36 minutes past, the primary National Feature runs, be it Business Weather or World Travel Report. It is likely that there can be some reuse of these segments through the various blocks. |
| :40 | At 40 minutes past, the "A" segment of Local Weather is run. |
| :44 | At 44 minutes after the hour, the "A" side of the National Weather Report runs for two minutes. |
| :46 | At 46 minutes past, the second of the two "Recreational Weather" segments is run, followed by a promo spot and another commercial. |
| :48 | On the 48 minute mark, another "Severe Weather" report or alternative feature is run for two minutes. |
| :50 | At 50 minutes past the hour, the next final "B" Local Weather segment of the hour is run. |

TABLE B-continued

| | |
| --- | --- |
| :54 | At 54 minutes after, the final "B" National Weather segment runs. |
| :56 | With four minutes remaining until the top of the hour, the final feature runs, which would be (depending upon the hour) another International Travel segment (which, again, need not necessarily be refreshed each time it runs) or the Weather Store in-home shopping feature. |

In this embodiment, while the commentary and on-screen presentation will be aired "live" in most instances throughout the day, the meteorological and graphics elements will be recycled and aired for as long as they are still accurate. However, even as graphic elements are being reused, it will be possible to vary the look of the reports by having the presenters change or sequencing, pacing and commentary associated with each graphic.

Figure 4A:
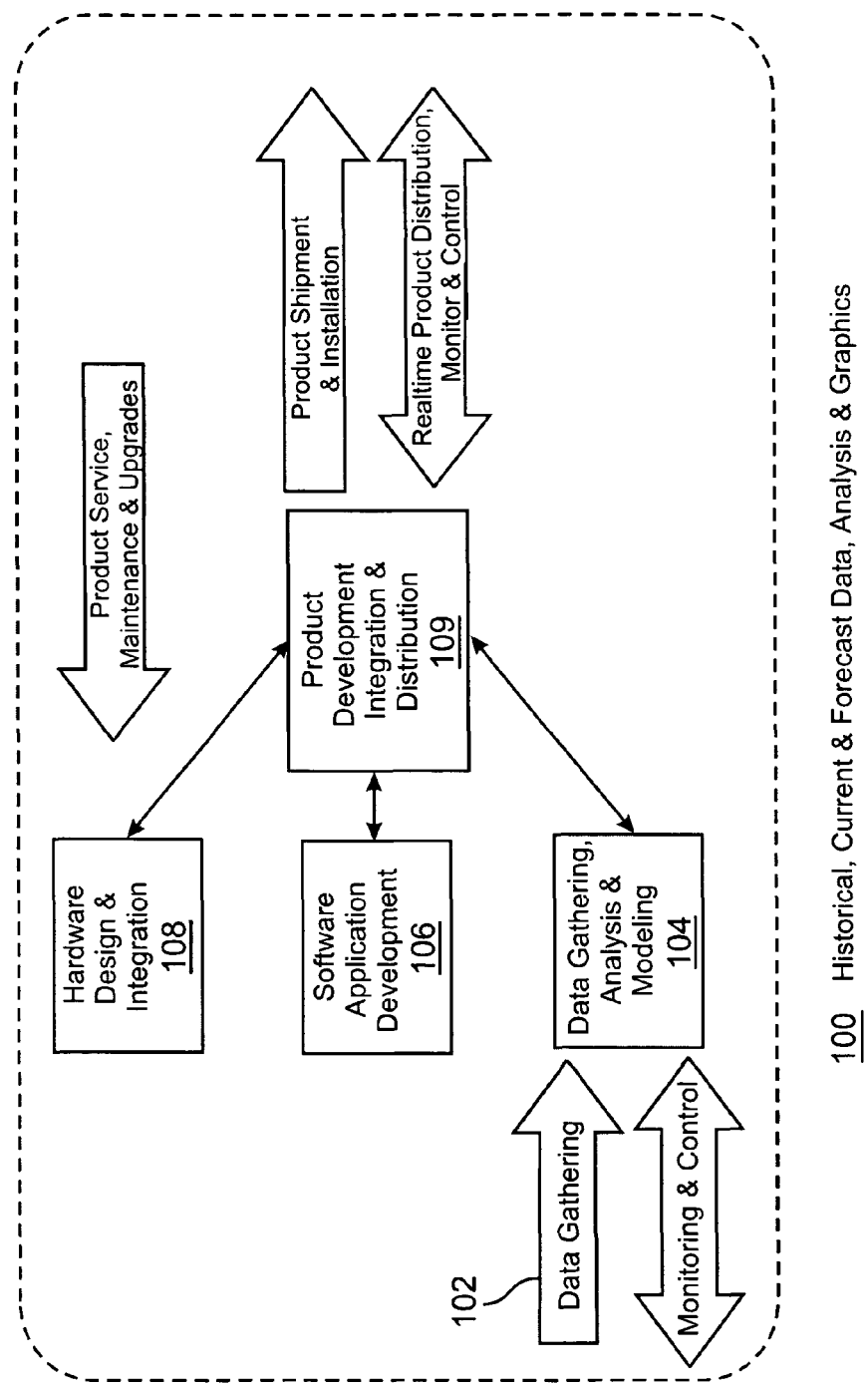
FIGS. 4A and 4B shows high-level block diagrams of an exemplary provider of real-time data, analysis and graphics utilized in the system of FIG. 1.

Referring now to FIG. 4A, shown is a general description of an exemplary embodiment of the Data Analysis and Graphics 100 operation of the system 50 shown in FIG. 1. Data Analysis and Graphics 100 receives data 102 to produce programming content using information from an external or internal source through Data Gathering Analysis and Modeling 104 such as news, sports, entertainment or other information. Preferably, the Data Gathering Analysis and Modeling 104 provides the interface to receive information from external sources and information services supplying information and data to prepare programming content. The particular information sources and data will depend on the particular application. Data Gathering Analysis and Modeling 104 may utilize different interfaces depending on the particular external source and the immediacy of the information. In the exemplary embodiment, for example, a news service, sports information service or a weather information service utilizes a satellite distribution network to transmit updated news sports and weather information. In addition terrestrial landlines may also be used as a backup facility. Hardware and Software Design and Development 106, 108 may be utilized to develop software and hardware applications to process the data and develop information to develop programming content. The outcome of the Hardware and Software Design and Development process 106, 108 is the integration of hardware and software elements into a marketable product as exemplified by the Product Development and Integration process 109 or other production areas for processing and production as will be further described herein. After the product is developed and integrated, 109 the actual distribution of the product requires the on site installation of hardware, software and communications systems necessary to receive data, create products and remotely manage monitoring, control and maintenance tasks which is exemplified in this case by FIG. 9 Weather Data, Analysis, Forecasts & Graphics 310.

Figure 4B:
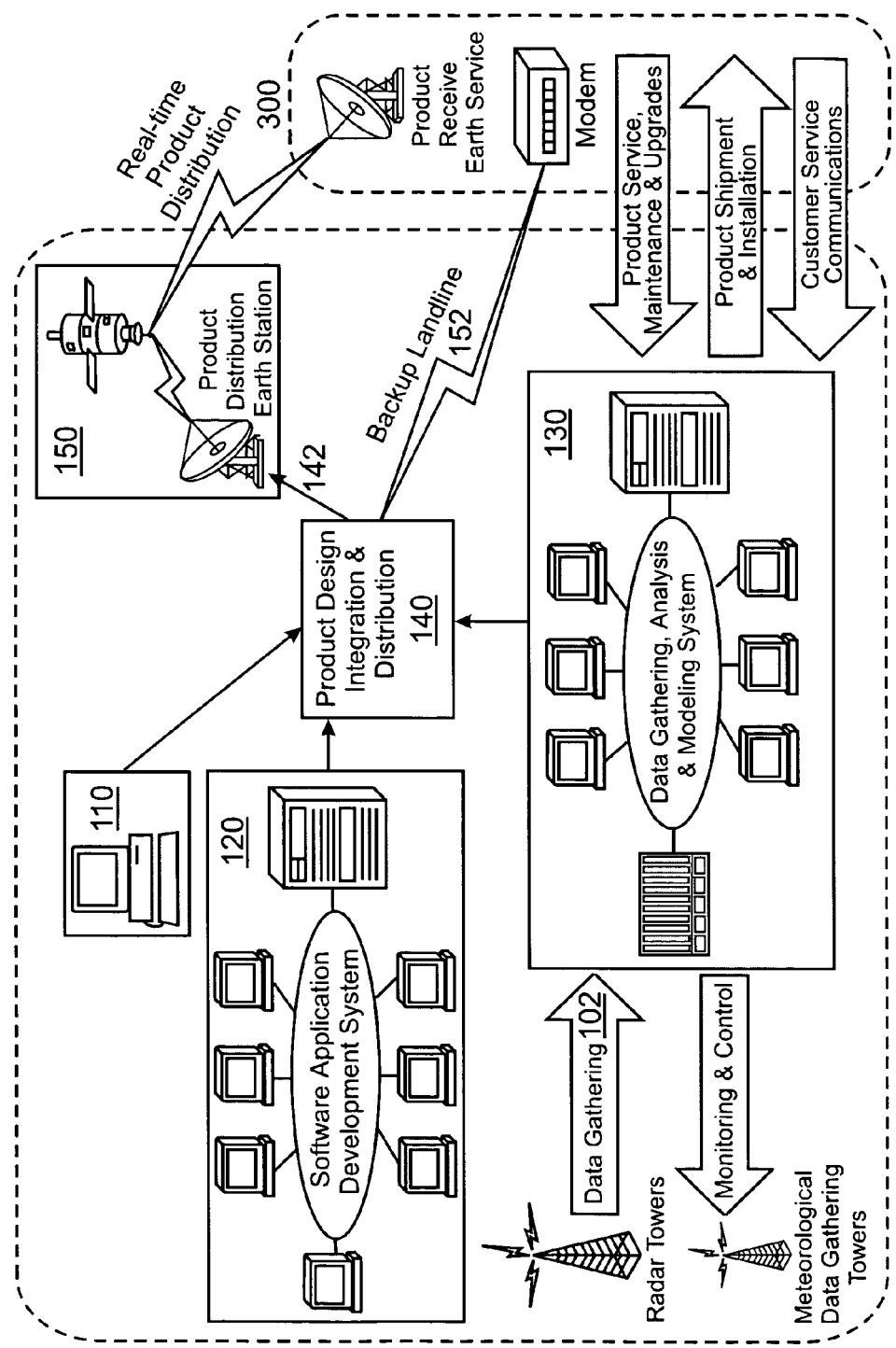

FIG. 4B shows a more detailed description of the Data Analysis and Graphics 100 operation illustrating a particular embodiment implemented for a weather information service provider. The Data Analysis and Graphics 100 operation includes Software and Hardware Design and Development processes 110, 120 that are utilized by Product Design Integration & Distribution 140 to produce weather information products. The particular Software and Hardware Design and Development processes 110, 120 may be utilized to provide computer systems and data services such as workstations to create graphical weather presentations including alerts, temperature displays, radar pictures, fly-through and forecast, to mention just a few. Additional capabilities and features are described herein and still others will be apparent to those skilled in the art.

As seen in FIG. 4B, data is collected from a plurality of meteorological gathering sites over a number of different geographical areas and transmitted to the system. A weather information service such as DTN/Kavouras, WSI, Accuweather, etc. may be contracted to provide data gathering 102 such as weather information. The meteorological data 102 collected may include radar, temperature, humidity, barometric pressure, wind speed and direction, precipitation measurements made at the different geographic locations which are transmitted and reported back to the data communication hub of the Data Gathering and Analysis System 130. The Data Gathering and Analysis System 130 may be implemented using a network client-server architecture with a file server to collect weather information data for analysis and forecasting. The hardware may include personal computers and computer workstations such as Windows NT, Unix, Linux or other comparable systems from Sun Microsystems, Silicon Graphics, or other computer vendors interconnected on a local area network such as an Ethernet network, token ring, ATM or other packet-based computer network.

The Software Application Development System 120 develops and implements software to produce value-added weather information from the collected weather data. For example, the weather information is collected and formatted in appropriate tables, graphics overlaid on weather maps or combined with appropriate graphics or analyzed to produce weather forecasts. The particular weather information analyses are wide and varied and can be developed by meteorologists and computer programmers skilled in the art of using the Hardware and Software systems 310 internal to the NOC. Weather service information providers such as DTN/Kavouras, WSI, NWS Accuweather, as previously mentioned typically provide proprietary software packages to develop weather related information, graphics, radar, etc. The details of the particular functions and implementations are further described herein and still other functions will be apparent to those skilled in the art. The Software Application Development System 120 may also be implemented using a network client-server architecture with a file server to collect weather information data for analysis and forecasting. The hardware may include personal computers and computer workstations such as Windows NT, Unix, Linux or other comparable systems from Sun Microsystems, Silicon Graphics, or other computer vendors interconnected on a local area network such as an Ethernet network, token ring, ATM or other packet-based computer network.

The Product Design Integration & Distribution 140 implements the systems developed by the Hardware and Software development systems 110, 120 to produce the particular information products and program content 142 as data 102 is collected. The Product Design Integration & Distribution 140 system processes incoming data and operates to continually provide updated weather information 142 to be transmitted to the network operations center 300 to produce weather information programming. High capacity data storage devices, file servers and databases from a variety of vendors may be utilized to implement this function.

A real-time Product Distribution System 150 with a satellite distribution system and a backup landline 152 may be utilized to distribute the information product to the Network Operation Center 300 for further production. As shown in FIG. 4B, a satellite distribution system is utilized to distribute the information and products in a real-time or near real-time manner. The Network Operation Center 300 includes an earth receive station to receive real-time information products from the Data Analysis and Graphics 100 operation for processing by the Weather Data Analysis Forecast and Graphics 310 ("VWDA&G"), a subsystem to the NOC 300. In addition, a backup terrestrial or landline 152 may also be utilized as a redundant facility in the case of failure of the primary satellite distribution system. Other operations areas include the exchange and update of product services, maintenance, installation of new services, customer communications between the WDA&G 310 a subsystem to the NOC 300 and the information service provider 100 as needed to operate the system.

Figure 5:
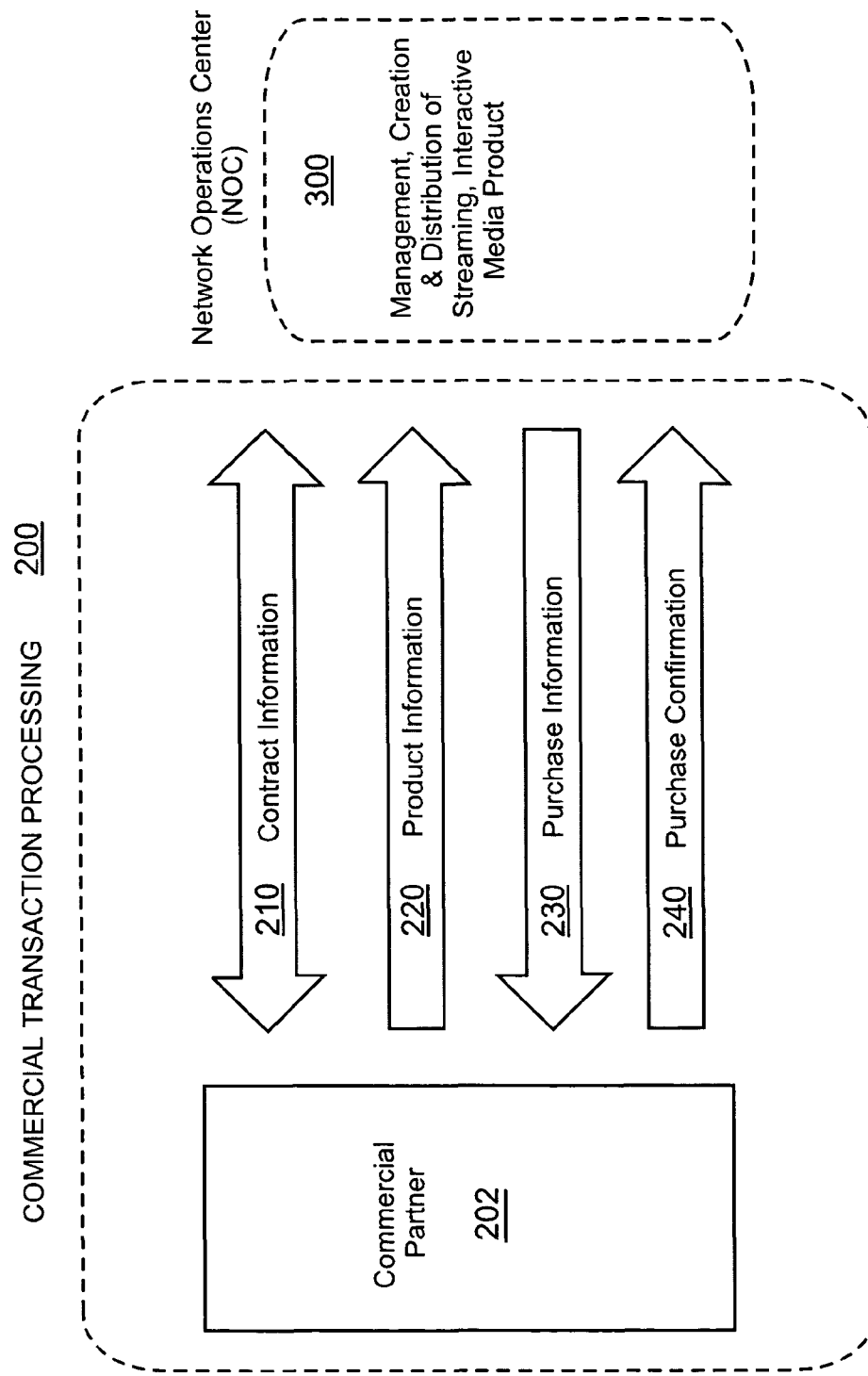
FIG. 5 shows a block diagram of an exemplary on-line commercial transaction processing of FIG. 1.

Referring now to FIG. 5, shown is a general block diagram of a Commercial Transaction Processing system 200 including contract information, product information, purchase information, purchase confirmation to manage the various sales and business aspects of the system. In an exemplary embodiment capable of providing interactive and transactional capabilities, the Commercial Transaction Processing 200 is the process by which an organization or commercial partner 202 external to the system 50 is able to display; market, sell and support its products via the interactive/transactional network infrastructure. Different commercial partners 202 may market or sell products or services interactively through the streaming media capabilities of the network. After securing a negotiated mutually agreeable contract 210, the external commercial partner 202 provides and/or works in cooperation with the system operator to develop sales and marketing information such as graphics, video, pricing, options, technical specifications and shipping information for the product 220. The Commercial Transaction Processing 200 system sends the information to the NOC 300 to produce the appropriate programming product such as sales and marketing information and graphics according to the agreements with the commercial partners. For example, the NOC 300 may include Set Top Application Development and Management 410 as further described in FIG. 12 to produce the appropriate programming for an interactive application. After integrating this information into the appropriate interactive TV platform such as Wink, Open TV, HTML, Java, CGI, etc, the NOC 300 integrates the interactive and/or transactional components into the distribution network to send it onto the RCONs 500 (FIG. 6) for implementation via a downstream device such as a headend.

In general, commonly available online transaction processing systems manufactured and distributed by the likes of NCR, Tandem and others for use in banking, ticketing and other product purchase applications can be modified to exchange data with the Interactive Set Top Application Development & Management 410 and Channel, Traffic & Contract Management 350 systems both of which are internal to the NOC 300. The requirements to exchange data with the CT&CM 350 subsystem is based on the assumption that a processing charge will be assessed by the network on interactive purchases executed via the network infrastructure. Accordingly, the CT&CM 350 subsystem tracks and manages the financial commitments associated with the exemplary online transaction; i.e., (1) was a transaction for a particular product completed, (2) how much was the transaction, (3) what percentage and/or transaction fee is due and (4) have normal billing and payments for this transaction been executed? Regarding data I/O with the Set Top Application Development and Management 410 ("SAD&M") subsystem, the Online Commercial Transaction Processor 200 ("OCTP") system frames the product data in a structurally compatible fashion for the chosen interactive operating system; e.g., Wink, Open TV, HTML, Java, CGI, etc. The type of data imported by the SAD&M 410 subsystem from the OCTP 200 system is generally sales and marketing information such as graphics, video, pricing, options, technical specifications and shipping information.

As the RCONs 500 utilizes encapsulated IP transport techniques to transmitted the different interactive/transactional programming elements, transport of these elements is done in a pretty much an overlay, VPN fashion. In other works, the distribution of interactive/transactional elements from the network SAD&M 410 subsystem to any particular head-end 450 is done so that no interim processing is required; i.e., the interactive application and data elements are transmitted from the SAD&M 410 subsystem to the head-end 450 without change. As with other elements, IP encryption ensures that the proper program elements are delivered to the appropriate network RCON 500. The only remaining consideration then is providing the proper physical interface between the network RCON responsible for delivery of the interactive/transactional elements to the predetermined headend 450 device.

Consequently, the RCONs 500 further distributes programming to headend devices 450 that distribute programming to viewer set top devices. The viewers of interactive programming may select displayed items to view additional information about the product or service and may eventually conduct a transaction to purchase the desired product or service, as further described herein. A return network such as a modem dial up telephone line, wide area network, or Internet connection from the viewer's location to the appropriate transaction can be utilized to allow viewers to return information to request or complete transactions. A number of different return networks may be provided by commercially available interactive television systems.

For example, during a weather program describing wintry weather conditions in the northeast, an airline or travel company may market and sell travel vacations to warm locales such as Florida or the Caribbean. During the wintry weather report, the streaming media carries a graphic advertising the travel vacation that appears in an additional on-screen window such as on of the windows shown in FIGS. 2A and 2B. For example, the window 66 may show a graphic with instructions for viewers to request more information about the product and then eventually purchase the offered product through an electronic commercial transaction. In a particular embodiment, the product can be purchased interactively on-line if the viewer so desires. The on-line transaction is conducted via standard means enabled by interactive operating systems offered or enabled by the likes of Wink, Open TV, HTML, Java, CGI, etc.

Figure 6:
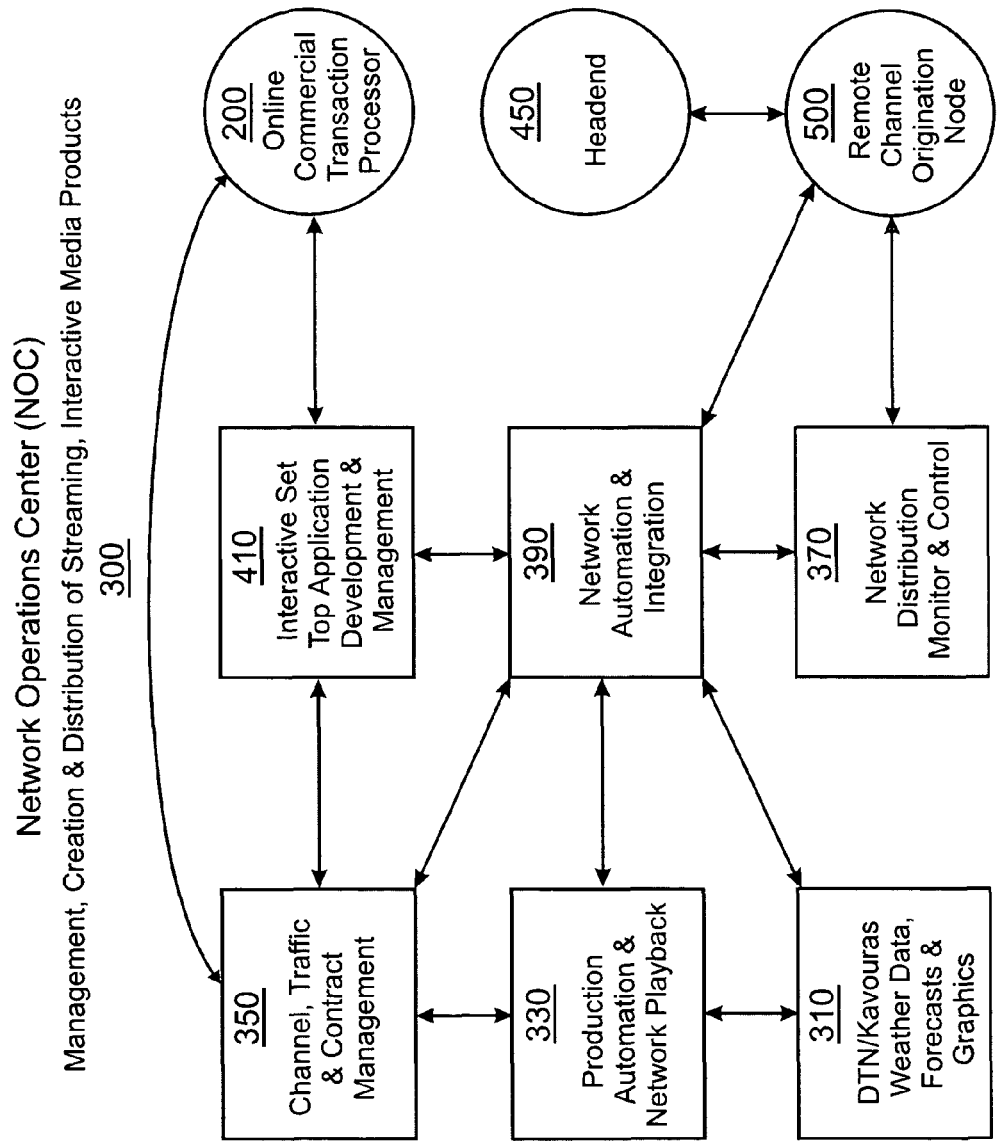
FIG. 6 shows a high-level block diagram of an exemplary Network Operations Center of FIG. 1.

Referring now to FIG. 6, shown is the system Network Operations Center ("NOC") 300 that manages, integrates and automates various production, multiplexing and distribution functions of the system. Generally, the NOC 300 implements and utilizes a distribution network which transmits real-time program and data elements along with store and forward components in a digital streaming media via an IP based Network Distribution, Monitoring and Control System 370 to the various RCONs 500 at remote locations throughout the desired viewing areas. RCON 500 preferably interfaces a plurality of remote nodes including headends 450, which receive streaming media, information products and program elements addressed for that node by way of encapsulated IP, IP encryption and IP addressing techniques whether in a serial, broadcast and/or hybrid distribution configuration. Moreover, RCONs 500 provide the network interface with the downstream headends device 450 so that the interactive application software and real-time data components of the transactional product can be transported to and from the end user's TV computational device which may reside in a set-top box, computer of even within the TV itself. In a preferred embodiment, RCON 500 receives national feed video for programming and also has the capability to assemble local programming and perform commercial insertion using a variety of program elements that may be distributed via the encapsulated IP transport or provided locally. In this embodiment, the headend device 450 is the network facility responsible for final distribution of the streaming media programming to the viewer or end user such as a TV affiliate, a cable system headend, a DTH satellite uplink facility, web server and/or home based processing unit as further described in FIGS. 13A-13E. Further details of the distribution network will be provided herein.

It should be understood that any of the functions, processes and methods of the NOC 300 subsystems shown in FIG. 6 and further described in the FIGS. 9-22 below can be implemented by those skilled in the art with appropriate logic to implement the described methods and functions in application software modules as a set of computer executable software instructions. A computer workstation running the application software includes a Computer Processing Unit ("CPU") or microprocessor to implement the logic that controls the operation of the system. The microprocessor executes software that can be programmed by those of skill in the art to provide the described functionality. The software can be represent as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation.

As see in FIG. 6, the NOC includes a Channel, Traffic, Contract and Management 350 function that receives the input from the Commercial Transaction Processing 200 to document, implement and track the mutually agreed upon contractual arrangements. As noted before, the requirements to exchange data with the CT&CM 350 subsystem is based on the assumption that a processing charge will be assessed by the network on interactive purchases executed via the network infrastructure. Accordingly, the CT&CM 350 subsystem tracks and manages the financial commitments associated with the exemplary online transaction; i.e., (1) was a transaction for a particular product completed, (2) how much was the transaction, (3) what percentage and/or transaction fee is due and (4) have normal billing and payments for this transaction been executed? Account and enterprise systems from a number of suppliers such as Platinum Technologies, SAP, etc.

Channel, Traffic, Contract and Management 350 largely determines and controls the desired capabilities of the system according to the negotiated contractual obligations and authorizations of the subscribers. For example, the management system 350 builds and manages program schedules according to the contractual obligations the system operator has negotiated. The system 350 generates and manages the appropriate plurality of programming schedules (FIGS. 3A and 3B) and the appropriate multi-window screen elements, as well as commercials are inserted to be shown to users at the contracted times. The Management system 350 preferably also tracks the revenues and costs of the operation and allow financial management of the system. An exemplary embodiment of the Channel, Traffic, Contract and Management 350 is described in more detail with reference to FIG. 10.

The Management system 350 communicates to various other subsystems, such as the Production Automation and Network Playback 330, Network Automation and Integration 390 and Set Top Application Development and Management 410 the appropriate information and schedules to enable the production and distribution of the appropriate multi-window program elements to implement the desired distribution of customized program streams. The plurality of program schedules contains the desired programming that is implemented and distributed to viewers by the system 50 to create the customized multi-window display in different geographic areas of the country.

Weather Data Forecasts and Graphics 310 receives weather information data from external third party sources as previously described with reference to FIGS. 4A and 4B and creates programming content products and data such as weather forecasts and information programming content in the form of multimedia content graphics, audio, video, text, etc. Weather Data Forecasts and Graphics 310 as described in more detail with reference to FIG. 9.

Generally, Production Automation & Network Playback 330 and Network Automation and Integration 390 utilize the weather products and data to produce programming content to be carried by encapsulated IP techniques to be distributed to subscribers through RCONs 500. The Production Automation and Network Playback 330 provides the facilities including programming studios and technical operations and equipment to produce and programming content for the system. Production Automation and Network Playback 330 interfaces with Channel, Traffic, Contract and Management 350 to determine and produce the appropriate programming and information content. Production Automation & Network Playback 330 is further described with reference to FIG. 11 and Network Automation & Integration 390, is described further with reference to FIG. 15.

Network Distribution, Monitor & Control 370 provides the means through which streaming as well as "store & forward" program elements are (1) packaged via IP encapsulation and addressed via IP encryption for distribution to various remote channel origination nodes 500, (2) monitored and verified by way of a "quantum" monitoring system consisting of "cloned" RCONs 500 and alarm and status updates from in the field RCONs 500 and (3) controlled for purposes of preemption for weather alerts, restoral of RCON functionality and detailed monitoring of RCON functions. Network Distribution, Monitor & Control 370 is described further in reference to the description of FIG. 15. In this exemplary embodiment, the elements of the streaming media distribution may include IP distribution as the transport "wrapper" of the streaming media including national/common programming elements with associated stored graphic, data, schedules, commands, heuristics and executable software modules is distributed to various remote channel origination nodes. The system may also utilize IP encryption as the means of scrambling distributed program elements on both serial and point to point and/or multi-cast networks.

For the purpose of the exemplary weather information distribution network, IP distribution of the "product" and programming content is configured in a fashion designed to maximize both operational flexibility and/or over all economics of implementing and operating the system. Accordingly, the distribution configuration of the respective TV, Cable, DTH and/or Internet network and/or service will dictate the means in which the network distributes its content to the downstream RCON 500 and network provider. In other words, the distribution of the weather products can be accomplished over any type of transmission system whether terrestrial, wireless, simplex and/or duplex. Moreover, IP transport of the programming products, data, control information, etc. can be accomplished over a variety of standards based telecommunications facilities employing DVB, SONET/SDH, T3, Frame Relay as well as other transmission protocols.

Regarding the IP encryption of broadcast quality, real-time as well as "store and forward" elements of the programming network, the methods employed are very much like those used in Internet based TCP/IP based networks for the routing of requests, files, e-mail, etc. In short, an Internet address in a numeric format such as "205.12.234.231" is used as a unique identifier of the RCON (500) in question. This address is not a permanent feature of the hardware but is assigned to specific hardware. Accordingly, this Internet address is not hardware specific and can also be reassigned to other hardware.

In the case of the exemplary weather network, an asymmetrical configuration composed of a simplex IP transmit via DVB satellite circuit (see FIG. 7) and a duplex internet connection for monitoring and control via normal on demand, dial up connection to the Internet is utilized.

IP Security (IPSec) and/or Encryption

In an exemplary embodiment, IPSec is a framework of open standards for ensuring secure private communications over the Internet that is provided by an equipment manufacturer such as Cisco Systems, Inc. Based on standards developed by the Internet Engineering Task Force (IETF), IPSec ensures confidentiality, integrity, and authenticity of data communications across a public network. IPSec provides a necessary component of a standards-based, flexible solution for deploying a network-wide security policy.

| Feature | Comment/Description | Benefit |
| --- | --- | --- |
| Confidentiality, Integrity and Authenticity of Data | IPSec provides these foundation network services through encryption and authentication technologies | Data can be transmitted across a public network without fear of observation, modification, or spoofing. This enables applications such as VPNs, extranets, and remote users. |
| Integrated Solution | IPSec is available as a software-only upgrade to the network infrastructure | Security can be implemented without costly changes to every computer, providing great cost savings because only The infrastructure needs to be changed. |
| Certificate Support | Devices are automatically authenticated using digital certificates. | This feature scales to large networks that require secure connections between many devices. |

-continued

| Feature | Comment/Description | Benefit |
| --- | --- | --- |
| IKE | This protocol is used to automatically negotiate security associations. | It enables specific secure communications without costly manual preconfiguration. |
| Flexible Security Policies | Traffic can be selected for encryption based on extended access lists. | Selected traffic can be encrypted to increase overall performance. Different classifications of data can be encrypted with different keys or different algorithms. |
| Standard Solution | IPSec is an emerging IETF standard on the IETF standards track. | IPSec allows multivendor interoperability among network devices, PCs, and other computing systems. |

The following is a detailed example of one approach to the implementation of IP Sec that can be used to implement the present embodiment.

IPSec—IPSec uses encryption technology to provide data confidentiality, integrity, and authenticity between participating peers in a private network. Cisco provides full Encapsulating Security Payload (ESP) and Authentication Header (AH) support.

IKE—The Internet Key Exchange (IKE), formerly known as the Internet Security Association Key Management Protocol or ISAKMP/Oakley) provides security association management. IKE authenticates each peer in an IPSec transaction, negotiates security policy, and handles the exchange of session keys. Cisco has been leading the standardization effort for IKE by writing IETF Internet drafts and by making a freeware version of IKE available on the Internet.

Certificate management—Cisco fully supports the X509.V3 certificate system for device authentication. Cisco and Verisign have developed the certificate enrollment Protocol (CeP), a protocol for communicating with certificate authorities. Several vendors, including Verisign and Entrust Technologies, will support Cisco CEP and be interoperable with Cisco devices. This certificate solution supports hierarchical certificate structures and the cross-certification necessary for a public key infrastructure (PKI) solution.

The component technologies which are available and can be practiced by those skilled in the art include:

Diffie-Hellman, a public-key method for key exchange— This feature is used within IKE to establish ephemeral session keys.

DES—The Data Encryption Standard (DES) is used to encrypt packet data.

MD5/SHA—The Message Digest 5/SHA hash algorithms are used to authenticate packet data.

IPSec in Cisco IOS software supports the following standards:

Current RFCs and Internet drafts for IPSec and IKE:

ESP is per draft-ietf-ipsec-esp-v2-04.txt

AH is per draft-ietf-ipsec-auth-header-05.txt

IKE is per draft-ietf-ipsec-ISAKMP/Oakley-07.txt

Entire IPSec implementation is per draft-ietf-ipsec-arch-sec-04.txt (Security Architecture for the Internet Protocol)

IPSec and IKE encryption algorithms including:

DES-CBC with Explicit IV 40-bit DES-CBC with Explicit IV

DES-CBC with Derived IV as specified in RFC 1829

Authentication algorithms:

HMAC-MD5

HMAC-SHA

Keyed MD5 as specified in RFC 1828

This use of IP encryption combined with IP transmission techniques enables the distribution of broadcast quality, real-time as well as "store and forward" elements of the programming product via a wide variety of network configurations so that only a specific, downstream RCON (500) receives the material in question. Just in the same fashion in which encrypted e-mail sent via the Internet destined for a specific PC is received only by that PC. These IP techniques enables a wide variety of file types and/or protocols to be "packaged" and/or encapsulated by way of the addition of IP header information (see FIG. 8) for transmission via the chosen network configuration so that upon arrival at the appropriate RCON as specified by its IP addressing and other security matters the original file type and/or protocols can be unwrapped for distribution to the appropriate downstream processes. This is opposed to current approaches that assign a permanent ID to each integrated receiver decoder (IRD) in a point to multi-point satellite network. The current state of the art in broadcast quality network monitor and control involves the management of digital distribution of compressed video, audio and data via a statistically multiplexed satellite distribution system such as provided by the Divicom Inc. of Milpitas, Calif. as well as other suppliers.

Figures 7, 8:
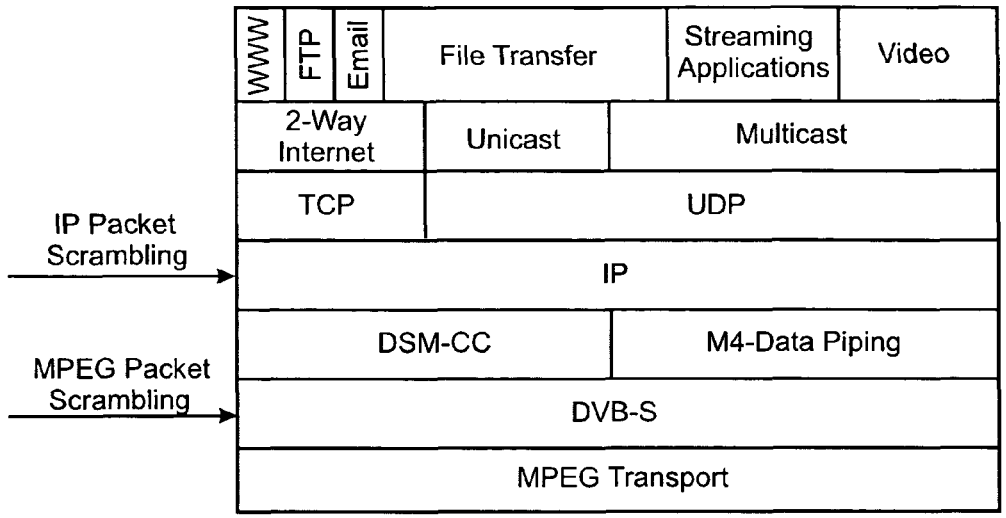
FIG. 7 shows a diagram depicting the delivery of scrambled IP packets via a satellite based DVB distribution system.
FIG. 8 shows a diagram depicting the format of IP header information.

Preferably, the exemplary distribution system transmits programming as digital multimedia streaming media including MPEG-2 digital video, graphics, audio and control data using DVB digital broadcast standards and TCP/IP protocols. The exemplary system uses layers of transmission protocols implemented according to the OSI communication model to package and deliver the digital multimedia information over the satellite broadcast system. FIG. 7 diagrammatically shows the different transport packet layers.

At the lowest MPEG layer 1002, all video, audio and multimedia data are processed as entirely digital data information that is multiplexed, compressed, and packaged into fixed-length MPEG packets. The multimedia information broadcast from the NOC 300 to the RCON 500 receivers are in the form of digital information segregated and assembled into packets. The exemplary system transmits only digital multimedia information. Analog video or audio data such as NTSC or conventional analog video signals and control information are not transmitted from the NOC 300 and remote locations. MPEG-2 compression allows picture information to be compressed to bandwidth that can be carried by digital signals.

At the DVB layer 1004, processing according to DVB standards including forward-error-correction, scrambling, randomizing, interleaving, and modulation are added to the digital MPEG packets.

At the IP layer 1006, IP transport information is added to the DVB packets, including the appropriate IP address of the RCON 500 unit that is to receive the packet. The TCP/IP transmission protocol is a communication protocol commonly used to transport packetized-messages over the Internet. The data packets are also encrypted or scrambled at the IP layer to provide conditional-access to only authorized subscribers.

Scrambling at any protocol layer protects that layer and every layer above it from unauthorized access or otherwise being received. Thus, encryption or scrambling at the IP packet layer protects the information content at the higher layer to allow only selected subscribers to receive the information content. A number of different scrambling techniques can be used. In the planned system, IP packets are encrypted using standard encryption techniques that "mix" the original data with a "key" known only to the subscribers authorized to receive messages. By knowing the appropriate key and the method used to mixing the original data with the key ("scrambling algorithm"), a subscriber can decrypt the message and recover the original data. The RCON 500 receivers are provided with the appropriate "key" to decrypt the IP packets addressed to that unit.

To receive the streaming media, RCON 500 units are placed at the cable television system headends to receive the satellite broadcasts. Each RCON 500 unit will be assigned an IP address to uniquely identify each unit. In an IP network, each RCON 500 unit has its own unique IP address. An IP address is commonly represented as a series of four numbers, each less than 256, separated by periods as shown below:

192.112.36.5

128.174.5.6

The transmitted digital multimedia data and control information is packaged in TCP/IP protocol packets or IP datagrams. The satellite transmission system broadcasts streaming media with an encrypted IP address and transport protocol. A diagrammatic example of an IP datagram header is shown in FIG. 8.

In operation, the RCON units receive IP packets addressed to its IP address and passes on IP packets addressed to other IP addresses. To access encrypted IP packets addressed to it, a RCON unit must have both the proper IP address to receive the encrypted packets and the appropriate key to decrypt the packet. First, only the RCON 500 unit with the appropriate IP address can capture encrypted IP packets addressed to the IP address. The IP address allows the system to broadcast multimedia information to a particular RCON 500 unit. For example, because RCON 500 units may be located over a wide geographic area, weather information will necessarily vary for receivers in different geographic areas. The system is capable of directing customized local weather programs to the appropriate RCON 500 units using the IP addressing scheme.

In addition to the proper IP address, to actually access the information in encrypted IP packets received by a RCON 500 unit, the RCON must also have a decryption key to decrypt packets as described above. The exemplary system uses Media4's MediaStream product or other similar commercially available products to implement and utilize IP addressing and encryption over a satellite transmission system. Media4's MediaStream product scrambles or encrypts the IP packets to distribute it over a satellite transmission system to the RCON unit with the appropriate address. Thus, the encrypted Transmission Control Protocol/Internet Protocol ("TCP/IP Encryption") allows the system to distribute customized local weather information to appropriate subscribers. Using IP addresses and encrypted digital packets, the receiving audience can be selected as desired. Each RCON 500 unit has its own unique IP address and receives only multimedia weather information addressed to the RCON 500 with that IP address. Only a receiver with the proper IP address to capture the packets and, the appropriate key to decrypt the IP packet can receive the packet.

This use of IP encryption combined with IP transmission techniques enables the distribution of broadcast quality, real-time as well as "store and forward" elements of the programming product via serial networks so that only a specific, downstream RCON 500 receives the desired information. Just in the same fashion in which encrypted e-mail sent via the Internet destined for a specific network device or personal computer is received only by that device. This is opposed to current approaches that assign a permanent ID to each integrated receiver decoder ("IRD") or utilize a variable indexed address list to modify addresses in a point to multi-point satellite network. The current state of the art in broadcast quality network monitor & control involves the management of digital distribution of compressed video, audio and data via a statistically multiplexed satellite distribution system.

Generally, Set Top Application Development & Management 410 may allow the system, if desired, to develop the necessary software elements and graphics to implement interactive television where viewers may request information from available selections that are offer to them and provide further responses as desired. The Set Top Application Development & Management 410 may also allow the system with transactional capabilities to provide on-line transactions to be conducted by program viewers. The Set Top Application Development & Management 410 may generates the computer graphics and capabilities necessary to implement interactive/transactional television. Set Top Application Development & Management 410 is described in more detail with reference to FIG. 12.

Weather Data, Analysis, Forecasts and Graphics

Figure 9:
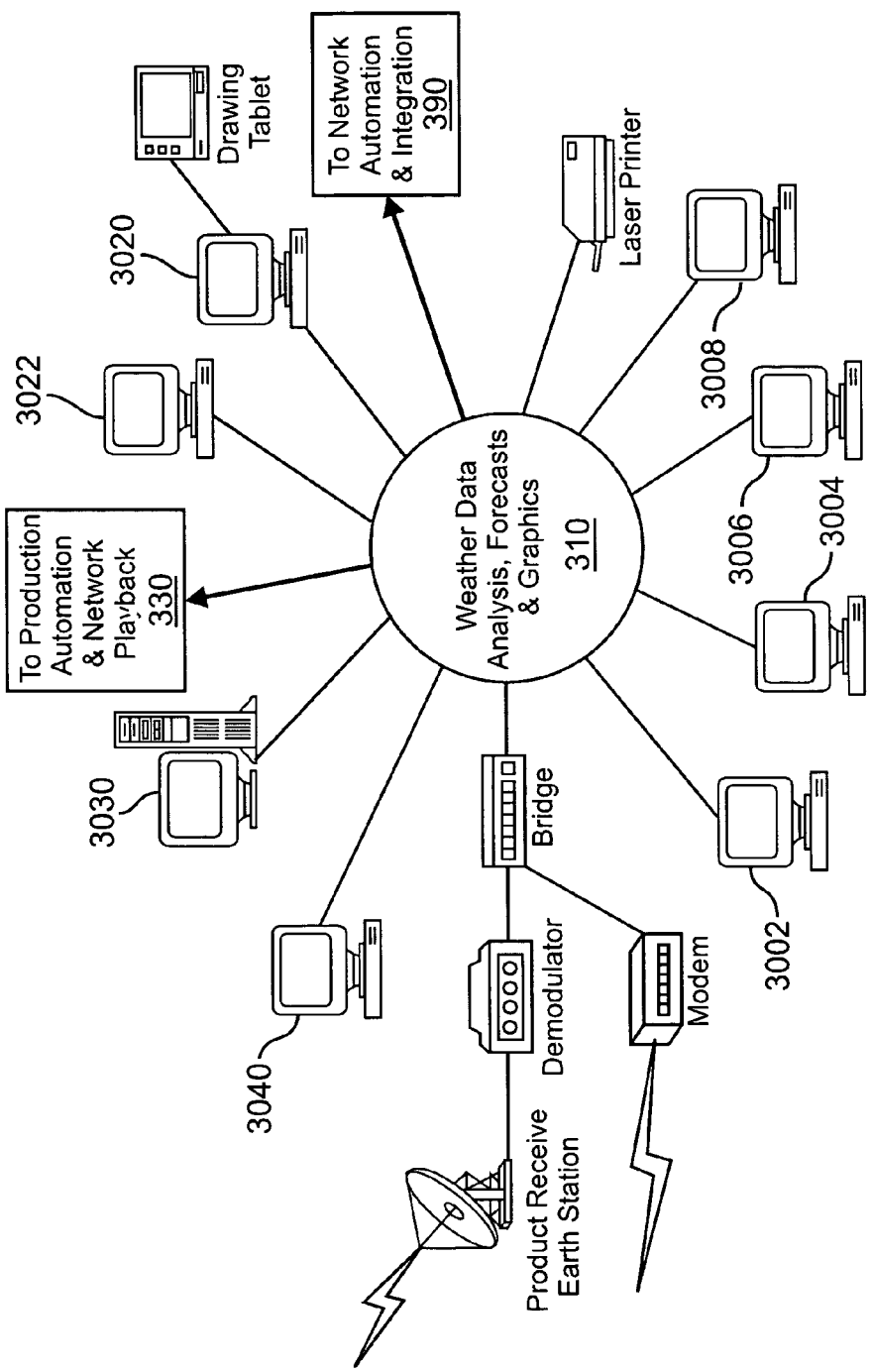
FIG. 9 shows a block diagram of an exemplary Weather Data Analysis that is a subsystem of FIG. 6.

Referring now to FIG. 9, a more detailed description of the Weather Data and Graphics 310 shown in FIG. 6 is described. The Weather Data and Graphics 310 preferably employs the use of computer system that through a satellite-demodulated data carrier signal, can provide the necessary information components to produce the desired weather programming content. The Weather Data and Graphics 310 will utilize network technologies and client-server architectures enabling computer workstations accessing file or graphics servers. In this exemplary block diagram, the server is illustrated as the central circle 310 and the clients are the various workstations networked to the server. The products prepared by the Weather Data and Graphics 310 are interfaced to Production Automation and Network Playback 330 and Network Automation and Integration 390, as shown in FIG. 6, to produce the streaming media programming content for distribution to subscribers.

In the exemplary weather information system, weather data and information to allow the meteorologists within the organization to predict the weather using computer modeling data, graphical weather data as well as tabular data is provided to Weather Data and Graphics 310 from a system such as Data and Analysis 100 of FIG. 1. In this embodiment, these weather information components are referred to as DIFAX and alphanumeric data products. DIFAX data is produced by the National Oceanic and Atmospheric Administration's ("NOAA") National Weather Service ("NWS") through the National Center for Environmental Prediction ("NCEP"). These data products consist of current graphical representations of the atmosphere at numerous altitude levels, as well as graphical representations of forecasts as derived from mathematical computer models. Along with short-term man-modified forecasts and longer-term climatological forecasts, the DIFAX data is the backbone of a meteorologist's forecasting arsenal.

Alphanumeric (lit. numbers and letters) products which are issued by the National Weather Service, both at a national and regional level, typically consist of both tabular representations of the same computer models issued in DIFAX form, as well as various weather products issued by the National Weather Service's Offices located in strategic locations nationwide. These products may include local zone forecasts issued by these offices, along with hourly observations of weather conditions across different regions in the United States. These regional offices also issue weather statements, advisories and warnings during times of inclement weather in alphanumeric form as well to further enhance the product list issued by the National Weather Service. These products are transmitted by NOAA along their Family of Services product transmission feed which include the Domestic Data Service, the Public Product Service, as well as the traditional FAA 604 line. Many of these services are bundled on the National Weather Service's Weather Wire Service.

The Weather Data/Predictive Model Output Workstation 3002 preferably manages, distributes, catalogues, and outputs these products as required by the meteorologists using the workstation 3002. The Weather Data/Predictive Model Output Workstation 3002 can be a desktop workstation or personal computer, Windows 95, Windows NT, Unix or similar operating system workstation such as that from Silicon Graphics, Sun Microsystems, Dell Computer. The software resident on workstation 3002 is preferably a custom meteorological sorting package that is currently provided by external vendors 100 of weather related products such as DTN/Kavouras, WSI, Accuweather, etc.

The Watches and Warnings Workstation 3006 is designed to be a stand-alone device which monitors the products transmitted along the NWS Family of Services to automatically generate a weather graphics product which can be aired automatically in a broadcast product. By looking for a certain product codes transmitted within each alphanumeric product issued by the NWS, the Watches and Warnings Workstation 3006 is alerted to weather advisories, watches and warnings which can then be passed along into the broadcast product stream either automatically or manually by a Master Control Operator. These particular product codes are well known to those skilled in the art and need not be described here in any detail. The computer workstation 3006 can be programmed to show user-defined regional maps and graphics automatically updated to depict the latest states of noteworthy weather advisories as issued through the NWS through the local Weather Service Offices (WSO) and the Storm Prediction Center (SPC). Taking the text from the weather advisories, lower screen left to right scrolling text information such as shown in the multi-window display of FIG. 2, can also be automatically generated from this workstation for broadcast stream insertion. This scrolling text information, referred to as crawls, or static graphics provide the viewer of the broadcast product with text information issued by the NWS during these times of inclement and noteworthy weather. After being alerted by an audible tone, also generated by the computer workstation 3006, the viewer of the product sees the display of the graphical representation of the weather advisory, as well as the crawl generated textual information generated from the text of the advisory. The Watches and Warnings Workstation 3006 is particularly useful for the operation and production of noteworthy weather events in a weather information of the present embodiment.

Radar Display Workstation 3004 is preferably networked into the data server that distributes into this processor the radar images transmitted by the National Weather Service's NEXRAD Doppler Radar network or a Proprietary Doppler Radar System that may be provided by external vendors 100 of radar related products and services such as DTN/Kavouras, Barons, etc. The workstation 3004 then displays the radar data above a customized basemap for data display and animation of this data. With the ability to user define the amount of data cataloguing and animation speed, the meteorologist then is able to track storms and their history using both the computer's archival capabilities along with the NEXRAD's products of storm analysis. The meteorologist then has the choice of which of these numerous products to display into the on-air broadcast product.

One of the most unique capabilities of this workstation 3006 is the ability to display highly localized radar images 3008 using what is referred to as "street level" technology. Based on the highly accurate Global Positioning System data, points can be defined to allow the meteorologist to display these radar images, in real-time, on maps showing local streets, neighborhoods, and communities with high levels of specificity and accuracy. By showing this level of local information, both the meteorologist and the viewer of such a product benefit by giving each the most useful information possible. The meteorologist then has the ability to analyze the weather situation with a local specificity never before available to a national weather network audience while the viewer has the luxury of seeing his neighborhood depicted on a local radar display, giving him the ability to determine his personal level of reaction to inclement weather. With this workstation 3008 in place, the most highly localized product possible can be provided.

The National On-Air Graphics Generation Workstation 3020 is preferably responsible for the generation of the graphics, animations, and automatically updated alphanumeric displays over user-defined basemaps. This computer workstation 3020 has the ability to automatically update weather satellite and radar animation files making them available to the on-air product upon request. The most advanced technology of three-dimensional displays of weather forecasts will also be produced from this workstation in files of animated weather symbols dynamically displayed over user-defined basemaps. By changing perspective over a defined surface, local, regional, national, hemispheric, or global, the workstation 3020 has the ability to display the weather information, whether user-defined animations of current and forecast weather information or automatically generated satellite and radar data, from dynamically changing and varying views of perspective giving the viewer the perception of flying through the computer generated scene. This fly-through technology is revolutionizing the display of weather information, and will be used in an environment never before displayed consistently in a national weather network. Then, graphics artists, using this data to formulate their graphics content for specific weather situations, program their sequences to display forecasts and weather information to the national audience, especially highlighting weather occurrences of national interest.

The Local Weather Graphics Production Workstation 3040 is preferably configured to automatically produce regional and local weather information as defined by the Local Coverage Area being serviced ("LCA"). Local Coverage Area is defined by the geographic region that includes subscribers with similar geography, climate, terrestrial expectations, community interests and receives the same local programming. For the purposes of local programming delivery, a market refers to the television market defined by Nielsen called Designated Market Area ("DMA"). A DMA is made up of one or more counties in which stations, local in a central town or city, are most viewed. DMAs usually extend over smaller areas in the East, where cities are closer together than in the West. Each LCA may include subscribers from one or more markets. Displays of composited radar and regional weather satellite can be generated by this workstation 3040 to automatically allow close-in depictions of weather observations, forecasting, and radar. Through the use of the satellite and radar data, along with the automatically updating graphical displays of auto-plotting alphanumeric data, the Local Coverage Area viewer will have displayed to them a local level of specificity again never before available to the viewer from a nationally based weather network. The most advanced technology of three-dimensional displays of weather forecasts will also be produced from this workstation in files of animated weather data dynamically displayed over user-defined basemaps. By changing perspective over a defined surface, local, regional, the workstation 3040 has the ability to display the weather information, whether user-defined animations of current and historic weather information of automatically generated satellite and radar data, from dynamically changing and varying views of perspective giving the viewer the perception of flying through the computer generated scene. This fly-through technology is revolutionizing the display of weather information, especially to local audiences.

The Local On-Air Graphics Generation Workstation 3022 is preferably similar to the National On-Air Graphics Workstation 3020 except for the scope of the geographical area covered by this product. While the National product highlights occurrences across the nation, the Local products will preferably be set-up to display regional and local weather information as defined by the Local Coverage Area being serviced. After taking automatically generated weather graphical information generated by the workstation 3040, the graphics artist will have the flexibility of using this information to generate local graphics while also manually generating animations and specialized graphics of particular local interest. Outside of enabling the manual production of local weather information, this workstation 3022 preferably provides the facility where primary window weather information will be produced, including depictions of forecasts, both short-term and long-term, as well as special event forecasts and local weather phenomena explanations. Available to the server, this information will be available to the Local Coverage Area broadcast product. The most advanced technology of three-dimensional displays of weather forecasts will also be produced from this workstation 3022 in files of animated weather symbols dynamically displayed over user-defined basemaps. By changing perspective over a defined surface, local, regional, the Local On-Air Graphics Generation Workstation 3022 has the ability to display the weather information, whether user-defined animations of current and forecast weather information or automatically generated satellite and radar data, from dynamically changing and varying views of perspective giving the viewer the perception of flying through the computer generated scene. This fly-through technology is revolutionizing the display of weather information, and will be used in an environment never before displayed consistently in a national weather network, especially as applied for a Local Coverage Area. The production of local graphics can be generated by a variety of platform and software configurations including complete system currently offered by vendors including Accuweather, WSI, Weather Central, etc.

As weather graphics are produced by the Local On-Air Graphics Workstation 3022 and from the Local Weather Graphics Production Workstation 3040, the Local Graphics Server 3030 will function in a networked capacity. Through the client-server network established between the computers, the Local Graphics Server 3030 will house the products created by the other Local Workstations, made available either by timed retrieval of these files, or by having the other Local Workstations 3020, 3022 save information directly into the Local Graphics Server 3030. This server 3030 will then, after compiling the information necessary to provide the Local Coverage Area with their specific local weather information, be accessible to network integration and local audio production.

Channel, Traffic and Contract Management

Figure 10:
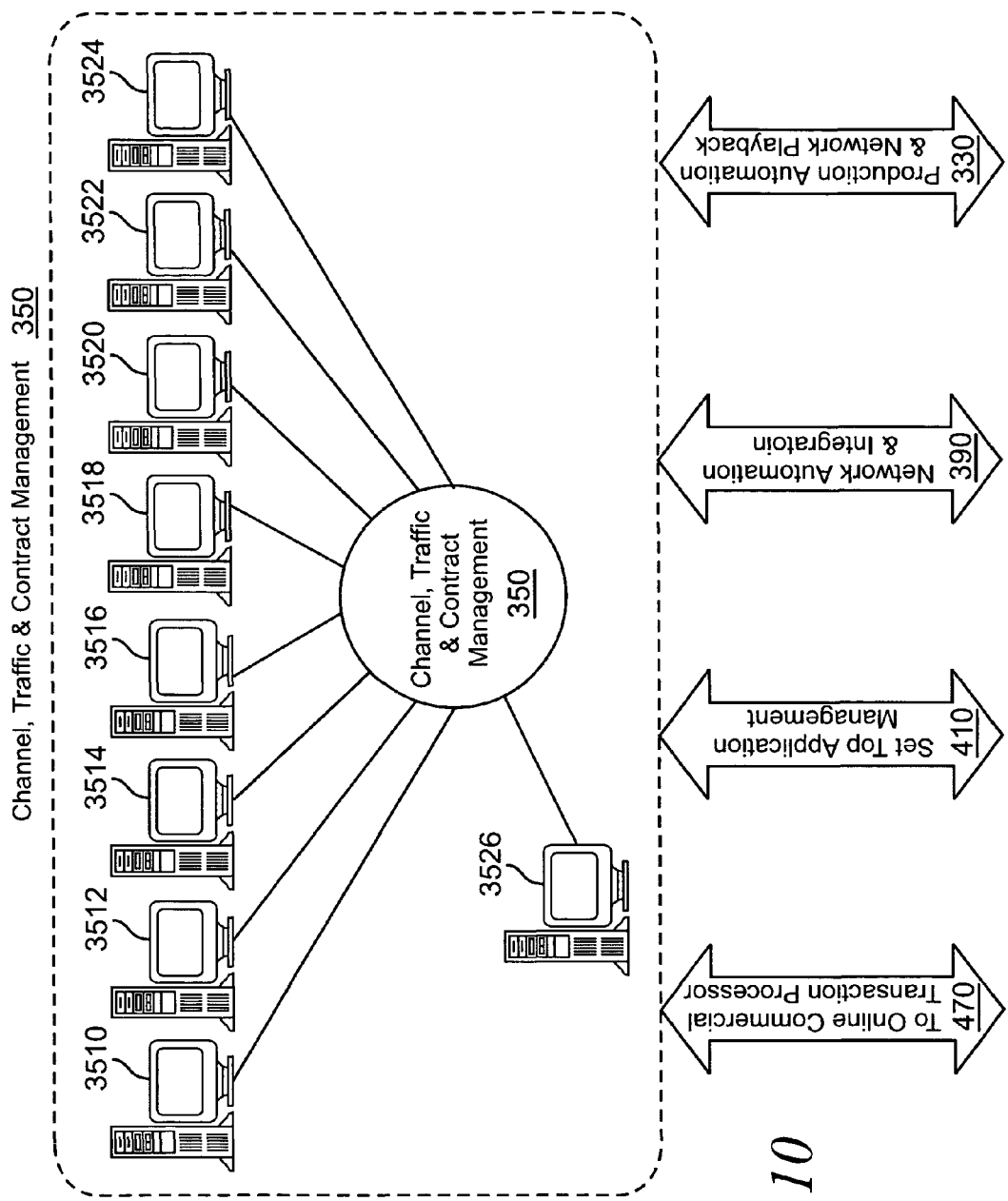
FIG. 10 shows block diagram of an exemplary Channel, Traffic and Contract Management of FIG. 6.

Referring now to FIG. 10, shown is high-level block diagram of an exemplary Channel, Traffic and Contract Management 350 shown in FIG. 6. Channel, Traffic & Contract Management ("CTCM") 350 system generates and distributes information necessary for generating program schedules based on the available programming and the contractual agreements and arrangements made with commercial partners. The CTCM 350 system produces schedules to be sent to Production Automation 330, Network Automation and Control 390, Set Top Development 410 and Commercial Transaction Processing 470 such that these systems can produce the media streams to be delivered by Network Distribution, Monitoring and Control 370 to the appropriate remote locations at the appropriate times.

The Advertising Contacts 3510 and Program Contracts 3512 terminals maintain the necessary arrangements made with commercial partners and integrates this information into the CTCM 350 system database. The Channel, Traffic & Contract Management 350 system also creates various programming schedules and manages the routing of elements and information related to the process of remote channel origination. Network Day or Airing 3514 and Local Day of Airing 3518 workstations can manage and integrate and create programming schedules from the available program elements for the national network as well as for all of the network RCONs, respectively. Network Commercial Integration 3516 and Local Commercial Integration 3520 allow commercial programming from different sources to be integrated as the appropriate program element and scheduled to be deliver at the appropriate times to be displayed to viewers. Accounting and Analysis 3522, Analysis Reports 3524 and Set Top Transaction Accounting 3526 enables the operator to monitor and manage the system, including generating financial and operational reports.

In the exemplary embodiment, the CTCM 350 is responsible for the creation of various program schedules to implement the desired multi-window programming in a variety of remote locations. The numerous elements in the multi-part display screen require the continuous, dynamics updating of data elements. A seen in FIG. 10, the CTCM 350 utilizes a client-server network architecture to implement a system incorporating and integrating a number of different program schedules that may be generated and maintained on a number of different computing devices.

The CTCM system 350 may also utilize a GUI application capable of constructing a streaming, multi-part screen presentation via "drag and drop" techniques on a master terminal and transporting the necessary multi-part playback schedules, as well as underlying graphs to a remote computational device for playback. The GUI application 900 for creating a multi-screen display on a remote display device is more fully described in FIG. 17.

Channel, Traffic and Contract Management 350 may be implemented in many ways, including an enterprise management system with application software and databases interfaced to a number of operational areas of the system such as those available a number of software systems vendors such as Columbine JDS, Enterprise, Summit, TCS/Sunup, etc.

Production Automation and Network Playback

Generally, the production will consist of dynamically updated graphic feeds from the WDA&G 310 as enabled by the weather service provider 100 which delivers current weather data, scripts and other products via satellite with additional corresponding data received via high-speed data transmission lines. The multi-screen image 60 will be comprised of national, regional and local weather information. The primary window 62 of the multi-part screen will switch between different weather forecast segments. The main screen 62 will have the national segments with onscreen weather reporters as shown in FIG. 2B. There will be an audio narrative during the main screen segments without an on-screen reporter. The audio will service the regional and local segments, with each geographic area receiving an individualized audio narrative of the weather graphics. The facility will receive weather data feeds from weather service providers 100 via satellite and local meteorological packages at each headend location via telephone modem and/or Internet virtual private networking ("VPN") techniques. Using, for example, DTN/Kavouras as a primary weather source 100, there will be a full-time direct data connection for attendant data from Kavouras.

Figure 11:
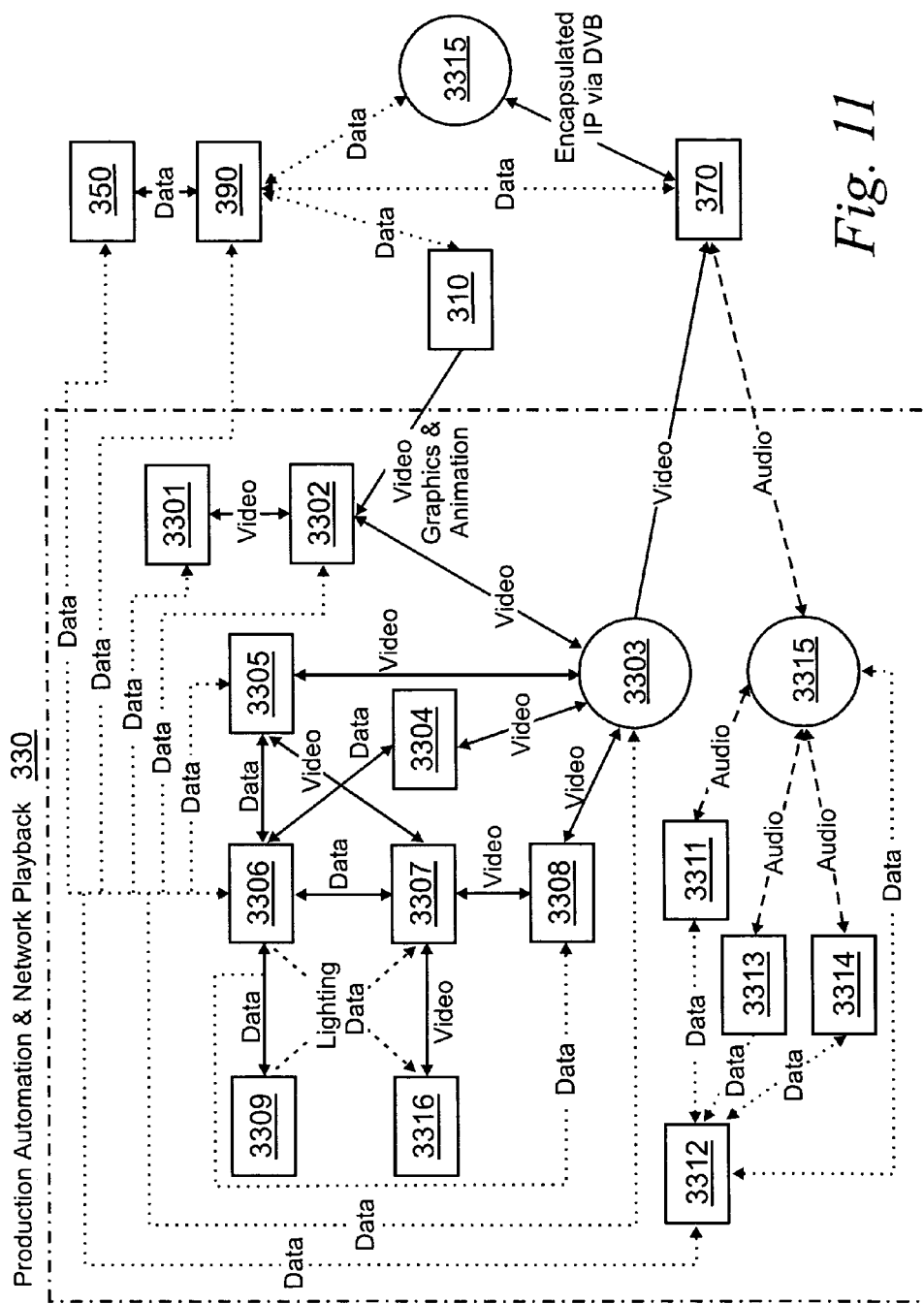
FIG. 11 shows block diagram of an exemplary Production Automation and Network Playback of FIG. 6.

Referring now to FIG. 11, shown is an exemplary embodiment of the Production Automation and Network Playback 330 system for creating and generating program and content for the information distribution system. Preferably, video, audio and data in the NOC 300 will be networked through a centralized system; e.g., all NOC 300 video will be routed through the Video Production Routing Switcher 3303, available on the Network Server Data Center 3302 and controlled by the Production Automation Processor 3306. Likewise, all audio in the NOC 300 will be routed through the Audio Production Routing Switcher 3315, available on the Network Audio Server Data Center 3311 and controlled by the Audio Production Automation Processor 3312.

The Network Server Data Center ("NSDC") 3302 is configured as an integrated environment; i.e., the facility uses a layered network topology, this type of topology allows devices to interface within a discreet networked environment so that any one device has the capability to inter-operate with any other device on the network.

The production operations is comprised of and interoperates with the following areas and systems:
- Weather Command Center and Studio Control 3307
- Small production studios with control rooms 3307
- Audio production booths for regional audio narrative 3313 & 3314
- Audio production studio 3314
- Video editing Rooms 3305
- Graphic production and editing 3304
- Integration rooms for producing elements for the multi-part screen 3304
- Live program & News Gathering Control Room 3316

The NSDC 3302 houses all video servers and as a result is where all online availability of video for edit, studio, distribution and RCON operations. Moreover, as is typical in most modem broadcast operations, an archival system of some sort is used to remove video, audio and/or graphics materials from the online NSDC 3302 environment. In the exemplary weather information system case, this may be handled by a high capacity digital cart machine such as the archive products marketed by the likes of StorageTek, Odetics, Sony and others.

The facility may have on-line linear and non-linear off-line editing, there will also be Graphics Production 3304 linear off-line for quick fixes for the live programs. In addition to the editing, the facility will have a full function graphics system for compositing and animation. Also for purposes of this exemplary weather information programming network, digital video effects ("DVEs"), virtual sets, 3D animation, etc., can be access from this NOC subsystem 3304.

The electronic edit 3305 is a computer based edit environment for the editing of the digital program segment files from the weather production 310 and production areas 3304, 3307 & 3308. The editing facility 3305 will create other program segments for interstitial materials and weather related programming. The edit area 3305 will access the segments from the network server environment 3302, manipulate and process the segments and transfer them back to the network server 3302 for access by the PAP 3306 and Network Automation & Integration 390.

The Weather Command Center shown as studio operations 3307, a subsystem of Production Automation and Network Playback 330 in FIG. 11, will function as the main studio environment for live and on-screen presenter segments. The weather command center preferably houses the meteorological computers 310 and reporting equipment. The command center will have similar functionalities to a newsroom. The center may be fully automated with robotic cameras placed throughout, an operator console and have an area customized for the virtual presentation of the weather information. The entire command center will use an automated production system similar to those used in newsrooms such as the News Maker or Omnibus Automation systems.

The Production Automation Processor 3306 preferably (1) interfaces with the WDA&G 310 via the Network Automation and Integration 390 system which will enable the receipt of weather graphics and animated sequences by the Network Server Data Center 3302 in FIG. 11, (2) manages studio control room functions by managing production subsystems for Lighting 3309, Video Tape Machine Control 3306, Graphics 3304, Video Effects 3305, Server Storage & Media Management 3302, Tape Archives 3301 and Routing Switcher Control for production of the national network with national commercials ready for distribution via NDM&C 370, (3) receives schedules from and send "as run" logs for the national network to CT&CM 350 and (4) interfaces with Network Distribution Monitor & Control 370 operations for the purpose of distribution of the National Network feed as well as to provide network return feeds; outputs from the quantum monitor and RCON alarm stations in NDM&C 370 as shown in FIG. 15, Live Studio Network Monitor 3708 and Live Audio Insert Network Monitor 3709. The production automation will control the equipment that creates the segments, once created these segments will be transferred through the Network Automation and Integration 390 system to the NDM&C 370 as shown in FIGS. 11 and 15.

The command center will have the analysis facility to receive the weather information, process and distribute it to the regional production rooms and the main studio control room 3307 for production. All elements and segments will be produced digitally and distributed throughout the NOC as streaming files. The on screen programming will take place in the main studio 3307. The weather command center 3307 will have access to all the weather service information and return information from the local MetPaks via WDA&G 310 operations. The studio will have sufficient monitoring to allow the on screen talent to see the statistical information that is part of the broadcast in addition to the interactive data to allow references within the program.

Preferably, Studio Control Room Operations 3307 provides separate production studios for producing program elements and segments for inclusion into the programming or for producing weather related information piece and other interstitial program elements. The production studios and control rooms will be part of the Studio Operations 3307 system. The program elements produced will be transferred to the network server 3302 for access by the NA&I 390 system for origination and distribution as part of the daily program schedule. These elements will be digitally produced using robotic studio equipment and automated studio control systems. As part of the integrated environment, the production studio will have access to all of the elements and weather information 310 used for program origination.

The master production studio and control room 3307 manages and assembles the individual program elements, and commercial content required for the rendering of the National Network feed which is distributed via NA&I 390 and NDM&C 370 functionality to network RCONs 500 for final distribution via headends 450. As a multi-regional distribution network using IP encapsulation and encryption distribution technology, customized program elements as well as local commercials will be distributed via network RCONs 500 for to geographic and/or demographic regions, groups and/or individuals. The NA&I 390 origination will be a completely automated environment. As the elements are transferred from each of the production units internal to the NOC 300, a master program schedule created by CT&CM 350 will be distributed to the appropriate network subsystems such as PA&NP 330, NDM&C 370, NA&I 390 and RCON 500 to enable the creation of program elements via the NOC 300, distribution via the NDM&C 370 and final rendering, compilation and origination enabled by NA&I 390 and RCON 500.

Virtual Set Studio and Control 3307 provides the 3-D rendered graphics from the weather provider software 310 to create a virtual environment for the presentation of the animation sequences. This will depict the topography of the geographical area in the report including metropolitan areas and weather effects. Using graphic compositing techniques resident in the Graphics Factory 3304 the reporter has the appearance of standing in the weather system, the image is fully composited by the studio automation system 3307 and transferred digitally to the network server 3302 where the NA&I 390 accesses it for distribution 370 and final origination via network RCONs 500.

Regional Audio Narrative Production 3313 & 3314 preferably provides a number of "booths" positioned around the weather command center where the narrative audio for the regional and local weather segments will be created; i.e., Audio Voiceover Operations 3314 as shown in FIG. 11. The co-location of these booths to the command center 3307 will allow access to the meteorologists analyzing the data 310. Each of these booths will be a self-contained digital audio production environment with a modified NDM&C 370 network terminal. The audio production workstation will enable the reporter to create a narration for a particular region as the weather graphic for that particular region is displayed on the screen. The audio production software will have processing capabilities to keep a consistent sound appearance to each of the audio segments. The weather reporter will create audio files for a number of regions. The audio files will be assigned to a set of graphic files, these will be placed onto the network where the master control automation system will access them for transport to the NSDC 3302 for studio operations 3307 or to network RCONs 500 for final channel origination.

The Technical Operations Center (TOC) is the general technical corridor of the NOC 300 which is where the physical housing, and interconnection of the major enterprise computer servers and systems is done, including carrier service interfaces for voice, data and broadcast circuits. It will also host the electronic frames for the production equipment, i.e. switchers, character generators, dve, still store, camera control units (base stations), etc.

The Live program & News Gathering Control Room 3316 facility will be based on a hub and spoke design for signal management; the TOC will be the primary location in which all signal management, distribution and routing will occur. The systems to be located here will be synchronization via a master clock system (the master clock driver will be synchronized to international standards via a global positioning system (GPS)) so that audio/video routing, transmission and radio equipment, quality control monitoring and all systems necessary for operations operate in a frame accurate environment.

Multi-Part Screen Software Management System

The multi-part screen will be a computer generated composite of graphic images created in the graphic production area 3304. The screen will be a series of computer generated graphic templates archived to the integrated network server 3302, and distributed as resident files to each of the RCONs 500. The multi-screen software management system is the application used to assemble the program segment files according to a predetermined order and schedule as developed by the Local Day of Air Scheduling terminal 3518 as depicted in FIG. 10 CT&CM 350 and as further described in FIG. 17. This multi-part screen management package is a software applications that enables control of the programming compiled and displayed at the remote node.

Set Top Box Application Development & Management

Figure 12:
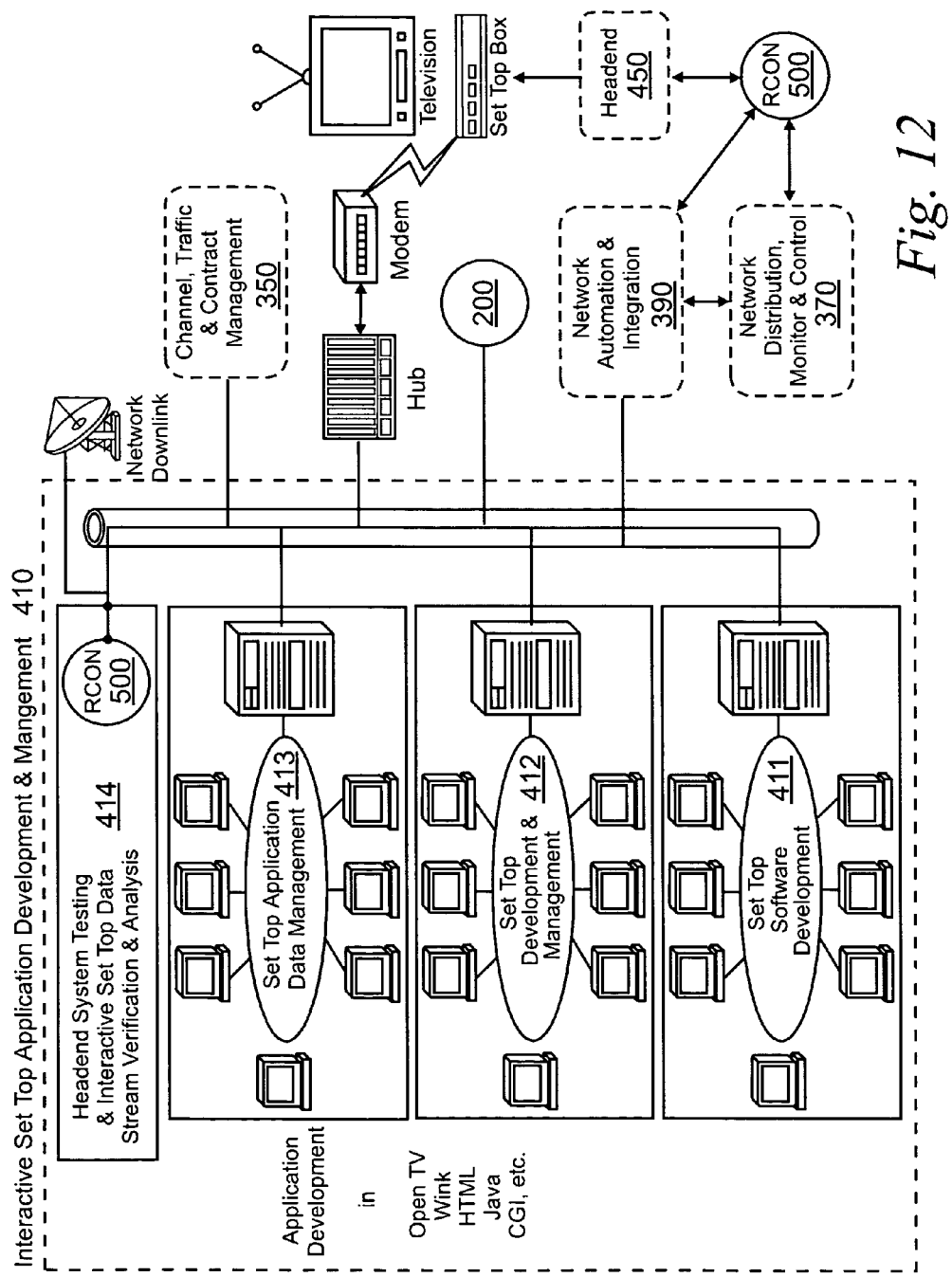
FIG. 12 shows block diagram of an exemplary Set Top Application Management of FIG. 6.

Referring now to FIG. 12, shown is the Set Top Box Application Development & Management 410 including Set Top Application Data Management 413, Set Top Application Graphics Development and Management 412, and Set Top Application Software Development 411 and verification and testing 414. Set Top Application Software Development 411 allows the development of interactive applications to provide viewers the opportunity to view additional information about a displayed product or service. Set Top Application Graphics Development and Management 412 develops graphics that can be used by the Application Development 411 to be displayed to viewer to promote products or services.

Set Top Box Application Development & Management 410 can be implemented by various interactive television and set top box development systems such as the OpenTV Operating Environment available from OpenTV of Mountain View, Calif. OpenTV is a complete operating system for digital interactive television systems capable of meeting the demands of the digital broadcast consumer electronics market. OpenTV system includes a Software Development Kit (SDK) providing a complete C-language content development environment for developers creating interactive television with graphical content that has the look and feel of television. The OpenTV SDK allows for interactive applications to be developed using OpenTV's application programming interface (API) along with graphical and command-line tools. OpenTV also provides a MPEG encoder that converts a variety of different types of images into television ready pictures. The OpenTV encoder can convert images from a variety of file formats such as TIFF, GIF, JPEG, BMP, PICT and PBM and creates professional quality MPEG still pictures suitable for television broadcasting. OpenTV Web provides digital television operators the ability to repurpose HTML content for television displays. OpenTV Web allows televisions that, unlike conventional personal computer, browsers, do not have significant amounts of processing power or memory to display web content by shifting the HTML processing load to servers in the broadcasting headend. Using this application content can be reused rather than recreated and the content is compressed for quicker download.

The OpenTV system also includes a distribution headend software technology that provides the ability to deliver interactive applications to deliver interactive applications via standard digital television broadcast facilities. The headend software regulates the delivery of file-based OpenTV application simultaneously with audio and video to OpenTV-enabled digital receivers. The OpenTV Flowcaster headend software technology allows operators to transmit data simultaneously with audio and video to OpenTV-enabled digital receivers. Flowcaster supports a wide range of interactive application with both single and multiple stream configurations to provide uninterrupted delivery of these application streams to the digital receiver. The OpenTV system also includes the OpenStreamer application that delivers file-based or stream-based OpenTV applications which can be multiplexed and updated in real-time and can be received and run on any OpenTV-compatible receiver. OpenStreamer delivers interactive application simultaneously with live or pre-recorded video and audio to enabled digital receivers. The OpenStreamer software resides on an NT host computer connected to standard digital broadcast equipment. The OpenStreamer architecture typically consists of an application server and a broadcast server. The application server responds to inputs from external sources, provides for real-time resource generation and controls the broadcast server and triggers stream playout via the common server API or remote management programs. The broadcast server receives content from the PAS, multiplex multiple MPEG-2 Transport Streams and OpenTV applications in real-time and output to the hardware multiplexer according to the request from the application server. Additional information regarding the devices can be obtained from OpenTV in Mountain View, Calif.

Set Top Box Application Development & Management 410 communicates with a number of processes including Channel, Traffic Contract Management 350 and Online Commercial Transaction 200 as also shown in FIG. 6. As shown in FIG. 9, each of these subsystems generally use a networked client-server architecture. The Set Top Box Application Development & Management 410 also includes a Headend System Testing and Interactive Set Top Data Stream Verification & Analysis 414 to allow testing and monitoring of interactive applications. The Testing and Verification 414 includes a RCON 500 to allow a developer to test and monitor the development and implementation of interactive applications. In general practice, this is an exact clone of a cable headend distribution system 450 used in conjunction with cloned network RCONs 500 to provide quantum verification as well as system development and debugging facilities.

Network Distribution Configurations

Referring now to FIGS. 13A-13E, shown are block diagrams depicting a number of exemplary network distribution configurations and associated communication paths between Network Operations Center 300 and the subscribers' set top box or television set that can be implemented by the system 50 (FIG. 1) using RCON 500. FIG. 13A shows a distribution system using headend 450. In this embodiment, NOC system 300 transmits a plurality of broadcast quality program elements via IP encapsulation and encryption techniques such as a national feed and information and control components that can be used by RCON 500 to produce programming distributed to viewers by headend 450 to set top boxes 452. In this exemplary configuration, the RCON 500 receives an IP transport containing, for example, a national video feed as well as other information components via satellite distribution network 451. The IP transport carrying various program elements and information components that can be assembled to produce a plurality of programming to be shown in the different program windows of a multi-window display such as shown in FIG. 2. The RCON 500 distributes the assembled programming to the headend 450 devices to be distributed to the viewer set top boxes. Typically, the headend devices 450 will distribute programming to set boxes 452 over a digital cable television system provided by a number of cable television providers. The set top box 452 displays the programming on a television 454 to the viewers. As shown in FIG. 13A, the viewer's set top box 452 also includes a communication interface 455 that allows the viewer set top box 452 to communicate back or downstream to the NOC 300. The communication interface can be utilized to implement interactive transaction as selected by the viewer. The communication interface 455 may be implemented with a conventional modem communicating over a telephone line connection or a cable television modem 452 or may include an Internet access connection.

FIG. 13B shows another configuration of an exemplary distribution system which may be referred to as a direct-to-home ("DTH") system. In this system, the NOC 300 distributes streaming media to the RCON 500 over a network facility connection 494. The network facility connection 494 may include an Ethernet, ATM, frame relay or other network facility connection to provide a transmission facility for the streaming media between the NOC 300 and the RCON 500 which are located at the DTH uplink facilities. In the particular embodiment shown in FIG. 13B, the RCONs 500 are addressed to receive the appropriate streaming media using an appropriate addressing scheme such as the IP encryption scheme discussed herein. From the received IP stream, RCONs 500 creates the desired programming and communicates with an associated headend 450 to further distribute the assembled programming. In this exemplary embodiment, the headend 450 may distribute the assembled programming via a satellite distribution system directly to viewer's homes over a satellite distribution 4002 using a television receive only satellite dish 4004 and a set top box 4006 having an integrated receiver decoder ("IRD") capability. IRD suitable for use with satellite receiver systems feature the appropriate circuitry to receive the satellite frequency signals and demodulate and decode the satellite signals are well known to those skilled in the art and available from a number of manufacturers. The embodiment of FIG. 13B also includes a communication interface similar to FIG. 10A to facilitate interactive transactions.

FIG. 13C shows another configuration of an exemplary distribution system utilizing a fiber optic distribution system 496. In this system, the NOC 300 distributes streaming media to the RCON 500 over a fiber optic facility 496 such as a SONET based facility. The RCONs 500 assembles the programming that is communicated to an associated headend 450. The headend 450 distributes the programming to viewers via a cable television distribution system as described previously herein.

FIG. 13D shows another configuration of an exemplary distribution system utilizing an Internet based distribution to be viewed typically on a personal computer. In this system, the NOC 300 distributes streaming media to the RCON 500 over a network facility such as described in connection with FIG. 13B. The RCON 500 may also assemble the programming from the IP streaming media previously described. In this embodiment the RCON 500 is in essence the headend 450 and/or Web Server that transmits the final product over an Internet connection 499. The headend/Web Server 450 distributes the programming and receives interactive communications via the Internet 4010 and such devices as a modem; e.g., DSL (digital subscriber line) modem, cable modem or other type of communication device which provides access to a computer such as a Windows Operating System based person computer or other type of workstation. Preferably, the personal computer 4020 is especially equipped for video display with enhanced video and graphics adapters and video display monitors.

FIG. 13E shows another configuration of an exemplary distribution system utilizing an Internet based distribution to be viewed typically on a personal computer. In this system, the NOC 300 distributes streaming media to the RCON 500 over the Internet 4010. The RCON, 500 may also assemble the programming from the IP stream previously described. In this embodiment, the RCON 500 is in essence the home user's personal computer and/or home-based computing device. The home-based processing unit is a computer such as a Windows Operating System based person computer or other type of workstation. Preferably, the personal computer is especially equipped for video display with enhanced video and graphics adapters and video display monitors. This embodiment will be enabled by the further increase and general availability of computer processing power and high capacity transmission capabilities at reasonable cost. In short, advances in computing and telecommunications products and services will allow the eventual porting of RCON functions to be implemented into a home-based processing unit 4030.

Remote Channel Origination Node

Referring now to FIG. 14 shown is the Remote Channel Origination Node 500 which provides the final origination and/or custom rendering of the broadcast quality, interactive product for distributions to end-users and subscribers. In this exemplary embodiment, program elements are distributed over a DVB satellite distribution system via an encapsulated IP transport as depicted in FIG. 14 which includes the national network feed, a plurality of audio channels for regional and local distribution, weather graphics files, local condition data, software, data, graphics, animated sequences, and interactive program components. The satellite distribution system 3704 also carries conditional access switching cues, site addressable data via IP encryption, CG, bug and rendering files, commands, remote automation system schedules, software upgrades, etc.

The satellite circuit 3704 carries these program elements for reception in the exemplary weather information programming network by a cable MSO. As is normal for U.S. cable headend distribution, C or Ku band TVRO equipment is used and well known to those skilled in the art and as a result not described in detail herein. A LNB (Low Noise Amplifier Block Down Converter) receives the DVB QPSK modulated satellite signal and via a coax IFL to an integrated receiver-decoder ("IRD") 502 that receives the network satellite signal for decryption, decoding and routing for streaming and store and forward program elements to the appropriate devices, such as video file server 504. Such IRD devices 502 are available from a wide number of satellite communication manufacturers.

In the exemplary embodiment, the RCON 500 decrypts and decodes the streaming video and audio; i.e., the National Network feed 510 and the appropriate regional audio channel. Local sources 506 for audio and video such as commercial insertion devices, audio voiceover booths, tape machines, file server, and live video feeds are terminated into a remote controllable routing switchers for management prior to screen rendering 508 and final channel origination. Video, audio, graphic and animated sequence files are stored via a conventional mirrored, hard drive utilizing fiber channel RAID 3 or similar standards for playback and utilization by the screen rendering process.

The screen rendering process 508 of the RCON 500 utilizes the previously mentioned video and audio sources by the way of commonly available computer based processing products that enable the use of digital video effects (DVE), chroma keys and other effects such as those produced by Matrox and Chyron. By routing the appropriate program elements to this screen rendering process the basic multi-part screen is constructed.

Simultaneously, weather data gathered from a local meteorlogical sensor package 520 along with other data or text streams delivered via the satellite circuit 3704 are routed via the remote system automation processor and framed appropriately for utilization in on screen elements such as titles, bugs, crawls, etc. which are layered over the base multi-part screen.

Prior to termination of the final channel origination of the custom, multi-part screen and appropriate switched audio with the downstream headend equipment, this distribution ready video and audio signal is interfaced to a carrier lost detection switch device 514 which senses the loss of a proper video or audio signal on one channel and automatically switches to the other. In this case, this will prevent the partial or total lost of the local, customized signal to the specified RCON even in the case of failure of numerous subsystems of the RCON by routing the full screen national network program feed 510 both audio and video to the downstream headend.

Also notice that besides routing of program and/or switching elements to the appropriate devices at the appropriate times, the remote system automation processor 512 is responsible for communications with the NOC 300 via direct dial, private line or Internet dial up via local ISP in order to; (1) deliver as run logs to CT&CM 350, (2) alarms and status to NDM&C 370, (3) transactional responses for SAD&M 410, (4) SS&PC 3914 for program element delivery status, (5) forwarding of local weather data to the NOC 300 for use by WDA&G 310, (6) RCON 500 to NOC 300 synchronization and (7) enable full remote control of the specified RCON if necessary.

Those skilled in the art will note that the delivery of set top application elements 516 by the RCON is done as previously mention in a largely overlay fashion so that implementation by the RCON is primarily a matter of routing of the appropriate elements to a predefined physical interface to the downstream headend device.

In the exemplary embodiment, the RCON 500 may be implemented using a variety of different products from Chyron, Matrox and others. For example, the Chyron Duet hardware platform is a high performance media processing platform with an integrated, industry standard personal computer combining specialized hardware processing with standard personal computer subsystems for modularity and flexibility. Chyron provides Lyric a Windows NT software application to compose and playback graphics elements via remote transmission of scripts.

Network Distribution Monitor and Control

Referring now to FIG. 15, shown is a block diagram of Network Distribution Monitor & Control 370 depicting the distribution and preparation of the encapsulated IP stream for satellite distribution uplink using a variety of encoders, multiplexers, modulators, and upconverters to implement network distribution system. As can be seen in FIG. 15, Production Automation and Network Playback 330 transmits video 3710 and audio 3712 in a standards-based format, which in this exemplary embodiment may be video in CCIR 601 and audio in AES/EBU formats. Of course, video and audio may be transmitted in a variety of other formats including analog composite video formats and a variety of other audio formats such as MP3, WAV, etc. In fact, the present embodiment enables a variety of standards based formats to be handled by the system. In addition, Network Automation and Integration 330 also transmits all other data components to be multiplexed and carried by the encapsulated IP transport. The video and audio encoders 3720, 3722 preferably provide MPEG-2 encoding, as well as providing advanced data compression, adaptive video pre-processing, and noise reduction. An example of a suitable encoder is the MediaView line of encoding products from DiviCom, Inc. of Milipitas, Calif.

The output of the encoders 3720, 3722 are provided to the multiplexer 3730 to create the multiplexed DVB satellite transport. The exemplary multiplexer 3730 is preferably a statistical multiplexer that multiplexes and grooms signal streams generated by encoders 3720, 3722 as well as other system components into the desired transport stream for maximum utilization of available satellite bandwidth. Statistical multiplexing enables a plurality of encoders connected to the multiplexer 3730 to share compressed bandwidth for more efficient and higher quality video encoding. For purposes of clarity of explanation, only two lines of encoders and multiplexers are shown to create a multiplexed media stream. However, it should be understood that any number of encoders and multiplexers can be provided to create a plurality of multiplexed channels or streams to be carried by a singular multiplexed transport. A suitable multiplexer 3730 system can be provided using multiplexers implementing the Divitrack system supplied from DivCom, Inc. of Milipitas, Calif. The Divitrack system allows a number of parameter to be controlled such as channel priorities and maximum and minimum bit rates that can be adjusted or allowed to adjust automatically.

The output of the multiplexer 3730 is provided to a conventional satellite uplink system 3702 including protection switches 3740, 3742, 3744, 3746 modulators 3750, 3752, upconverters 3760, 3762 and power amplifiers 3770, 3772. The satellite uplink system 3702 distributes the IP encapsulated transport stream over the satellite distribution system 3704 to RCONs 500. The remote location also includes a data stream verification system 3706 to enable an operator to verify the contents of the transmitted data stream at the remote location. Local monitors 3708, 3709 provide monitoring capability at the Network Operation Center 300.

More specifically, the exemplary weather information programming network will utilize a hybrid satellite distribution system that will (1) utilize broadcast quality video and audio encoding and statistical multiplexing as previously described in the case of the Divicom product line and/or as offered by other DVB compatible satellite compression and transmission vendors and (2) wrap all network distribution elements in an IP transport layer.

Accordingly, the network distribution approach utilized by Network, Distribution, Monitor and Control 370 uses a standards based method of distributing the product and its elements. In this case, encapsulated IP offers a standards based method that accommodates (1) the simultaneous delivery of multiple streams of video, audio and data, (2) IP encryption to provide conditional access functionality in a broadcast distribution configuration such as satellite distribution to TV and/or cable head ends and (3) the flexibility to provide encryption in serial and hybrid configurations.

In a particular embodiment, the network 50 distributes streaming media and information components via satellite to cable headends using an encapsulated IP via DVB configuration. As shown in FIG. 15 and described above, video and audio from the production automation and network playback systems 330 as well as data from the network automation and integration system 390 are multiplexed together for satellite distribution to network RCONs 500. The IP encryption system utilized in this case is exemplified by the Media4 product line and/or like products which multiplexes the various channels of program content into an IP format for distribution via a DVB satellite link.

More specifically, it is the uplink and conditional access computer and subscriber management systems that monitors and manages (1) the IP encapsulation of program elements and (2) the addressing of specific steaming and store and forward elements to predetermined RCONs (FIGS. 7 and 8). The downstream RF system utilized to uplink the product is of a standard satellite earth type readily available from the likes of Harris, RSI, Scientific Atlanta, Vertex, Andrews and others. Accordingly, these RF satellite uplinks are commonly available with options for earth station monitor and control. These systems manage the up converters, power amps, waveguide switching and alarm/backup/resforal systems for the RF equipment chain. As an exemplary representation of a commonly available satellite uplink, monitor and control system, the Earth Station Monitor and Control 3750 system includes a redundant, tandem configuration of computer systems shown as a primary 3750A and backup 3750B computer systems to control the transmission characteristics of the satellite uplink system; specifically upconverters 3760, 3762, protection switches 3744, 3746 power amps 3770, 3772 and uplink antenna 3702. These systems manage and monitor equipment status, alarms as well as backup & restoral systems for the RF satellite equipment chain. Satellite earth station monitor and control systems; are readily available by the likes of Scientific Atlanta, Crystal Computer, ICL and others.

As depicted in FIG. 15, a variety of computer systems in the Network Distribution, Monitor and Control 370 subsystem to the NOC 300 interface with Network Automation and Integration 390. This enables the NA&I 390 subsystem to the NOC to determine and/or implement the following, (1) the functional status of the satellite uplink system and its components and (2) what program elements will be transported to what RCONs 500. In general terms, the status of the network's satellite uplink is determined by the NA&I 390 by simply reading the status of the earth station monitor and control system. Regarding the determination of what program elements will be transported to what RCON, a more complex set of interactions is required; i.e., (1) the Local Day of Air Scheduling (LDAS) terminal 3518 connected to the CT&CM 350 generates the RCON schedules, (2) the NDS 3910 ensures that the program element name, version tracking and file location as well as RCON destination information generated by the LDAS 3518 are current, accurate and usable by other NOC 300 subsystems or network RCONs, (3) the Staging Server & Protocol Converter (SS&PC) 3914 analyzes what program elements need to go to what RCONs and assembles them for delivery, (4) the SS&PC 3914 prepares these elements for injection into the satellite distribution system 3702 for IP encapsulation & encryption by the uplink and conditional access as well as subscriber management systems and (5) the SS&PC 3914 queries and dynamically updates the channel maps resident in network RCONs 500 as well as the conditional access & subscriber management subsystems to NDM&C 370 to enable the appropriate delivery of program elements.

It is important to note that monitoring of the regional/customized channels is accomplished via "cloned" RCONs that provide a probabilistic, virtual monitor of the display of the network RCONs in the field such as monitors 3708, 3709. This in combination with other alarm, monitoring and control links available via dedicated private lines, direct dial up, ISP connect or other means provide confidence and/or "quantum" monitoring, status reporting, restoral switching and as run logs. In addition, as depicted in FIG. 12, the customized program output of specific RCONs also provide a "network return" feed for voice over and studio operations.

Network Automation and Integration

Referring now to FIG. 16, shown is a block diagram of Network Automation & Integration 390 depicting the preparation and distribution of media streams to a satellite distribution uplink using a variety of encoders, multiplexers, modulators, and upconverters. On a conceptual as well as practical level, the functionality of the network automation and integration subsystem (NAI) 390 is critical to the delivery of interactive/transactional, streaming media customized for local, regional or interest group distribution.

In a broad sense, the NAI 390 may be responsible for several different types of operational concerns of the exemplary embodiment. For example, NAI 390 is responsible for the protocol conversion and management of all subsystem databases for the purpose of updating and distributing the most current and accurate information to the various subsystems regarding the production, sharing, integration and distribution of streaming media elements. The NAI 390 in this embodiment is also responsible for the frame accurate synchronization of all NOC 300 subsystems and network RCONS 500 and the analysis and transport of necessary interactive/transactional, streaming media elements to network RCONs 500 both internal and external to the NOC.

Regarding, the protocol conversion and management of all subsystem databases, the following is a functional description of the Network Data Synchronizer ("NDS") 3910 that may perform such functions. Preferably, the NDS 3910 is implemented using a computer subsystem constructed using a widely available and/or standards based operating system such as Windows NT and/or some version of Unix such as SCO or LINUX. The NDS computer system is preferably connected to other NOC computer subsystems 310, 350, 330, 370, 410 via a LAN 3916 utilizing commonly available and/or standards based network interfaces, transport, configuration and framing such as Ethernet, 10/100 Base T, Fiber Channel, etc. The NDS computer 3910 is also constructed in a redundant, fault tolerant design to provide the highest level of reliability. This is accomplished by the construction of mirrored or tandem servers utilizing a primary machine which is for online operations and a tandem backup which is available for restoral of the primary NDS computer 3910.

The NDS computer system 3910 also monitors the US "atomic clock" via dial up or Internet connections to establish the "absolute" network time. It also monitors the various subsystem clocks and updates as appropriate the time resident on all NOC 300 and RCON 500 subsystems that are responsible for the production, modification, distribution and/or playback of program elements necessary for the creation of interactive/transactional, streaming media customized for local, regional or interest group distribution.

The NDS 3910 assembles a master, relational database 3912 from all of the NOC subsystems 310, 350, 330, 370, 410 to track the production, modification, distribution and/or playback of video, audio, still graphics, animated sequences, graphic effects, streaming data, applications, schedules and/or system commands as these elements are transported from creation, to use in studio operations, to network distribution, and finally to NOC 300 internal and external RCONs 500 for program playback and final distribution to the end user or viewers. Tracking of various program elements is accomplished by updating and appending to the master relational database 3912 as program elements and information components are created and moved around the NOC 300 facilities. In order to insure that the most current and accurate program elements and/or data are utilized by all of the NOC 300 subsystems, when the NOC 300 subsystems and/or RCONs 500 creates, modifies and/or transports any program elements to any other subsystem internal and/or external to the NOC 300 and/or network RCON 500, the status of the program element in question is checked against the master, relational database 3912. If discrepancies exist, appropriate changes are made to the master, relational database 3912 and/or effected NOC subsystems 310, 350, 330, 370, 410 and/or network RCONs 500.

The following description is indicative of the functions and type of information the various subsystems, such as the Weather Data, Forecasts & Graphics 310, Channel, Traffic & Contract Management 350 will transact with the NDS 3910.

Weather Data, Forecasts & Graphics 310 creates graphics, animated sequences, data and scripts describing local conditions, alerts and updates that are used by a wide variety of the other subsystems 350, 330, 370, 410, 500. For example, these program elements and information content created by the Weather Data, Forecasts & Graphics 310 are utilized by the Channel, Traffic & Contract Management system 350 which requires file information to schedule program playback by network RCONs 500. Production Automation & Network Playback 330 utilizes these elements for studio and voice over operations as well as graphic effects. The RCONs 500 utilize this information for actual file playback for remote channel origination. The Network Distribution, Monitor & Control system 370 utilizes the information in order to implement the distribution and encryption of weather related product elements via the networks encapsulated IP system. The Interactive Set Top Application Development and Management system 410 may also require weather-related graphics for display via the interactive/transactional application.

Channel, Traffic & Contract Management 350 system generates and distributes information necessary for the routing of elements and information related to the process of remote channel origination. This subsystem 350, among other things, is responsible for the creation of various program schedules to implement the desired multi-window programming in a variety of remote locations. In this exemplary embodiment, the channel origination provides the capability to implement a multi-window screen display and makes it possible to generate displays at remote locations other than at the NOC 300. In addition, numerous elements in the multi-part display screen require the continuous, dynamics updating of data elements. The system 350 may utilize a GUI application capable of constructing a streaming, multi-part screen presentation via "drag and drop" techniques on a master terminal and transporting the necessary multi-part playback schedules, as well as underlying graphs to a remote computational device for playback. The GUI application 900 for creating a multi-screen display on a remote display device is more fully described in FIG. 17.

In addition, traffic handling applications provided by the likes of CJDS, Summit, TCS, etc., can also be used for "full screen" operations using the "off the shelf" production automation and network playback applications available from the likes of Louth Automation, Drake Automation, Odetics, Sundance, CJDS and others. The multi-window screen GUI scheduling application 900. (FIG. 17) provides RCON 500 playback schedules via the management and transport functions provided by the Staging Server & Protocol Converter subsystem ("SS&PC") 3914 as shown in FIG. 16. Currently available traffic, production and playback automation products are suitable for implementing the "full screen" operations required for the production of the national feed as well as the various regional/localized audio channels. The enhanced production, modification, distribution and use of the multi-windows screen elements, however, is provided the specialized functions of the NA&I-390, RCON 500 and the multi-part screen scheduling GUI 900 (FIG. 17) module of the CT&CM 350.

The Production Automation & Network Playback 330 system's primary objective is to produce, modify and distribute "full screen" broadcast quality TV programming. Currently available applications for the automated production and network playback of broadcast quality video and audio such as the Louth and Drake Automation systems previously mentioned above are suitable to implement the function. These systems providers feature a suite of products to enable and automate aspects of the production and distribution system.

Network Distribution, Monitor & Control 370 in general, the Staging Server & Protocol Converter subsystem 3914 ("SS&PC") in FIG. 16 is the primary interface with NA&I 390 functions (see above).

Set Top Application Development & Management 410 enables the creation of interactive and transactional components for distributing to viewers. Because, the interactive and transactional program elements are configured in an overlay fashion, the interactive/transactional features of the program stream are generally isolated from the underlying program elements as well as the process involved in originating, monitoring and controlling a RCON 500. As such, operation of these program elements is in accordance with the normal development, implementation, transport and maintenance of interactive/transactional products such as Open TV, Wink, SpyGlass, HTML, etc. Consequently, the normal operations are as depicted in FIG. 12 as application development 411, graphics development 412, streaming data management 413 and system testing and verification 414.

The analysis and transport of the elements necessary to originate an interactive and/or transactional, streaming media product in a multi-part screen format via network RCONs 500 both internal and external to the NOC 300 is a critical enabling function in this invention. In general, the SS&PC system 3914 as depicted in FIG. 16 functions as follows. The SS&PC 3914 receives multi-part screen scheduling information for specific network RCONs 500 from the CT&CM 350. The SS&PC 3914 determined the files needed to produce the specific group of multi-part screen origination scheduled by CT&CM 350 for execution on network RCONs 500. The NDS 3910 system is queried for the location and latest version of the files necessary to produced the scheduled multi-part screen originations. A number of system parameters are calculated including the overall distribution bandwidth required, the available RCON storage, and time necessary to distribute and execute necessary elements for compilation of the required multi-part screen originations.

The SS&PC 3914 performs RCON 500 media/storage system management and maintenance, routes and packages the most recent versions of the required graphics, animated sequences, data streams, applications modules and updates as well as conditional access, encryption, interactive/transactional and monitoring & control elements.

In addition, the SS&PC 3914 also interfaces with the downstream Network Distribution Monitor & Control 370 to ensure delivery of the appropriate streaming media and information packages to the appropriate RCONs 500. In this embodiment, this can be accomplished by synchronization of the programming scheduled by the Channel Traffic & Contract Management 350 database with the various uplink, conditional access and subscription management database. In other words, the unique IP address that identifies the addressed target RCON 500 for the streaming media must be consistent between both the Channel Traffic &Contract Management 350 and Network Distribution Monitor & Control 370 systems. Through the appropriate scheduling and addressing, the Channel Traffic &Contract Management 350 module creates the multi-part screen playback schedules to deliver any particular programming schedule and data elements to the appropriate RCON 500 for execution. The data elements and/or non-streaming elements are packaged in the appropriate encapsulated IP format for transport to remote location via the Network Distribution Monitor & Control 370 multiplexer 3730 (FIG. 15).

In the preferred embodiment, the SS&PC 3914 routes RCON 500 alarms, system status and automated acknowledgements via private line, dedicated dial up and/or internet interconnection to the Network Distribution Monitor & Control 370 for monitoring and control purposes. The SS&PC 3914 routes Headend 450 interface alarms, system status and automated acknowledgements via private line, dedicated dial up and/or internet interconnect to the Set Top Application Development & Management 410. The run logs route are routed as run logs to the Channel Traffic &Contract Management 350 via private line, dedicated dial up and/or internet interconnect.

Graphical User Interface ("GUI") Control Software

Figure 17:
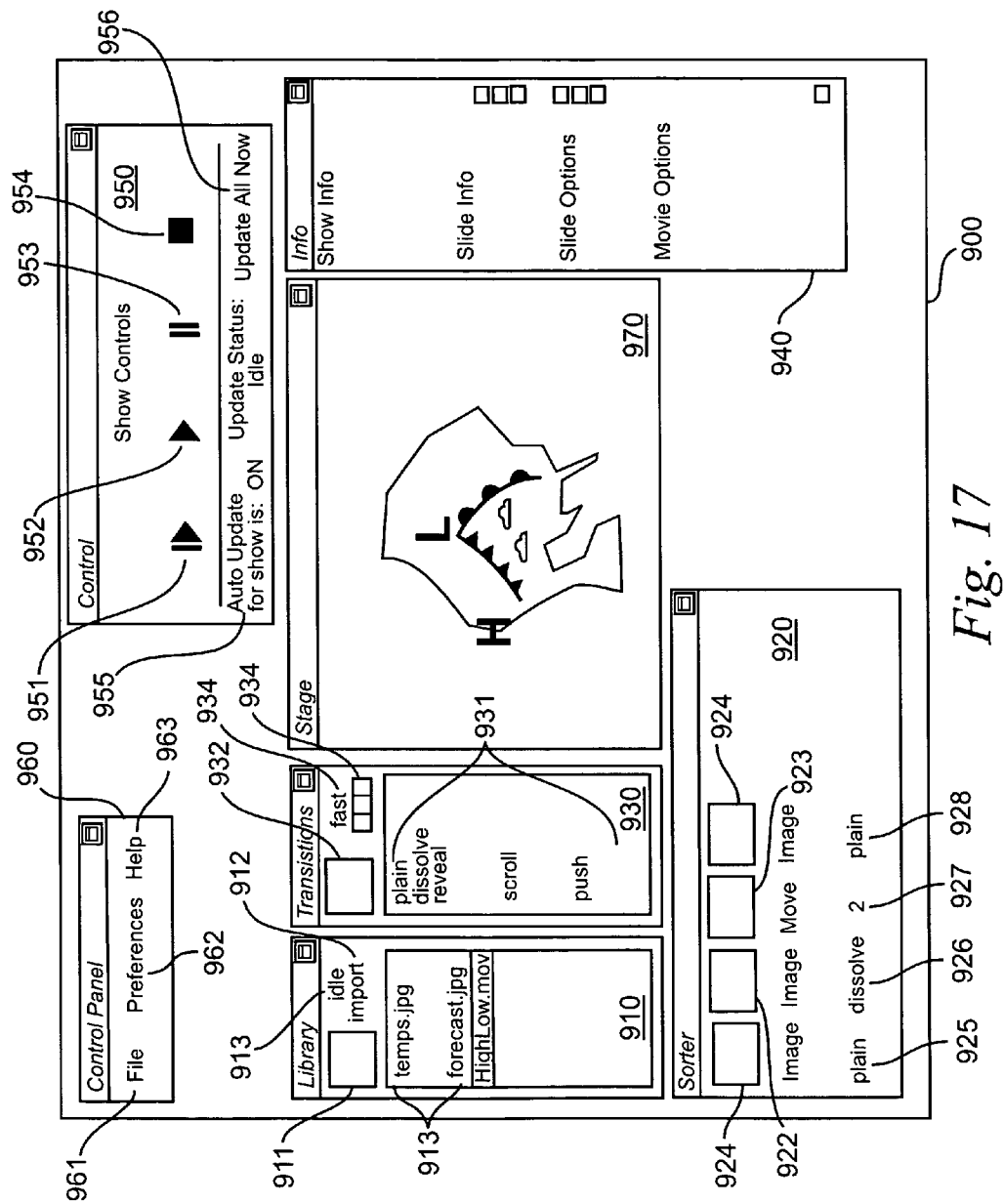
FIG. 17 shows a drawing of an exemplary Graphical User Interface software application for creating and editing shows or programming content in the system of FIG. 1.

Referring now to FIG. 17, shown is a exemplary embodiment of the graphic user interface ("GUI") of a software control interface for creating and editing shows or programs that can be aired or played on a remote display device having a multiple number of display windows such as shown in FIG. 2. The intuitive GUI Control Software provides the user the ability to easily manage and assemble a series of images, animations and transitions as a single weather show to be displayed in a remote display device. Separate sets of still graphics and animation loops can be maintained and edited to be combined and synchronized to create programs or sequences for the various display windows. Using the GUI Control Software makes it relatively easy to change and edit the sequence from a central control device by moving pictures or icons representing the graphics or animation loops in the GUI with a computer mouse device. The GUI 900 control interface residing at the NOC 300 allows centrally scheduled control of the network and remote nodes.

In this exemplary embodiment, an image may include a 640×480 pixel picture. A movie may include a sequence of 640×480 frames in one file played in rapid succession. Preferably, the GUI Control Software produces 30 frames per second animation of 24-bit color images to present a series of images, animations and transitions as a single show and conforms to compression and format standards to be played. Standard compression and format standards can be used.

As seen in FIG. 17, the GUI control screen 900 includes several different windows having different control functions. The exemplary embodiment includes library 910, sorter 920, transitions 930, information 940, control 950, control panel 960 and stage 970 windows. Each of the windows 910, 920,

930, 940, 950, 960, 970 performs several different functions as described below. Shows may be built by moving pictures around on the screen with a computer mouse pointing device or a stylus. When an image or animation is imported into the GUI, an icon 911 representing that element is created and stored in the library 910. The icon 911 is preferably a smaller scale picture of the actual image or first frame of an animation sequence. The operator can then simply click on the icon 911 in the library 910 with a pointing device such as a computer mouse, and drag it into the sorter window 920, which displays all the icons 921, 922, 923, 924 in the show. The user can then click on the play button 952 in the control window 950 and the show displayed in the sorter window 920 will be played on the remote display screens to which the system transmits the programming. The show may also be played locally on a display monitor connected to the video output port to allow the user to preview what will be going out to the viewers.

The different GUI screen 900 windows are described below as follows. The library 910 is where all the external data files are brought into the show. It can be thought of as a graphical list of file pointers. The library 910 consists of four basic parts: the import button 912, the icon display 911, the file list 913, and the library status field 914. This window may be moved and resized by the user as is convenient. The library import button 912 goes to a show importer window to select either movie or image type. Use the browser to select a file, or type one in at the prompt. Click on the import button in this new window to bring the file into the GUI Control Software Interface. As many files as desired can be selected and imported in the system and the done button is clicked. The selected files are then listed in the library icon display list 913.

The library icon display 911 is a graphical representation of the files selected with the library import button 912 where the graphical representations represent the current data in the file. Periodically, such as every five seconds, the library 910 checks the file for the currently selected icon in the library 910 and performs an update it if necessary. To add this item to the show, click on this icon 911 and drag to the sorter 920 window. The library file list 913 is a list of all the file names of the files imported into the library 910. Click on a file name to view the icon in the library icon display. After a file has been selected this way, the icon 911 may be dragged into the sorter 920 window to prepare for the presentation. The library status field 913 is simply a one-word field in the library window 910 that shows whether the library 910 is updating or not. The field will usually contain "idle", but changes to "updating" when it finds a file that is not current.

Referring now to the sorter window 920, the sorter window 920 is basically a list of icons 921, 922, 923, 924 that represent presentations. The order of the show proceeds from the order of the icons left to right, top to bottom of the window 920. The sorter window 920 consists of any number of pairs of icons and fields, a red highlight box, and a vertical scrollbar. This window 920 may also be moved and resized by the user. In the exemplary embodiment, the sorter icons 921, 922, 923, 924 should initially look like their counterpart in the library window 910. If the original filename associated with the icon changes, then the library 910 version will be automatically changed. Preferably in this exemplary embodiment, the image in the sorter window 920 will change if the "Update All Now" button 954 is clicked in the control window 950 or if the auto-update 951 is on for the show in the control window 950 and the auto-update is turned on for this slide in the information window 940.

The sorter icons 921, 922, 923, 924 can be clicked and dragged within the sorter window 920 to re-arrange the order of the icons. When a sorter icon is selected, the sorter "highlight" will appear around the icon and the associated image or first frame of movie will show up in the stage 970. The sorter fields 925, 926, 927, 928 consist of zero or more lines describing the various icon above it. The contents of the sorter fields depend on which boxes are checked in the information window. The sorter fields 925, 926, 927, 928 will contain any or all of the following items: type, file name, last time modified, number of seconds to pause after playing slide, transition type, transition speed, and whether auto-update is turned on for this slide. If there is not enough room to put the entire line for a particular field, then " . . . " will be placed at the end of what will fit in the field. The border of the sorter widow 920 turns red when there is at least 1 icon in the sorter window 920. It represents the highlighted icon, and shows which slide is currently being displayed in the stage widow 970. The sorter highlight will disappear when there are no images in the sorter window 920.

The vertical scrollbar (not shown) of the sorter window 920 will appear when the images in the sorter window 920 do not all fit in the window as is common done with windows programs. The scrollbar will appear on the far right of the sorter window 920 with three buttons. There are two triangle shaped buttons; one at the top of the scrollbar and one at the bottom. If you click on these and hold the mouse button down, the sorter window 920 will slowly scroll up or down, depending on which direction the triangle is pointing. The third button is a rectangle that changes height depending on how many images there are and how much room is needed to display them all. This button can be clicked on, and if the mouse button is held down, it can be dragged up and down to scroll the sorter window 920. One final way to scroll the sorter window 920 up and down is to click on the space above or below the third scrollbar button, moving the sorter window 920 up or down respectively.

Referring now to the transitions window 930, the transitions window 930 displays a list of all the possible transitions as well as gives a small preview of how the transition will look. A transition includes the methods of changing from one slide to another. The exemplary Transitions window 930 includes a list of items 931 listing the possible transitions, a preview window 932, a scrollbar to control the speed of the transition 933, and a field 934 that displays the speed selected by the scrollbar.

The transitions list 931 preferably shows the possible transition type that can be used in the show. Click on a line in the list 931 to select and view the transition in the transitions preview window 932. Preferably, the selected line will highlight, and the transitions preview will change to a different color using the selected transition type and speed. To change the transition type and speed for an icon 921, 922, 923, 924 in the sorter window 920, click and drag the transitions preview down to the icon in the sorter window 920 that you wish to change. The highlighted line in the transitions list 913 is also the transition type that is used when new slides are added to the sorter window 920.

The transition preview 932 is the icon-sized graphic in the top left-hand corner of the transitions window 930 which contains the words of the highlighted line in the transitions list. It is either black text on a yellow background, or white text on a blue background. When the user clicks on a line in the transitions list 931 or clicks on the transition speed scrollbar, the transition preview 932 will do the appropriate transition at the current speed. To add this transition and speed to an icon in the sorter window 920, click on the transition preview and drag it on top of the icon to be changed in the sorter window 920.

The transition speed scrollbar 933 is the button just to the right of the transitions preview. To change the speed of the transition, click on the button 933 and drag it to the left or to the right. The transitions field 934 will change to reflect the location of the button. The farther to the left the button 933 is in the scrollbar, the slower the transition speed, and the farther to the right, the faster the transition speed.

The transitions field 934 represents the speed that the transition type will change. There are four possibilities: "very slow", "slow", "fast", "very fast", depending on the position of the transition speed scrollbar.

Referring now to the stage window 970, the stage window 970 is where the show is actually displayed. The image and movie slides 921, 922, 923, 924 that were inserted into the sorter window 920 are displayed with the appropriate transition between each slide. The stage 970 may be moved, but preferably not resized by the user. The size is 640×480 pixels, and should remain on the screen. The stage 970 represents the show that is being transmit to the remote units, so when a show is played, this window 920 is always brought to the foreground.

Referring now to the information window 940, information window 940 contains information about the entire show, as well as about individual slides. It also allows the user to change parameters in the show and slides. The information window 940 is broken down into five categories as seen in the window: show info, slide info, slide options, movie options, and auto-update. The show info category contains six attributes of the show such as Images, Movies, Slides, Timed Pauses, manual pauses, and show repetitions. The show repetitions are preferably the only parameter in this category that can be modified by the user. The images and movies include the number of images and movies inserted into the sorter window 920, the slides the number of images plus the number of movies, the timed pauses the total number of seconds in all pauses, the manual pauses the number of pauses set to "manual" in the show, the show repetitions the number of times to play the entire set of slides.

The slide info category contains three attributes of the highlighted slide in the sorter window and three checkboxes. If the checkbox is on, then this attribute will show up in the sorter field below each sorter icon. The checkbox is either on for all slides, or off for all slides. The three attributes are file type, file name, and last time modified. The type of slide is either "Image" or "Movie," the filename is the short file name and modified is the last time this image or movie was modified. These attributes are displayed as fields and typically cannot be changed.

The slide options category contains three more attributes of the highlighted slide in the sorter window 920 and three more checkboxes. If the checkbox is on, then this attribute will show up in the sorter field below each sorter icon. The checkbox is either on for all slides, or off for all slides, like above. The three attributes are the pause time, transition type, and transition speed. Pause is number of seconds to wait before going to the next slide in the show, transition is one of the types in the transitions list, speed is either "very slow", "slow", "fast", or "very fast." These three attributes are displayed as buttons and may be changed by clicking on the button and dragging to the value you wish to select.

The movie options category only appears when a movie slide is highlighted in the sorter window 920. This category consists of two fields that cannot be modified, one field that can be modified, and one button that can be modified. To modify the parameter for the playback field, move the cursor over the field, delete the current value and retype a new one. Decimal values are allowed. To modify the loop count, click on the button and drag to the desired value.

The auto-update category consists of an on/off button and a checkbox. If the checkbox is on, then the on/off status of auto-update is displayed in the sorter fields for each slide. If the on/off button is on, then auto-update for this slide is turned on. If the auto-update button in the control window is also turned on, then this slide will be updated if the file is ever modified. In this embodiment both the auto-update button for the show and the auto-update button for this slide must be turned on for the slide to update in the sorter and stage. If the show is playing, then the slide will not update until the show has finished playing, because the show auto-update button is automatically turned off during show play.

Referring now to the control window 950, the control window 950 contains all the show control buttons needed to play, pause, and cancel the show. It also contains the show auto-update buttons 954. If a show is running, a status message of how many loops are left will appear below the play buttons.

The "play from start button" 951 starts the playing of a show from the first slide in the sorter window 920 (the icon in the top left most position). When this button is clicked on, it will typically change from the gray color to green and stay green until the show is canceled with the stop button, or the show finishes by playing until all the repetitions are done. The order of a show is typically display slide, pause, do transition to next slide, repeat until done.

The "play button" 952 is like the play from start button 951, except for the starting location. This button 951 will start the playing of a show from the highlighted slide in the sorter window 920. If the highlighted slide is a movie, then whether the movie is played depends on whether the first or last frame is in the stage window 970. If the first frame is showing in the stage 970, then we haven't played the movie yet, so the movie will play and continue playing the show. If the last frame is showing in the stage 970, then we have just played the movie, so do the transition to the next slide and continue playing the show.

The "pause button" 953 suspends playing of the next slide until the pause button is clicked again, or one of the play buttons is clicked. The button will turn red, and turn gray when any show control button is clicked on.

The "stop button" 954 will cancel the playing of the show and turn the show control buttons gray.

The "auto-update for the show button" 955 turns on or off the auto-update ability for the slides in the sorter 920 and stage 970 windows. Whether the slides actually update or not also depends upon whether or not auto-update is on for the individual slide.

The "update all now button" 956 forces auto-update to happen immediately for all slides, regardless of whether auto-update is turned on for each slide or the show.

Referring now to the control panel window 960, the control panel window 960 is the first window that appears when show has been started. To begin working within control panel window 960 the user must first select new, or open from the file menu. This window 960 contains three pull-down menus 961, 962, 963 that allow the user to load/save shows in the file menu 961, customize the layout in the preferences menu 962, and get help on any topic within show under the help menu 963.

The file menu 961 options include:
new: opens all seven main windows and deletes all icons, images and movies
open: allows the user to load a saved show
save: save show as current name, or call save as if the show is unnamed save as: save the current show as a different/new name
exit: exit show.
The preferences menu 962 options include:
general preferences: save preferences on exit?, and set the startup transitions
auto-update: set the auto-update frequency
tool tips: customize if and where helpful user tips appear
rendered transitions: customize the number of frames that are used for each possible speed of a rendered transition
visible windows: open/close certain show windows
arrange windows: another way to customize the window layout
save preferences: save the settings set in these menu options.
The help menu 963 options includes
about show: contains a brief overview of the show windows
help: opens a browser that allows the user to view this document with links on key words for easy access to information At the remote node or headend display devices, RCON 500 receives the control signals in the streaming media to synchronize the programming content to create the desired programming in each of the multiple windows. The particular schedules and control signals are addressed to the RCON according the encrypted IP addressing and conditional access techniques that can be provided by vendors such as Media4. The RCON 500 may be implemented with the Duet Platform from Chyron and developed using Lyric and CAL as previously described.

Figure 18:
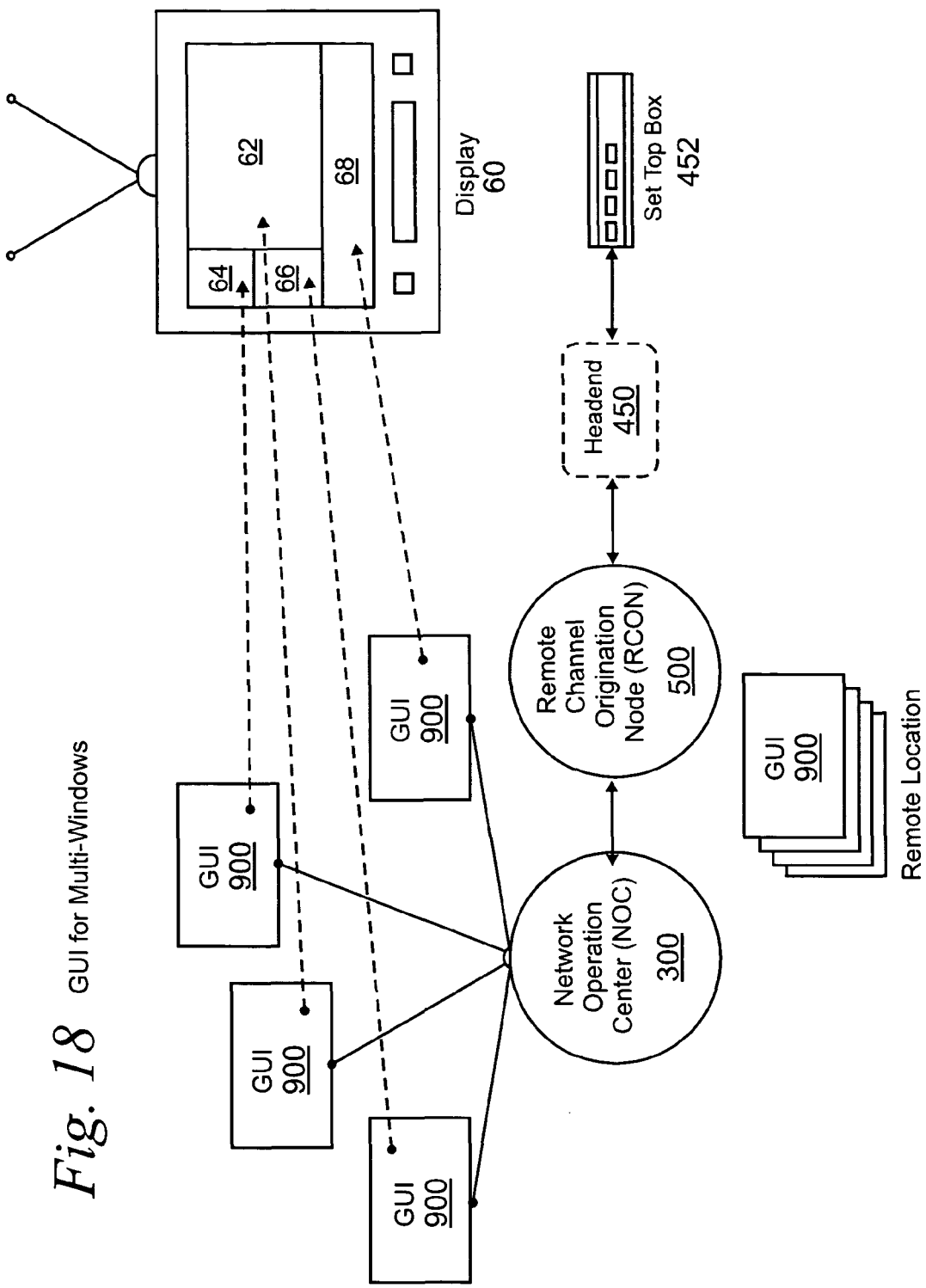
FIG. 18 illustrates an exemplary configuration of a plurality Graphical User Interface software processes each controlling a window of the multi-window screen display such as shown in FIGS. 2A-2B.

As shown in FIG. 18, a plurality of GUIs 900 at the Network Operations Center 300 can control the different multi-window screens in the display 60. In this example, each of the GUIs 900 control the display of a corresponding window 62, 64, 66, 68 in the multi-screen display 60 as depicted in FIG. 18. It should be understood of course that the dashed arrows merely illustrate an exemplary correspondence between the multiple GUI processes and the particular multi-window screen display 62, 64, 66, 68 that is controlled by the GUI interface. The GUIs are shown as separate processes, however, they can be maintained on a single computer workstation as different windows on the desktop as is typically performed with other multi-tasking windows programs. Each of the replicated GUI 900 processes can then be individually accessed and manipulated to control a particular window 62, 64, 66, 68 of the multi-window screen display 60 as described above with respect to the GUI interface 900. The control of the multi-window display by the GUI will be carried through the digital streaming media from the NOC 300 to the remote location. For example, the GUI will send through the digital streaming media the appropriate control and synchronization signals to change or switchover programming in different windows, cut to commercials, etc. In other embodiments, the GUI may include a remote process 901 that is located at the remote location to receive the commands from the GUI and implement the programming indicated by the commands.

The present embodiment preferably includes logic to implement the described methods and functions in software modules as a set of computer executable software instructions. The workstation running the application software includes a Computer Processing Unit ("CPU") or microprocessor to implement the logic that controls the operation. The microprocessor executes software that can be programmed by those of skill in the art to provide the described functionality. The software can be represent as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation.

Audio Concatenation Engine

In addition to producing live and prerecorded audio weather reports, the preferred embodiment of the system will produce audio reports with the assistance of a computer application software that reassembles prerecorded audio elements, which include words, phrases; number and pauses, into coherent narration—Audio Concatenation. The Audio Concatenation Engine ("ACE") software performs the primary task of building user selected audio elements, which include words, phrases, number and pauses, into audio reports that can be used to complement graphics, pictures and imagery generated or used by NHT. The ACE software uses pre-produced audio elements and a dynamic graphics user interface ("GUI") in order to build audio reports ("processing") through a process of script editing and audio assembly from a library of pre-recorded audio elements. Using the ACE software allows a variety of audio programs to be created with in a minimum time and with a minimum of human intervention resulting in considerable savings in overhead and personnel, resulting in considerable cost savings to the system operator.

Pre-Production of Audio Elements

Figure 21:
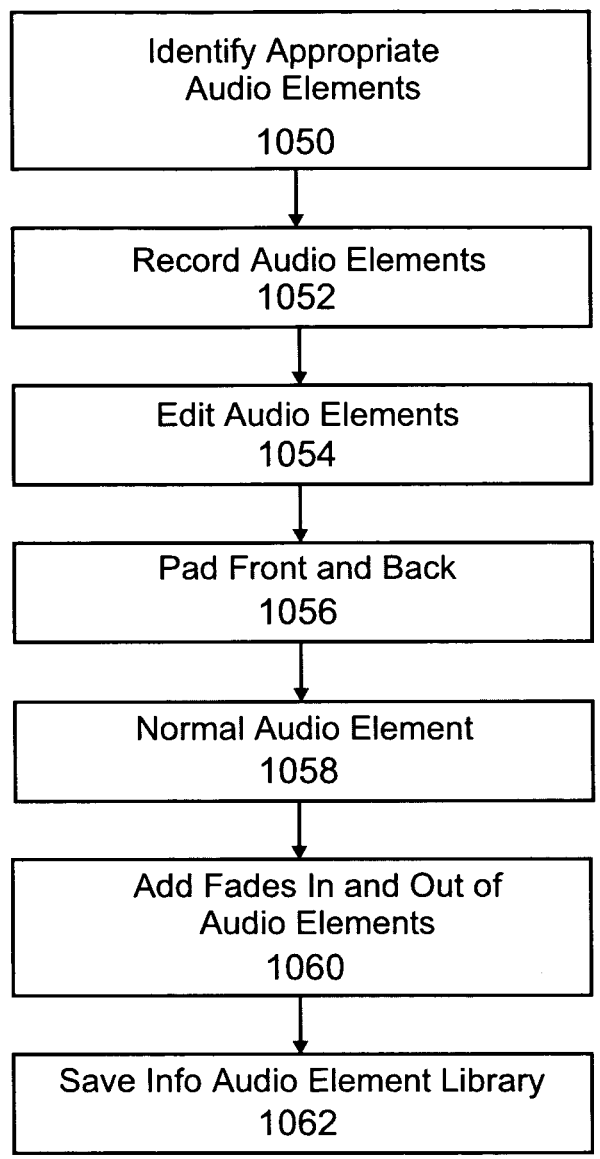
FIGS. 21 and 22 show flow diagrams of the illustrative processes of the Audio Concatenation Engine of FIGS. 19 and 20.

In the exemplary embodiment, the process of building a library of audio elements that can be accessed by the ACE software preferably includes a multi-step process such as the exemplary process shown in FIG. 21.

At step 1050, the desired audio elements are first identified according to the entire the possible vocabulary necessary to compose the desired audio narration. The audio element identification process includes the selection and codification of desired words, phrases, number and pauses for use in audio reports generated by the ACE. For example, in a weather information audio narration certain words or a vocabulary are necessary for speaking out all the possible variations of the weather report. The library of audio elements can be updated at any time, but the ACE does not create words, phrases or numbers that are not in the library. As can be understood, the particular words will vary and can be chosen creatively by the system operator.

At step 1052, after the vocabulary of possible words has been identified, the audio elements with the selected words recorded by a human speaker. A live speaker can pre-record all the necessary audio elements to complete the library with the vocabulary of desired words, although in other embodiments synthesized speech such as provided by systems such as Lucent Technologies may be utilized. A consistent recording environment is required to generate a library of audio elements that can be stacked together and create plausible speech (i.e., sound real) without unnatural fluctuations in speech pitch or vocal inflections inconsistent with natural speech.

The process of normalizing audio elements to create audio elements that can be concatenated together to create natural sounding continuous speech thus begins during the audio record phase and can be modified further during the edit phase at step 1054, the final phase before the ACE can access and concatenate the audio elements. During the edit phase 1054, the audio elements are cut with predefined front and back-end padding at step 1056 such that the audio elements are uniformly padded. At step 1058, the audio elements are normalized to ensure that signal levels are consistent for each narrator's speech at step 1058, and edited to include fades in and out to and from 0 dbz at step 1060 to insure consistent signal levels between audio elements throughout the library. This last task at step 1060 can increase the quality of the assembled audio report when different audio elements are concatenated together to create natural sounding speech with out undue fluctuations, delays or pauses in the assembled audio narration.

At step 1062, the audio elements are coded and saved on a randomly accessible storage medium such as random access memory, hard disc drive, file or video server as ".wav" files with in one or several of the following formats including PCM, 44,100 Hz, 16 Bit, Mono. Of course other audio storage formats may be used as well. Preferably, the library is indexed, hashed or databased such that each of the audio elements can be quickly accessed.

Figure 19:
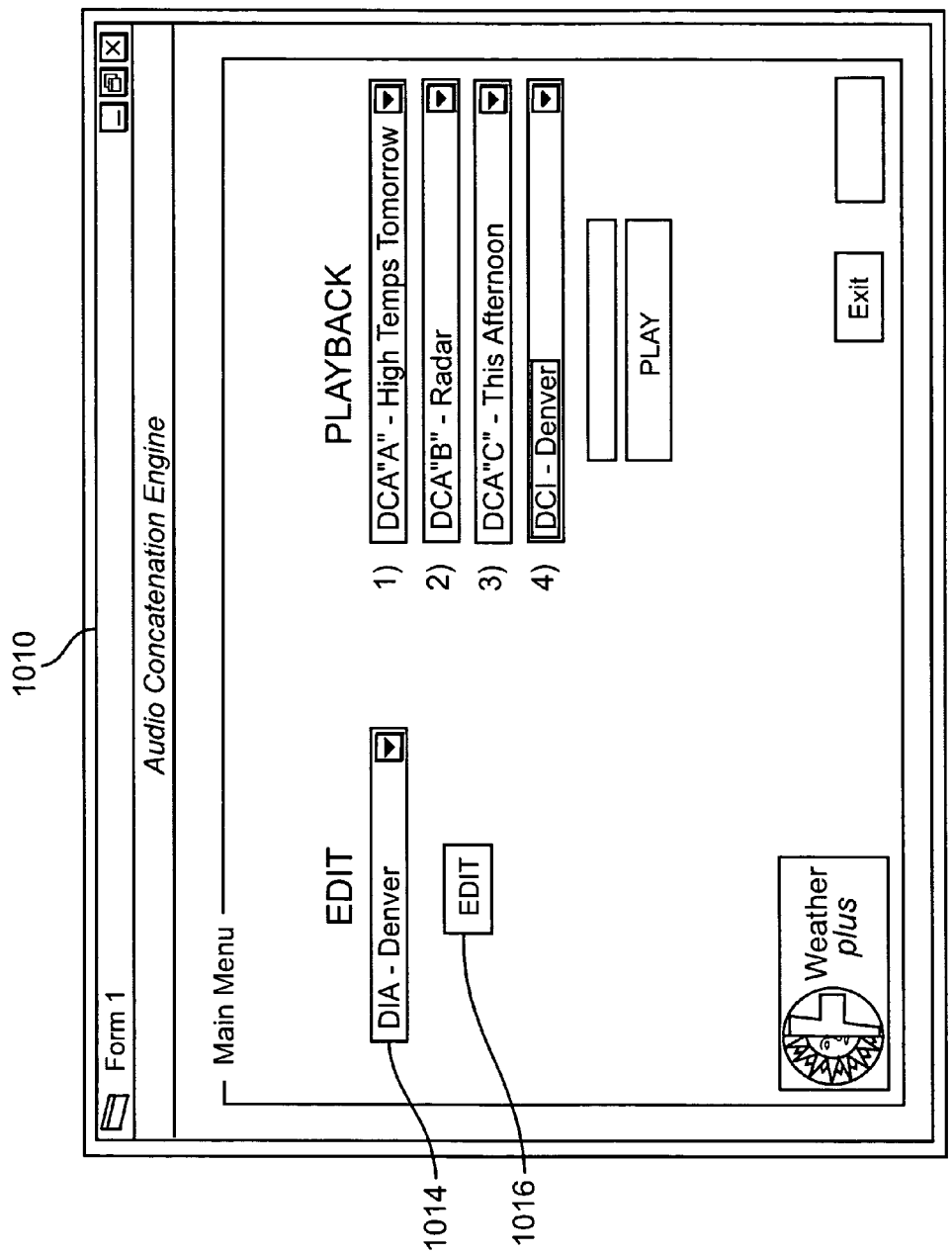
FIG. 19 shows a drawing of an exemplary Main Menu of the audio concatenation engine that can be utilized in the system of FIG. 1.
Figure 20:
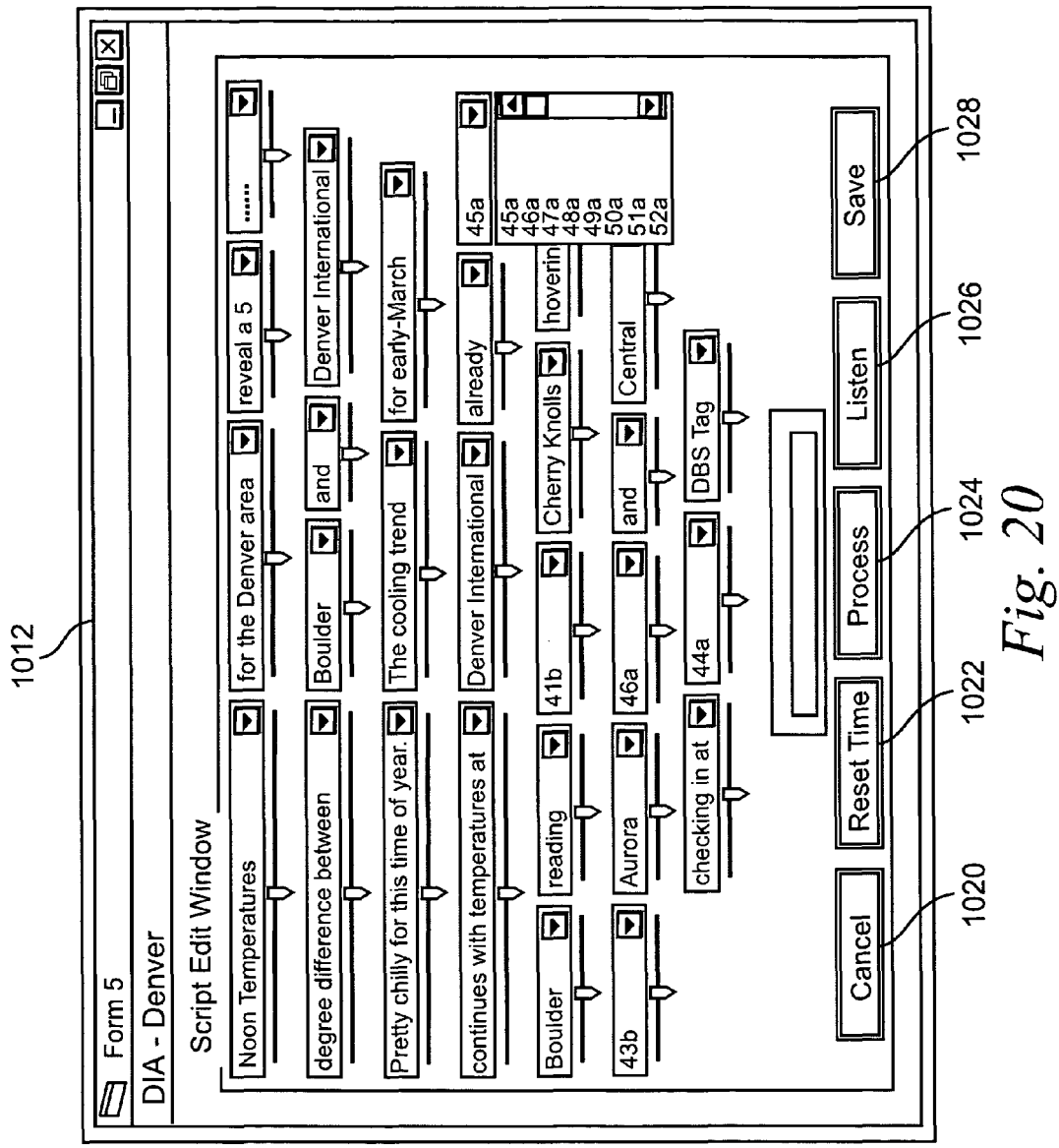
FIG. 20 shows a drawing of an exemplary Script Editing Window that can be used in conjunction with the system of FIG. 1 and the Main Menu of FIG. 15.

Referring now to FIGS. 18 and 19, the Audio Concatenation Engine has two user interfaces, the Main Menu 1010 and Script Edit Window 1012. The primary ACE user interface is the Main Menu 1010 of FIG. 18. The Main Menu 1010 is the initial screen displayed to use when using the ACE software application to produce audio reports. The functions that can be performed from this screen 1010 include the selection of weather report templates 1014 ("scripts") to edit and audio playback. The edit function enables access to all predefined scripts which can then be viewed in the Script Edit Window 1012. The playback function plays processed reports and is not used to play to-air but rather as a means to test audio reports for quality, accuracy, and length.

In order to access the secondary user interface, the Script Edit Window 1012 of FIG. 19, the user selects a script from the drop down menu 1014 below the bold Edit title on the Main Menu 1010 and clicks the Edit button 1016. Scripts correspond to and are played in conjunction with graphics and are updated on the same frequency for consistency and accuracy. The selection of Edit 1016 opens the Script Edit Window 1012 of FIG. 19.

Referring now to FIG. 19, from the Script Edit Window 1012, the user selects individual audio elements that comprise audio weather reports. In addition, the user can configure recording parameters including language, spacing, narrator (e.g., male and female options), intonation, inflection, and tone. The user selects audio elements describing weather conditions or news information from drop down menus within the script. All audio elements reside in a library and are linked from elements in each drop down menu to the actual audio file for retrieval during the audio assembly process as is described in the audio report processing.

The primary functions performed on the Script Edit Window 1012 include the following items: Cancel 1020, Reset Trims 1022, Process 1024, Listen 1026 and Save 1028. The "Cancel" function key 1020 cancels the current operation and returns the user to the Script Edit Window 1012 where the script may be reedited. The "Reset Trims" function key 1022 restores default record settings. The "Process" function key 1024 executes the assembly of the selected (i.e., visible) audio elements and builds an audio file, the audio weather report. The "Listen" function key 1026 provides a preview of the most recent version of the audio file for the selected script. The "Save" function key 1028 exits the Script Edit Window 1012 and returns the user to the Main Menu 1010. The "Insert" function is performed within the drop-down menu and enables the user to modify existing scripts to include new audio element options. The "Insert" function requires pre-production and editing of the desired audio element (e.g., include "tornado" as an audio element option within a script during the spring).

Audio Report Processing

After the desired script is assembled, the processing of individual audio elements into an audio report includes three primary steps: 1) blank .wav file acquisition, 2) audio element insertion and 3) save. Upon the selection of the "Process" button, the ACE builds a .wav file from a blank template and inserts the selected (i.e., visible) audio elements in order as defined in the open Script Edit Window 1012. Once the final audio element is inserted into the blank .wav file, the file is saved without the remainder of the blank .wav file at the end and the run time is computed. The process of assembling audio elements into a report can be automated to run at specific times or upon the receipt of new information driving the contents of the drop-down menus in the Script Edit Window 1012.

Figure 22:
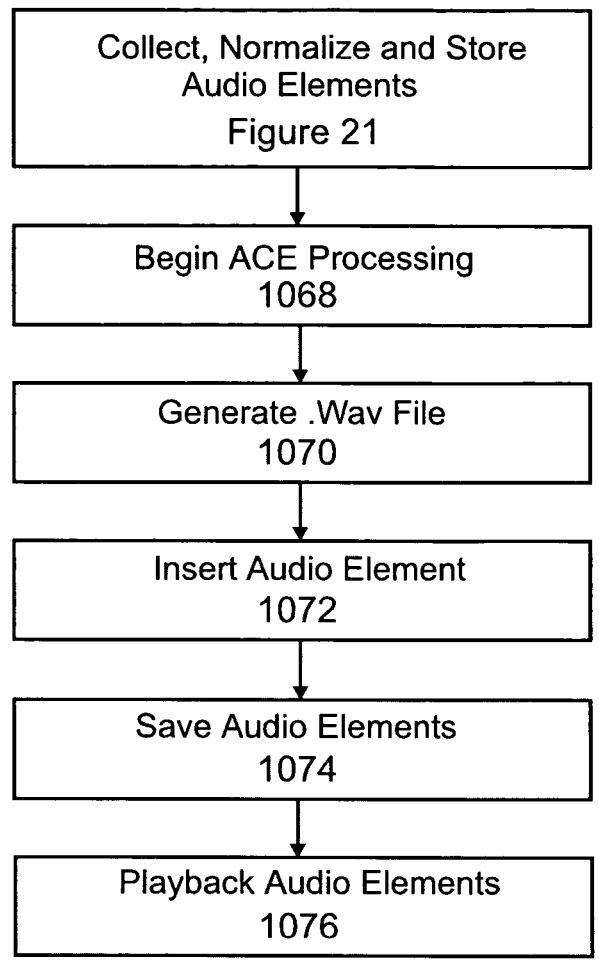

FIG. 22 shows the method steps that can be practiced in implementing the ACE processing. At step 1068, the processing is initiated by the operator after the desired audio narration is selected and scripted through the user interface Script Edit Window 1012 as described with respect to FIG. 20. For example, by selecting the process button 1024 shown in FIG. 20 the ACE process can be initiated.

At step 1070, the blank .wav file is generated from a stored .wav template, and at step 1072, the desired audio elements are inserted into the .wav file as ordered by the selection of the operator in the Script Edit Window 1012. The specified audio elements are selected from the audio library generated as described in FIG. 21 and the process continued until all the specified audio elements are selected to form the desired audio narration. At step 1074, the audio narration inserted into the .wav file is saved for later playback at step 1076. The generated .wav files can be saved in a fashion similar to the audio element library, although the generated .wav files are typically temporary and thus kept in a less permanent fashion. At step 1076, the generated audio narration stored in the .wav file is played back at an appropriate rate to generate realistic sounding speech. The playback may be real time as the .wav file is generated or playback may be set to occur upon a particular cue or at a particular time.

The ACE can be implemented as application software executing logical instructions running on a typical personal computer or workstation; similar to those described herein, to perform the methods and functions described above. The logic can be implemented in a variety of different ways as described with respect the GUI interface 900.

The many disclosed embodiments herein allow the creation of a broadcast network system for displaying a multi-window screen programming customized for different remote locations by enabling the generation, distribution, assembly and synchronization of digital streaming media from a network operation center. The network operations center provides an all-digital program facility that creates and broadcasts programming content in a digital streaming media format that is transmitted to a plurality of remote nodes that can utilize the digital streaming media along with locally provided information to create programming customized for particular remote locations. A number of computer subsystems, workstations, networks, file servers, databases and communication links described herein allow the automation of network operation center processes and functions to integrate and automate operations, resulting in simplified operation and thus lower operating costs requiring less personnel. A graphical user interface provides operator access to a software control program that allows the control of the multi-window display at the remote location from a central location such as the network operation center. The audio concatenation engine provides the operator the ability to automate the creation of audio narration without requiring the traditional number of production studios or on-air personnel.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. Numerous variations are possible under the scope of the present embodiments. For example, the steps of the flow diagrams may be taken in sequences other than those described, and more or fewer elements may be used in the block diagrams.

It should be understood that a hardware embodiment may take a variety of different forms. The software and hardware may be implemented as an integrated circuit with custom gate arrays or an application specific integrated circuit ("ASIC"). Of the course, the embodiment may also be implemented with discrete hardware components and circuitry.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method comprising:
   receiving, by a distribution facility interface, a multiplexed digital data stream, from a distribution facility multiplexer, the multiplexed digital data stream including television program content having a digitized video data stream, a digitized audio data stream, and switching control information;
   receiving, by the distribution facility interface, a video content and an audio content;
   generating, via the distribution facility interface, a television programming data stream including the multiplexed digital data stream, the video content, the audio content and the switching control information, wherein the generated television programming data stream is transmitted via a satellite from a distribution facility to a head end;
   wherein a carrier lost detection switch is configured to automatically switch to a full screen digitized video and audio data stream in response to sensing loss of at least one of the video content or the audio content;
   wherein the switching control information is used to select at least one of the digitized video data stream, the digitized audio data stream, the video content or the audio content,
   wherein the television programming data stream includes data configured to render a multi-window screen display including content directed to a national geographic area and a window containing at least one of the video content or the audio content, and
   wherein the switching control information controls assembly of content of a window in the multi-window screen display to include the digitized video data stream and the video content.

2. The method of claim 1, wherein the multiplexed digital data stream includes a single-window feed including content directed to a national geographic area.

3. The method of claim 1, wherein at least one window in the multi-window screen display contains the video content and the audio content.

4. The method of claim 1, wherein at least one window in the multi-window screen display includes a transactional window.

5. The method of claim 1, wherein the switching control information is used to control a video switch and an audio switch.

6. The method of claim 1, wherein the multi-window screen display includes a first window containing national information and a second window containing at least one of regional information, local information, or transactional information.

7. The method of claim 1, wherein the multiplexed digital data stream includes components to implement interactive programming.

8. The method of claim 1, wherein the multiplexed digital data stream includes components to implement transactional programming.

9. The method of claim 1, wherein the multi-window screen display includes windows containing program content rendered from stored and real-time information.

10. The method of claim 1, wherein the multiplexed digital data stream includes real-time program content along with store-and-forward program content.

11. The method of claim 1, wherein the multiplexed digital data stream includes encapsulated interim protocol packets.

12. The method of claim 1, wherein the multiplexed digital data stream includes information selected from the group consisting of weather information, news information, sports information and entertainment information.

13. The method of claim 1, wherein at least one window in the multi-window screen display includes an information crawl.

14. The method of claim 1, wherein the content contained in the television programming data stream is displayed in one or more window of the multi-window screen display according to a programming schedule.

15. The method of claim 14, wherein for at least a portion of the programming schedule the content contained in the digitized video data stream is displayed in one window and the video content is displayed in another window.

16. A non-transitory computer readable medium having instructions stored thereon that, in response to execution by a distribution facility interface, cause the distribution facility interface to perform operations comprising:
   processing a multiplexed digital data stream from a distribution facility multiplexer to identify television program content having a digitized video data stream, a digitized audio data stream, and switching control information;
   processing video content and audio content;
   generating a television programming data stream including the multiplexed digital data stream, the video content, the audio content and the switching control information, wherein the generated television programming data stream is transmitted via satellite from a distribution facility to a head end; and
   wherein a carrier lost detection switch automatically switches to a full screen digitized video and audio data stream in response to sensing loss of at least one of the video content or the audio content;

wherein the switching control information is used to select at least one of the digitized video data stream, the digitized audio data stream, the video content and the audio content, wherein the programming data stream includes data configured to render a multi-window screen display, and wherein the switching control information controls assembly of content of a window in the multi-window screen display to include the digitized video data stream and the video content according to a program schedule included in the switching control information.

17. A remote channel origination node device, comprising:
a receiver configured to receive, via a first receiver interface from a network operations center multiplexer via satellite, a multiplexed digital data stream including program content having a digitized video data stream, a digitized audio data stream, and switching control information, and via a second receiver interface a video content and an audio content, wherein the multiplexed digital data stream, the video content and the audio content is output from a network operation center interface; and
a screen rendering engine configured to display at least a portion of a programming data stream including the multiplexed digital data stream, the video content, the audio content and the switching control information, wherein a carrier lost detection switch automatically switches to a full screen digitized video and audio data stream in response to sensing loss of at least one of the video content or the audio content, wherein the switching control information is used to select at least one of the digitized video data stream, the digitized audio data stream, the video content and the audio content, wherein the programming data stream is generated by the network operation center interface, wherein the programming data stream includes data configured to render a multi-window screen display, wherein the generated programming data stream is transmitted to the remote channel origination node device, and wherein the switching control information controls assembly of content of a window in the multi-window screen display to include the digitized video data stream and the video content according to a program schedule included in the switching control information.

18. The remote channel origination node device of claim 17, further comprising a remote system automation processor configured to communicate with the network operation center to enable remote control of the remote channel origination node device by the network operation center.

19. The remote channel origination node device of claim 17, wherein the receiver is configured to receive program content directed to a regional area, and wherein at least one window in the multi-window screen display contains the program content directed to the regional area for at least a portion of a time that the multi-window screen display is generated.

20. A remote channel origination node device comprising:
a receiver configured to receive, via a network operations center interface from a network operations center multiplexer via a satellite, a multiplexed digital data stream comprising program content having a digitized video data stream, a digitized audio data stream, and switching control information;
the receiver configured to receive, via the network operations center interface, a video content and an audio content; and
a display configured to display at least a portion of a programming data stream generated by the network operation center interface, wherein a carrier lost detection switch is configured to automatically switch to a full screen digitized video and audio data stream in response to sensing loss of at least one of the video content or the audio content, wherein the generated programming data stream is transmitted to the remote channel origination node device, wherein the programming data stream includes digital data stream, the video content, the audio content and the switching control information, wherein the switching information is used to select from among the digitized video data stream, the digitized audio data stream, the video content and the audio content, wherein the programming data stream includes data configured to render a multi-window screen display, and wherein the switching control information controls assembly of content of a window in the multi-window screen display to include the digitized video data stream and the video content according to a program schedule included in the switching control information.

21. The method of claim 1,
wherein the digitized video stream includes at least one of video, data, software applications, graphics, animated sequences, and control scripts for digital effects, and
wherein the video content includes at least one of live or prerecorded content.

* * * * *